United States Patent
Pan

(10) Patent No.: US 11,520,220 B2
(45) Date of Patent: Dec. 6, 2022

(54) WAVELENGTH CONVERSION MODULE AND PROJECTION DEVICE

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/086,478

(22) Filed: Nov. 2, 2020

(65) Prior Publication Data
US 2021/0141297 A1 May 13, 2021

(30) Foreign Application Priority Data
Nov. 8, 2019 (CN) .......................... 201911085898.6

(51) Int. Cl.
*G03B 21/20* (2006.01)
*G02B 27/10* (2006.01)
*G02B 26/00* (2006.01)

(52) U.S. Cl.
CPC ......... *G03B 21/204* (2013.01); *G02B 26/008* (2013.01); *G02B 27/1006* (2013.01);
(Continued)

(58) Field of Classification Search
CPC .............. G02B 26/008; G02B 27/1006; G02B 27/1026; G02B 27/141; G03B 21/2013;
(Continued)

(56) References Cited

U.S. PATENT DOCUMENTS

2013/0169939 A1  7/2013  Fukano
2014/0168613 A1*  6/2014  Wang ................... G03B 21/204
353/31
(Continued)

FOREIGN PATENT DOCUMENTS

CN  102193296  3/2013
CN  103777447  5/2014
(Continued)

OTHER PUBLICATIONS

"Office Action of China Counterpart Application", dated Nov. 23, 2021, p. 1-p. 13.

*Primary Examiner* — Magda Cruz
(74) *Attorney, Agent, or Firm* — JCIPRNET

(57) ABSTRACT

A wavelength conversion module is configured to receive an excitation beam. The wavelength conversion module includes a substrate and a wavelength conversion material arranged on the substrate. The substrate includes a ring-shaped light irradiation region, and the wavelength conversion material is annularly arranged on at least part of the ring-shaped light irradiation region. A first color light obtained through conversion when the excitation beam is incident to the wavelength conversion material of the ring-shaped light irradiation region in a first time sequence has a first light intensity, the first color light obtained through conversion when the excitation beam is incident to the wavelength conversion material of the ring-shaped light irradiation region in a second time sequence has a second light intensity, and the first light intensity and the second light intensity are different. In addition, a projection device is also provided.

26 Claims, 29 Drawing Sheets

(52) U.S. Cl.
CPC ....... *G03B 21/208* (2013.01); *G03B 21/2013* (2013.01); *G03B 21/2066* (2013.01)

(58) Field of Classification Search
CPC .............. G03B 21/204; G03B 21/2053; G03B 21/2066; G03B 21/208; G03B 33/08
See application file for complete search history.

(56) References Cited

U.S. PATENT DOCUMENTS

| | | | | |
|---|---|---|---|---|
| 2017/0237953 | A1* | 8/2017 | Akiyama | ............. H04N 9/3158 |
| | | | | 353/31 |
| 2019/0227416 | A1* | 7/2019 | Pan | .................... G03B 21/2013 |
| 2019/0354001 | A1* | 11/2019 | Tsai | ........................ G03B 33/08 |
| 2019/0391470 | A1* | 12/2019 | Pan | .................... G03B 21/2066 |

FOREIGN PATENT DOCUMENTS

| | | |
|---|---|---|
| CN | 102707551 | 4/2015 |
| CN | 104714359 | 6/2015 |
| CN | 102289141 | 7/2015 |
| CN | 109976075 | 7/2019 |
| CN | 110058479 | 7/2019 |
| CN | 110161791 | 8/2019 |
| CN | 209373344 | 9/2019 |
| CN | 110632814 | 12/2019 |
| CN | 209845157 | 12/2019 |
| CN | 211086896 | 7/2020 |
| EP | 2360523 | 8/2011 |

\* cited by examiner

WAVELENGTH CONVERSION MODULE AND PROJECTION DEVICE

CROSS-REFERENCE TO RELATED APPLICATION

This application claims the priority benefit of China application serial no. 201911085898.6, filed on Nov. 8, 2019. The entirety of the above-mentioned patent application is hereby incorporated by reference herein and made a part of this specification.

BACKGROUND OF THE INVENTION

Field of the Invention

The disclosure relates to an optical module and an optical device including the optical module, and in particular, to a wavelength conversion module and a projection device including the wavelength conversion module.

Description of Related Art

Recently, projection devices based on solid-state light sources such as light-emitting diodes (LED) and laser diodes (LD) gradually have a place in the market. Because the laser diode has light-emitting efficiency of more than about 20%, to overcome the light source limitation of the light-emitting diode, there has gradually been a development to use a laser source to excite a phosphor to generate a pure-color light source required by a projector.

In an existing architecture of a digital light processing (DLP) projector with multiple light valves, a micro-lens array on a digital micro-mirror device (DMD) that serves as the light valve swings rapidly so that an illuminating beam irradiated on the DMD is reflected to pass through or not to pass through a projection lens to form the light and shade of each pixel of a projection picture. However, due to the limitation of the swing speed of the DMD, the existing projector generates dithering noise when displaying a dark picture, causing discomfort of a viewer.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a wavelength conversion module, and when the wavelength conversion module is applied to a projection device, dithering noise occurring in a dark picture can be eliminated.

The invention provides a projection device, which can provide a picture with favorable image quality.

Other objectives and advantages of the invention may be further understood from technical features disclosed in the invention.

To achieve one or some or all of the foregoing objectives or other objectives, an embodiment of the invention provides a wavelength conversion module. The wavelength conversion module is configured to receive an excitation beam, where the wavelength conversion module includes a substrate and a wavelength conversion material arranged on the substrate, the substrate includes a ring-shaped light irradiation region, the wavelength conversion material is annularly arranged on at least part of the ring-shaped light irradiation region, and the substrate is configured to rotate with a rotating axis as a center, where when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module at the same time, the first color light obtained through conversion when the excitation beam is incident to the wavelength conversion material of the ring-shaped light irradiation region in a first time sequence has a first light intensity, the first color light obtained through conversion when the excitation beam is incident to the wavelength conversion material of the ring-shaped light irradiation region in a second time sequence has a second light intensity, and the first light intensity and the second light intensity are different.

To achieve one or some or all of the foregoing objectives or other objectives, an embodiment of the invention provides a projection device. The projection device includes a lighting system, a light splitting and combining unit, at least two light valves, and a projection lens. The lighting system is configured to provide an illuminating beam, and the lighting system includes an excitation light source and a wavelength conversion module. The excitation light source is configured to emit an excitation beam, and the wavelength conversion module is located on a transmission path of the excitation beam. The light splitting and combining unit is located on a transmission path of the illuminating beam, and is configured to convert the illuminating beam into a plurality of illuminating sub-beams. The at least two light valves are located on a transmission path of the plurality of illuminating sub-beams, and are configured to convert the plurality of corresponding illuminating sub-beams into a plurality of image beams. The projection lens is located on a transmission path of the plurality of image beams, and is configured to convert the plurality of image beams into projection beams, where the plurality of image beams is transmitted to the projection lens through the light splitting and combining unit.

Based on the above, the embodiments of the invention have at least one of the following advantages or effects. In the embodiments of the invention, based on the arrangement of the ring-shaped light irradiation region in the wavelength conversion module and the projection device, when an excitation beam from a same excitation light source irradiates the wavelength conversion module, a part of the excitation beam is converted into a first color light, and another part of the excitation beam forms a second color light. In addition, the wavelength conversion module may also adjust changes in a radial width, a volume ratio, a volumetric concentration, or a thickness of the wavelength conversion material throughout the ring-shaped light irradiation region, to respectively control light intensity values of the first color light and the second color light in different time periods. In this way, when the projection device needs to display a dark picture, the wavelength conversion material throughout the ring-shaped light irradiation region of the wavelength conversion module may be designed, to correspondingly reduce light intensity of an image beam in a required color to a required value, so that dithering noise of an entire dark picture can be greatly reduced, thereby improving image quality and a visual perception of a user.

Other objectives, features and advantages of the invention will be further understood from the further technological features disclosed by the embodiments of the invention where there are shown and described exemplary embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the exemplary embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
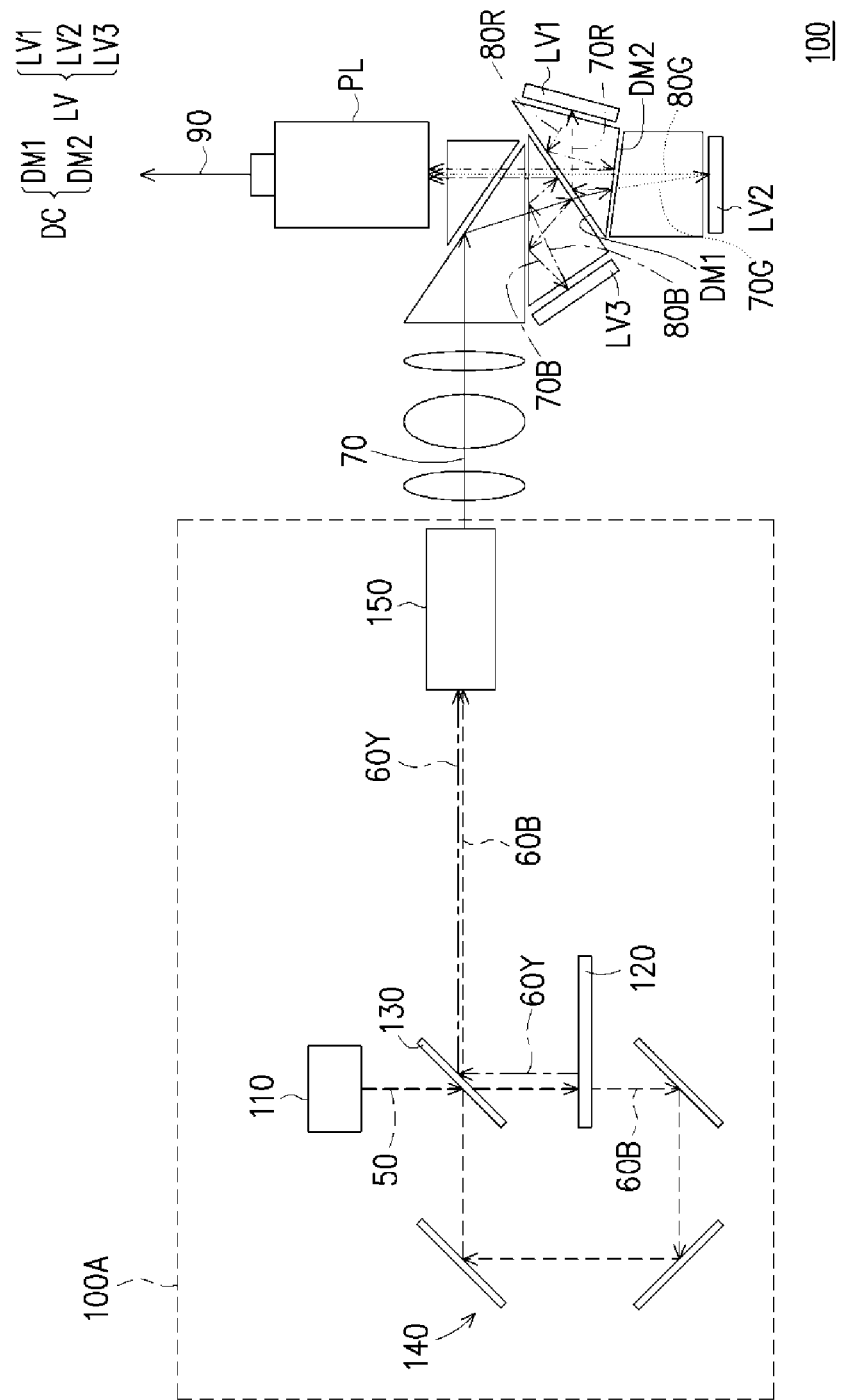
FIG. 1A is a schematic architectural diagram of a projection device according to an embodiment of the invention.
Figure 1B:
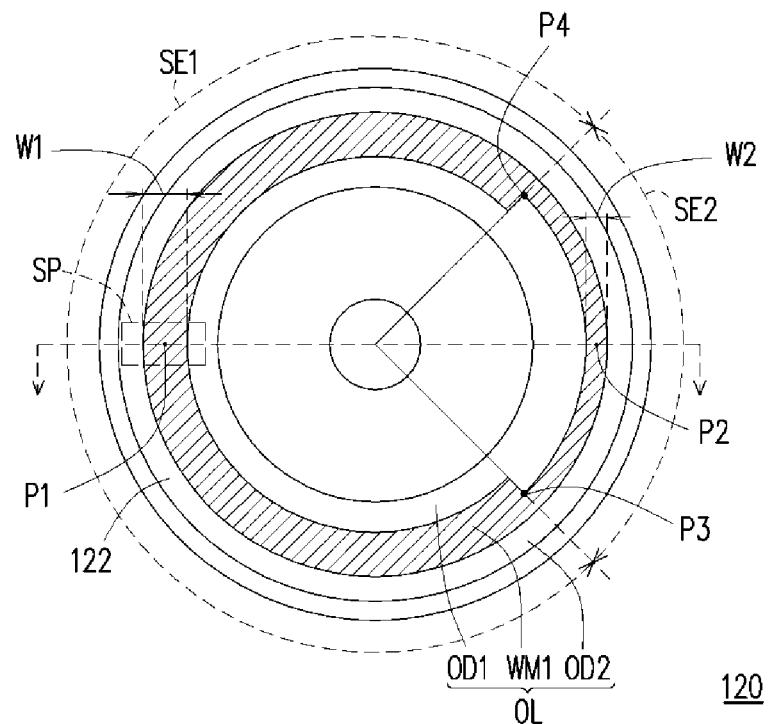
FIG. 1B is a schematic front view of a wavelength conversion module in FIG. 1A.
Figure 1C:
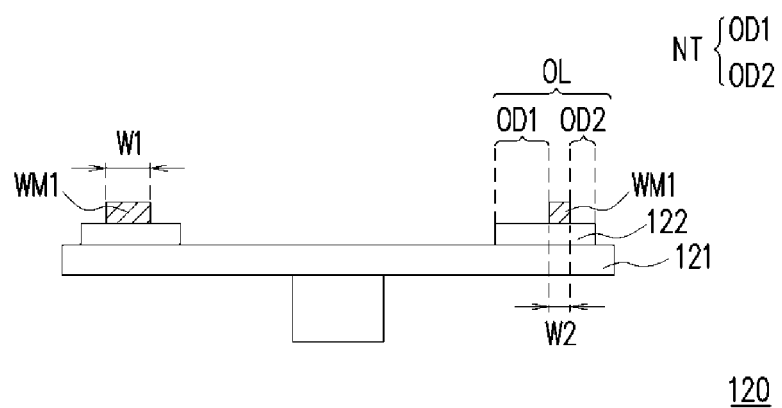
FIG. 1C is a schematic cross-sectional view of the wavelength conversion module in FIG. 1B.
Figure 1D:
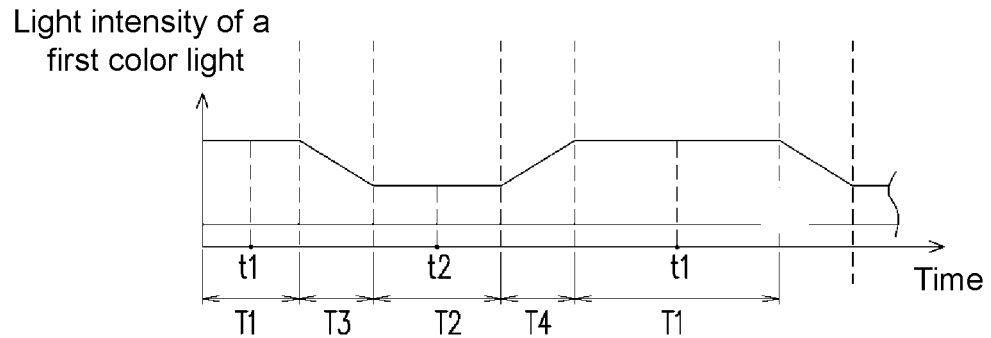
FIG. 1D is an intensity distribution diagram over time of a first color light obtained through conversion by the wavelength conversion module in FIG. 1B.
Figure 1E:
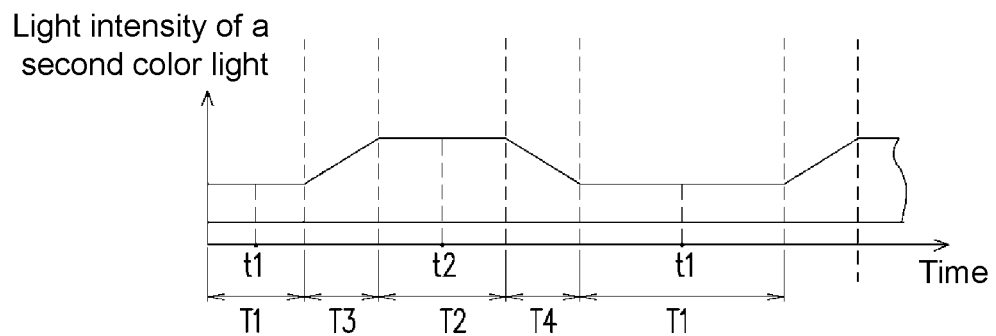
FIG. 1E is an intensity distribution diagram over time of a second color light formed by the wavelength conversion module in FIG. 1B.

FIG. 1A is a schematic architectural diagram of a projection device according to an embodiment of the invention. FIG. 1B is a schematic front view of a wavelength conversion module in FIG. 1A. FIG. 1C is a schematic cross-sectional view of the wavelength conversion module in FIG. 1B. FIG. 1D is an intensity distribution diagram over time of a first color light obtained through conversion by the wavelength conversion module in FIG. 1B. FIG. 1E is an intensity distribution diagram over time of a second color light formed by the wavelength conversion module in FIG. 1B. Referring to FIG. 1A, in the present embodiment, a projection device 100 includes a lighting system 100A, a light splitting and combining unit DC, at least two light valves LV, and a projection lens PL. For example, in the embodiment, there are three light valves LV, namely, light valves LV1, LV2, and LV3, but the invention is not limited thereto. In the embodiment, the light valve LV is, for example, a DMD.

Specifically, as shown in FIG. 1A, the lighting system 100A is configured to provide an illuminating beam 70, and includes an excitation light source 110, a wavelength conversion module 120, a first color separation element 130, and an optical transmission module 140. The excitation light source 110 is configured to emit an excitation beam 50. For example, in the embodiment, the excitation light source 110 is a blue laser source, and the excitation beam 50 is a blue laser beam. The excitation light source 110 may include, for example, a plurality of blue laser diodes (not shown) arranged in an array, but the invention is not limited thereto.

Specifically, as shown in FIG. 1A, in the embodiment, the first color separation element 130 is arranged on a transmission path of the excitation beam 50, and is located on between the excitation light source 110 and wavelength conversion module 120. Specifically, the first color separation element 130 may be a color separation element, a transflective element, a polarization optical splitting element, or various other elements capable of splitting a light beam. For example, in the embodiment, the first color separation element 130 is, for example, a dichroic mirror with yellow light reflection, which allows blue light to pass therethrough, and provides a reflection effect on yellow light. Therefore, the first color separation element 130 may allow a blue excitation beam 50 to pass therethrough. In this way, the excitation beam 50 of the excitation light source 110 may pass through the first color separation element 130 and be transmitted to the wavelength conversion module 120.

Further, as shown in FIG. 1A to FIG. 1C, in the embodiment, the wavelength conversion module 120 is located on the transmission path of the excitation beam 50, and includes a substrate 121 and a wavelength conversion material WM1 arranged on the substrate 121, the substrate 121 includes a ring-shaped light irradiation region OL, the wavelength conversion material WM1 is annularly arranged in at least part of the ring-shaped light irradiation region OL, and the ring-shaped light irradiation region OL further includes a non-conversion region NT.

Further, as shown in FIG. 1A and FIG. 1B, in the embodiment, when the excitation beam 50 is transmitted to the wavelength conversion module 120, the excitation beam 50 forms a light spot SP on the wavelength conversion module 120. The substrate 121 is configured to rotate with a rotating axis as a center. Subsequently, a first part of the excitation beam 50 is incident to the wavelength conversion material WM1 to enable at least part of the light spot SP to be located on the wavelength conversion material WM1, and the first part of the excitation beam 50 that is incident to the wavelength conversion material WM1 is converted into a first color light 60Y. A second part of the excitation beam 50 is incident to the non-conversion region NT of the ring-shaped light irradiation region OL to enable at least part of the light spot SP to be located on the non-conversion region NT, and the second part of the excitation beam 50 that is incident to the non-conversion region NT forms a second color light 60B. The excitation beam 50 includes the first part and the second part, and the excitation beam 50 is incident to the ring-shaped light irradiation region OL, so that the first color light 60Y and the second color light 60B are formed at the same time. For example, a value of a ratio of the second part of the excitation beam 50 that is incident to the ring-shaped light irradiation region OL to the excitation beam 50 that is incident to the ring-shaped light irradiation region OL ranges from 5% to 30%. It should be noted that, the value range herein is only used for exemplary description, and is not used to limit the invention.

The following further explains the conversion processes of the first color light 60Y and the second color light 60B.

For example, in the embodiment, the substrate 121 is, for example, a light transmission substrate. In addition, as shown in FIG. 1B and FIG. 1C, in the embodiment, the wavelength conversion material WM1 is formed into an O-ring, and the wavelength conversion module 120 further includes a ring-shaped light scattering layer 122. For example, in the embodiment, the wavelength conversion module 120 is, for example, a phosphor wheel, suitable for rotating with a rotating axis as a center, and the wavelength conversion material WM1 includes a phosphor capable of exciting a yellow light, so that the excitation beam 50 may be converted into yellow light. In other words, in the embodiment, the first color light 60Y is yellow light. For example, in the embodiment, the first color light 60Y is a broad-spectrum color light, and a difference between its primary wavelength and a primary wavelength of the excitation beam 50 (namely, a difference obtained by subtracting the primary wavelength of the excitation beam 50 from the primary wavelength of the first color light 60Y) is greater than or equal to 20 nanometers. It should be noted that, the value range herein is only used for exemplary description, and is not used to limit the invention.

Moreover, as shown in FIG. 1C, the ring-shaped light scattering layer 122 is located on the substrate 121, and the ring-shaped light scattering layer 122 is arranged between the substrate 121 and the wavelength conversion material WM1. Moreover, as shown in FIG. 1B and FIG. 1C, the wavelength conversion material WM1 does not completely cover the ring-shaped light scattering layer 122, and parts of the ring-shaped light scattering layer 122 that are not covered by the wavelength conversion material WM1 may form a first ring-shaped light scattering region OD1 and a second ring-shaped light scattering region OD2 on the substrate 121. In other words, as shown in FIG. 1B, the first ring-shaped light scattering region OD1 and the second ring-shaped light scattering region OD2 are located on the substrate 121, and the wavelength conversion material WM1 corresponding to the ring-shaped light irradiation region OL is located between the first ring-shaped light scattering region OD1 and the second ring-shaped light scattering region OD2. In addition, the wavelength conversion material WM1 surrounds the first ring-shaped light scattering region OD1 and is surrounded by the second ring-shaped light scattering region OD2. In other words, in a direction from the rotating axis to the substrate 121, the first ring-shaped light scattering region OD1, the wavelength conversion material WM1, and the second ring-shaped light scattering region OD2 are sequentially arranged. In this way, the wavelength conversion material WM1, the first ring-shaped light scattering region OD1, and the second ring-shaped light scattering region OD2 can constitute the ring-shaped light irradiation region OL.

Further, as shown in FIG. 1B, in the embodiment, the first ring-shaped light scattering region OD1 and the second ring-shaped light scattering region OD2 correspond to the non-conversion region NT of the wavelength conversion module 120. In this way, because the first ring-shaped light scattering region OD1 and the second ring-shaped light scattering region OD2 can destroy homogeneity of a laser beam, and have a function of eliminating a laser speckle, when the excitation beam 50 passes through the first ring-shaped light scattering region OD1 and the second ring-shaped light scattering region OD2, blue light can be formed, and a laser speckle phenomenon can be eliminated. In other words, in the embodiment, the second color light 60B formed through the non-conversion region NT has the same color as the excitation beam 50, that is, blue light.

Still further, as shown in FIG. 1B and FIG. 1C, in the embodiment, a radial width of the wavelength conversion material WM1 varies as in different positions in the ring-shaped light irradiation region OL. Therefore, when the wavelength conversion module 120 rotates, the radial width of the wavelength conversion material WM1 in the ring-shaped light irradiation region OL to which the excitation beam 50 is incident as a time sequence changes also varies. For example, as shown in FIG. 1B and FIG. 1C, the ring-shaped light irradiation region OL includes a first section SE1 and a second section SE2, a width of the wavelength conversion material WM1 in the first section SE1 is fixedly a first radial width W1, and a width of the wavelength conversion material WM1 in the second section SE2 is fixedly a second radial width W2. That is, when the wavelength conversion module 120 rotates, the first section SE1 and the second section SE2 are alternately switched to the transmission path of the excitation beam 50. In addition, as shown in FIG. 1C, in the embodiment, the first radial width W1 is greater than the second radial width W2. In addition, more specifically, as shown in FIG. 1C to FIG. 1D, in the embodiment, because the widths of the wavelength conversion material WM1 in the first section SE1 and the second section SE2 are respectively fixed values, in the embodiment, the first radial width W1 is essentially a maximum radial width of the wavelength conversion material WM1, and the second radial width W2 is essentially a minimum radial width of the wavelength conversion material WM1. In addition, a ratio of the first ring width W1 to the second ring width W2 is greater than 110%.

Moreover, as shown in FIG. 1D, in the embodiment, the first color light 60Y obtained through conversion when the excitation beam 50 is incident to the wavelength conversion material WM1 of the ring-shaped light irradiation region OL in a first time sequence t1 has a first light intensity. The first color light 60Y obtained through conversion when the excitation beam 50 is incident to the wavelength conversion material WM1 of the ring-shaped light irradiation region OL in a second time sequence t2 has a second light intensity, and the first light intensity and the second light intensity are different. In addition, in the present embodiment, the first light intensity is the maximum light intensity of the first color light 60Y in all time periods, and the second light intensity is the minimum light intensity of the first color light 60Y in all the time periods.

More specifically, as shown in FIG. 1C and FIG. 1D, in the embodiment, because the first radial width W1 is greater than the second radial width W2, when the excitation beam 50 is respectively incident to a first position P1 in the first section SE1 and a second position P2 in the second section SE2, an area of the wavelength conversion material WM1 that is covered by a light spot P formed in the first position P1 is also greater than an area of the wavelength conversion material WM1 that is covered by the light spot SP formed in the second position P2, and further, a light intensity of the light spot SP formed in the first position P1 in the first section SE1 is also greater than a light intensity of the light spot SP formed in the second position P2 in the second section SE2. Moreover, as shown in FIG. 1C and FIG. 1E, correspondingly, in the embodiment, when the excitation beam 50 is respectively incident to the first position P1 in the first section SE1 and the second position P2 in the second section SE2, an area of the non-conversion region NT that is covered by the light spot P in the first position P1 is less than an area of the non-conversion region NT that is covered by the light spot SP in the second position P2. Therefore, a light intensity of the second color light 60B when the excitation beam 50 is incident to the first position P1 in the first section SE1 is less than a light intensity of the second color light 60B when the excitation beam 50 is incident to the second position P2 in the second section SE2. Therefore, in the embodiment, a position that is on the wavelength conversion material WM1 of the ring-shaped light irradiation region OL and to which the excitation beam 50 is incident in the first time sequence t1 may be the first position P1 in the first section SE1, and a position that is on the wavelength conversion material WM1 of the ring-shaped light irradiation region OL and to which the excitation beam 50 is incident in the second time sequence t2 may be the second position P2 in the second section SE2.

In addition, more specifically, as shown in FIG. 1C and FIG. 1D, junctions of two ends of the first section SE1 and the second section SE2 are respectively a third position P3 and a fourth position P4. Therefore, when rotating from the first section SE1 to the junction (the third position P3) of the second section SE2, an area of the wavelength conversion material WM1 that is covered by the light spot SP formed by the excitation beam 50 gradually decreases. In this case, the light intensity of the first color light 60Y obtained through conversion by using the wavelength conversion material WM1 also gradually decreases from the first light intensity. In addition, because the widths of the wavelength conversion material WM1 in the first section SE1 and the second section SE2 are respectively fixed values, when the third position P3 completely passes through the transmission path of the excitation beam 50, the area of the wavelength conversion material WM1 that is covered by the light spot SP decreases to a particular value, and the light intensity of the first color light 60Y obtained through conversion by using the wavelength conversion material WM1 decreases to the second light intensity and then remains unchanged. On the contrary, when rotating from the second section SE2 to a junction (the fourth position P4) of the first section SE1, the area of the wavelength conversion material WM1 that is covered by the light spot SP formed by the excitation beam 50 gradually increases, and the light intensity of the first color light 60Y obtained through conversion by using the wavelength conversion material WM1 also increases from the second light intensity to the first light intensity and then remains unchanged. For example, in the embodiment, the ratio of the first light intensity to the second light intensity is greater than 110%.

Further, as shown in FIG. 1C to FIG. 1E, in the embodiment, based on changes in the area covered by the light spot SP, time periods may be divided as follows: A first time period T1 is a time period in which the light spot SP is completely located in the first section SE1, and does not cover the third position P3 or the fourth position P4 at all. A second time period T2 is a time period in which the light spot SP is completely located in the second section SE2, and does not cover the third position P3 or the fourth position P4 at all. A third time period T3 is a time period from a moment at which one end of the light spot SP starts to cover the third position P3 from the first section SE1 to a moment at which the other end of the light spot SP completely leaves the third position P3. A fourth time period T4 is a time period from a moment at which one end of the light spot SP starts to cover the fourth position P4 from the second section SE2 to a moment at which the other end of the light spot SP completely leaves the fourth position P4. In addition, as shown in FIG. 1C to FIG. 1E, the light intensity of the first color light 60Y throughout the first time period T1 is the first light intensity, and the light intensity of the first color light 60Y throughout the second time period T2 is the second light intensity. Therefore, in the embodiment, the first time sequence t1 may be any moment in the first time period T1, and the second time sequence t2 may be any moment in the second time period T2.

In this way, the wavelength conversion module 120 may adjust section ranges of the first section SE1 and the second section SE2 of the ring-shaped light irradiation region OL and the radial width of the wavelength conversion material WM1 of the ring-shaped light irradiation region OL, to respectively control ranges of the first time period T1 and the second time period T2 and light intensity values of the first color light 60Y and the second color light 60B therein.

Specifically, as shown in FIG. 1A, in the embodiment, because the excitation beam 50 is incident to the wavelength conversion material WM1 and the non-conversion region NT of the wavelength conversion module 120 at the same time, the first color light 60Y and the second color light 60B are emitted from the wavelength conversion module 120 at the same time. Subsequently, as shown in FIG. 1A, in the present embodiment, the wavelength conversion module 120 reflects the first color light 60Y back to the first color separation element 130, and the second color light 60B passes through the wavelength conversion module 120 and is then transmitted to the optical transmission module 140. Still further, in the present embodiment, a reflecting layer (not shown) may further be arranged between the wavelength conversion material WM1 and the ring-shaped light scattering layer 122. A radial width of the reflecting layer corresponds to the radial width of the wavelength conversion material WM1. The reflecting layer is configured to reflect the first color light 60Y back to the first color separation element 130. This is to be further described in the invention in other embodiments by way of example.

Specifically, as shown in FIG. 1A, in the embodiment, the optical transmission module 140 is located on the transmission path of the second color light 60B, and is configured to guide, to the first color separation element 130, the second color light 60B exiting from the wavelength conversion module 120. For example, in the embodiment, the optical transmission module 140 may include a plurality of reflective elements (not marked), to guide the second color light 60B back to the first color separation element 130, but the invention is not limited thereto.

Subsequently, as shown in FIG. 1A, in the embodiment, the lighting system 100A further includes an optical uniformization element 150, located on the transmission path of the first color light 60Y and the second color light 60B. When the first color light 60Y and the second color light 60B are transmitted to the first color separation element 130, because the first color separation element 130 reflects yellow light and allows blue light to pass through, the second color light 60B passes through the first color separation element 130, and after the first color light 60Y is reflected by the first color separation element 130, the optical uniformization element 150 receives the first color light 60Y and the second color light 60B from the first color separation element 130. In the embodiment, the optical uniformization element 150 is, for example, an integration rod, but the invention is not limited thereto. In this way, when the first color light 60Y and the second color light 60B from the wavelength conversion module 120 are transmitted to the optical uniformization element 150, the optical uniformization element 150 may uniformize the first color light 60Y and the second color light 60B and output them from the output an optical uniformization element 150 to form the illuminating beam 70, and the illuminating beam 70 is guided to the light valve LV.

Subsequently, as shown in FIG. 1A, in the embodiment, the light splitting and combining unit DC is located on the transmission path of the illuminating beam 70, and is configured to convert the illuminating beam 70 into a plurality of illuminating sub-beams 70R, 70G, and 70B. For example, as shown in FIG. 1A, the light splitting and combining unit DC may include a plurality of dichroic mirrors DM1 and DM2. When the illuminating beam 70 is transmitted to different dichroic mirrors DM1 and DM2, part of the first color light 60Y of the illuminating beam 70 can be sequentially divided into illuminating sub-beams 70R and 70G, part of the second color light 60B of the illuminating beam 70 can be divided into illuminating sub-beams 70B, and then the illuminating sub-beams 70B are respectively guided to subsequent corresponding light valves LV, namely, the light valves LV1, LV2, and LV3.

Specifically, as shown in FIG. 1A, in the embodiment, the light valves LV1, LV2, and LV3 are respectively located on the transmission path of the plurality of illuminating sub-beams 70R, 70G, and 70B, and are configured to convert the corresponding plurality of illuminating sub-beams 70R, 70G, and 70B into a plurality of image beams 80R, 80G, and 80B. In addition, the projection lens PL is located on the transmission path of the plurality of image beams 80R, 80G, and 80B, and is configured to combine the plurality of image beams 80R, 80G, and 80B into a projection beam 90 and project the projection beam 90 to a screen (not shown), to form an image picture. For example, because the illuminating sub-beams 70R, 70G, and 70B respectively converge on the corresponding light valves LV1, LV2, and LV3, the light valves LV1, LV2, and LV3 can convert the corresponding illuminating sub-beams 70R, 70G, and 70B into different image beams 80R, 80G, and 80B of different colors. These image beams 80R, 80G, and 80B from the light valves LV1, LV2, and LV3 are respectively transmitted to the projection lens PL through the light splitting and combining unit DC. Therefore, a projected image picture can become a color picture.

In addition, as described above, the wavelength conversion module 120 may adjust the section ranges of the first section SE1 and the second section SE2 of the ring-shaped light irradiation region OL and the radial width of the wavelength conversion material WM1, to respectively control the ranges of the first time period T1 and the second time period T2 and the light intensity values of the first color light 60Y and the second color light 60B therein. In addition, the light intensity value of the first color light 60Y corresponds to a light intensity value of the illuminating sub-beam 70G, and the light intensity value of the illuminating beam 70G corresponds to a light intensity value of the image beam 80G. Therefore, in the embodiment, the projection device 100 may adjust the section ranges of the first section SE1 and the second section SE2 of the ring-shaped light irradiation region OL of the wavelength conversion module 120 and the radial width of the wavelength conversion material WM1 to adjust light intensity values of the image beam 80G in different time periods. In this way, when the projection device 100 needs to display a dark picture, the projection device 100 may set the second section SE2 of the wavelength conversion module 120, to correspondingly reduce the light intensity value of the image beam 80G to a required value. In addition, because a human eye is much more sensitive to green than to red and blue, a bright spot in dithering noise in the dark picture becomes less visible due to the decrease in the light intensity value of the image beam 80G. Therefore, the dithering noise of the entire dark picture can be greatly reduced, thereby improving image quality and a visual perception of a user.

In addition, in the foregoing embodiment, the wavelength conversion module 120 with the ring-shaped light scattering layer 122 is illustrated as an example. However, in another embodiment, the arrangement of the ring-shaped light scattering layer 122 may alternatively be omitted. The following provides a further explanation in combination with FIG. 1F.

Figure 1F:
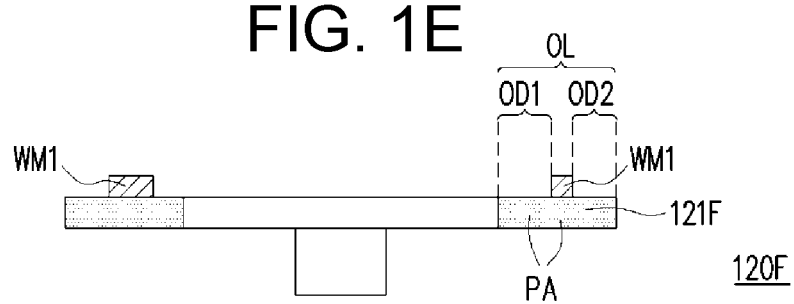
FIG. 1F is a schematic cross-sectional view of another wavelength conversion module in FIG. 1A.

FIG. 1F is a schematic cross-sectional view of another wavelength conversion module in FIG. 1A. In the embodiment, the wavelength conversion module 120F in FIG. 1F is similar to the wavelength conversion module 120 in FIG. 1B. Differences are as follows. Referring to FIG. 1F, in the embodiment, the wavelength conversion module 120F does not have the ring-shaped light scattering layer 122, but scattered particles PA are added to a substrate 121F, to form the first ring-shaped light scattering region OD1 and the second ring-shaped light scattering region OD2 of the wavelength conversion module 120F in a region surrounding the wavelength conversion material WM1 on the substrate 121F. The scattered particles PA may not need to be arranged in the entire substrate 121F, but may be arranged only in the substrate 121F corresponding to the first ring-shaped light scattering region OD1 and the second ring-shaped light scattering region OD2. In other words, as shown in FIG. 1F, the substrate 121F is a scattering substrate, and the first ring-shaped light scattering region OD1 and the second ring-shaped light scattering region OD2 are constituted by the substrate 121F. In addition, the wavelength conversion material WM1 surrounds the first ring-shaped light scattering region OD1 and is surrounded by the second ring-shaped light scattering region OD2. In this way, the second color light 60B formed by the second part of the excitation beam 50 may also pass through the substrate 121F and the first ring-shaped light scattering region OD1 and the second ring-shaped light scattering region OD2 constituted by the scattered particles PA in the substrate 121F, and is transmitted to a subsequent optical element.

In addition, in other embodiments, a reflecting layer may be alternatively arranged between the wavelength conversion material WM1 and the substrate 121, so that the wavelength conversion module can effectively reflect the first color light 60Y back to the first color separation element 130. The following provides a further explanation by using another embodiment as an example.

Figure 1G:
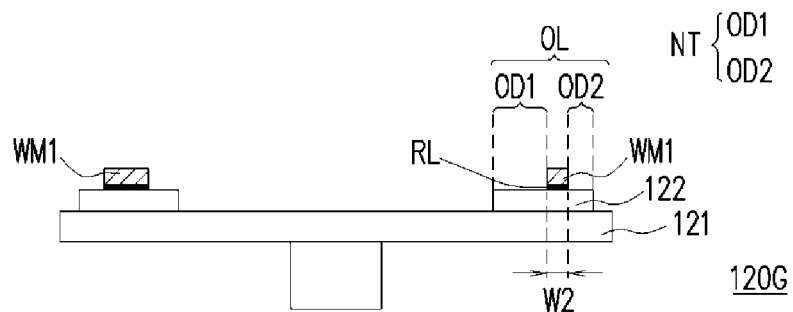
FIG. 1G is a schematic cross-sectional view of another wavelength conversion module in FIG. 1A.

FIG. 1G is a schematic cross-sectional view of another wavelength conversion module in FIG. 1A. In the embodiment, the wavelength conversion module 120G in FIG. 1G is similar to the wavelength conversion module 120 in FIG. 1B. Differences are as follows. Referring to FIG. 1G, in the embodiment, the wavelength conversion module 120G further includes a reflecting layer RL, and the reflecting layer RL is arranged between the wavelength conversion material WM1 and the substrate 121. In this way, after the first part of the excitation beam 50 is converted into the first color light 60Y, the first color light 60Y may be effectively reflected back to the first color separation element 130 by the reflecting layer RL. Still further, the reflecting layer RL is arranged between the wavelength conversion material WM1 and the ring-shaped light scattering layer 122, so that the first color light 60Y can be effectively reflected back to the first color separation element 130. The reflecting layer RL is arranged, for example, in a manner of coating. Moreover, the second color light 60B formed by the second part of the excitation beam 50 can still pass through the first ring-shaped light scattering region OD1 and the second ring-shaped light scattering region OD2 formed on the ring-shaped light scattering layer 122 and the substrate 121, and is transmitted to a subsequent optical element.

Figure 1H:
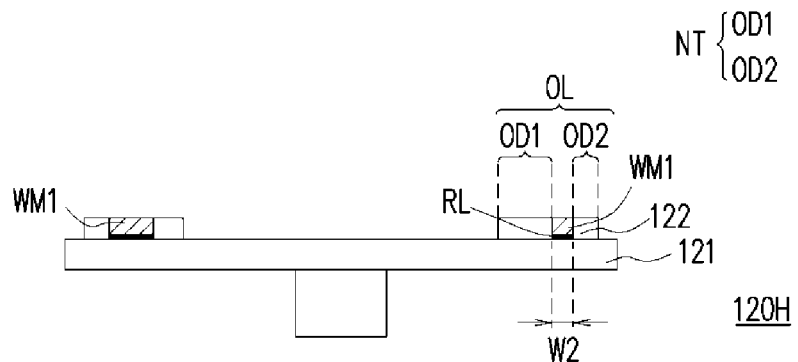
FIG. 1H is a schematic cross-sectional view of another wavelength conversion module in FIG. 1A.

FIG. 1H is a schematic cross-sectional view of another wavelength conversion module in FIG. 1A. In the embodiment, the wavelength conversion module 120H in FIG. 1H is similar to the wavelength conversion module 120G in FIG. 1G. Differences are as follows. Referring to FIG. 1H, in the embodiment, the wavelength conversion material WM1 of the wavelength conversion module 120H does not cover the ring-shaped light scattering layer 122, but is located between the first ring-shaped light scattering region OD1 and the second ring-shaped light scattering region OD2 formed on the ring-shaped light scattering layer 122. In other words, the wavelength conversion material WM1 of the wavelength conversion module 120H is located between the first ring-shaped light scattering region OD1 and the second ring-shaped light scattering region OD2 formed on the ring-shaped light scattering layer 122 in a radial direction from an axle center of the substrate 121 to an edge of the substrate 121. The reflecting layer RL is arranged between the wavelength conversion material WM1 and the substrate 121. In this way, the wavelength conversion module 120H may also set the reflecting layer RL, to enable the first part of the excitation beam 50 to be converted into the first color light 60Y, and then effectively reflected back to the first color separation element 130 by the reflecting layer RL. Moreover, the second color light 60B formed by the second part of the excitation beam 50 can still pass through the first ring-shaped light scattering region OD1 and the second ring-shaped light scattering region OD2 formed on the ring-shaped light scattering layer 122 and the substrate 121, and is transmitted to a subsequent optical element.

Figure 1I:
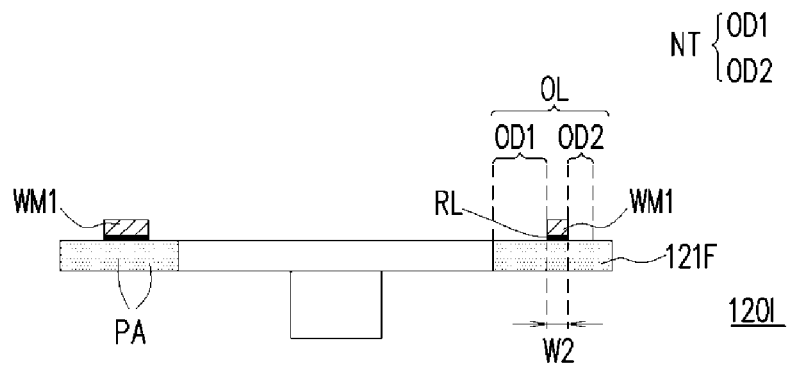
FIG. 1I is a schematic cross-sectional view of another wavelength conversion module in FIG. 1A.

FIG. 1I is a schematic cross-sectional view of another wavelength conversion module in FIG. 1A. In the embodiment, the wavelength conversion module 120I in FIG. 1I is similar to the wavelength conversion module 120G in FIG. 1G. Differences are as follows. Referring to FIG. 1I, in the embodiment, the wavelength conversion module 120I does not have the ring-shaped light scattering layer 122, but the scattered particles PA are added to the substrate 121F, to form the first ring-shaped light scattering region OD1 and the second ring-shaped light scattering region OD2 of the wavelength conversion module 120I in a region surrounding the wavelength conversion material WM1 on the substrate 121F. In other words, as shown in FIG. 1I, the first ring-shaped light scattering region OD1 and the second ring-shaped light scattering region OD2 are constituted by adding the scattered particles PA to the substrate 121F. In addition, the wavelength conversion material WM1 also surrounds the first ring-shaped light scattering region OD1 and is surrounded by the second ring-shaped light scattering region OD2. In this way, the wavelength conversion module 120I may also set the reflecting layer RL, to enable the first part of the excitation beam 50 to be converted into the first color light 60Y, and then effectively reflected back to the first color separation element 130 by the reflecting layer RL. In this way, the second color light 60B formed by the second part of the excitation beam 50 may also pass through the substrate 121F and the first ring-shaped light scattering region OD1 and the second ring-shaped light scattering region OD2 constituted by the scattered particles PA in the substrate 121F, and is transmitted to a subsequent optical element.

In this way, in the foregoing embodiments, because the wavelength conversion modules 120F, 120G, 120H, and 120I are similar to the wavelength conversion module 120 in FIG. 1B, same functions can be achieved. Therefore, the wavelength conversion modules 120F, 120G, 120H, and 120I can achieve effects and advantages similar to those of the wavelength conversion module 120, and the descriptions thereof are omitted herein. In addition, when being applied to the lighting system 100A and the projection device 100, the wavelength conversion modules 120F, 120G, 120H, and 120I can also enable the lighting system 100A and the projection device 100 to achieve similar effects and advantages, and the descriptions thereof are omitted herein.

Figure 2A:
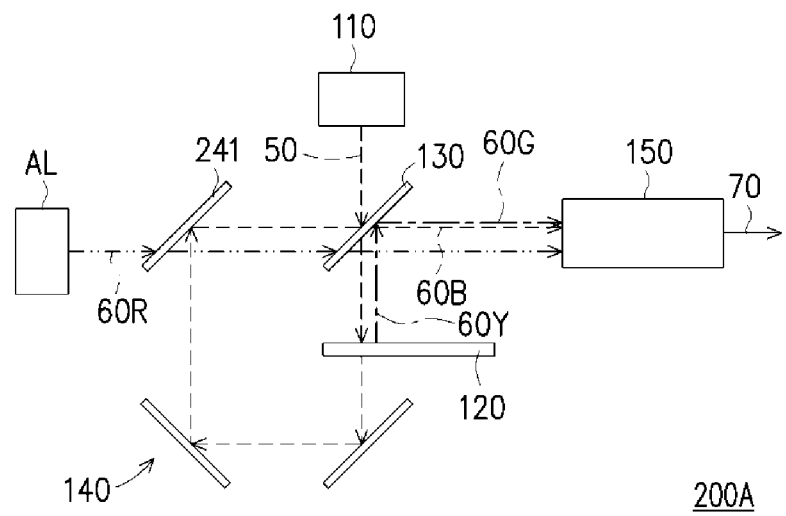
FIG. 2A to FIG. 3C are schematic architectural diagrams of various lighting systems in FIG. 1A.

FIG. 2A is a schematic architectural diagram of another lighting system in FIG. 1A. A lighting system 200A in FIG. 2A is similar to the lighting system 100A in FIG. 1A. Differences are as follows. In the embodiment, the lighting system 200A further includes an auxiliary light source AL. The auxiliary light source AL is configured to emit an auxiliary beam 60R, and a wave band of the auxiliary beam 60R at least partially overlaps a wave band of the first color light 60Y. For example, in the embodiment, the auxiliary light source AL is, for example, a red laser source or a red light-emitting diode light source, and the auxiliary beam 60R is red light.

Specifically, as shown in FIG. 2A, in the embodiment, the first color separation element 130 is, for example, a dichroic mirror with green-orange light reflection (DMGO), allows blue light and red light to pass through, and provides a reflection function on green-orange light. In addition, the optical transmission module 140 of the lighting system 200A includes a second color separation element 241, located on the transmission path of the second color light 60B and the auxiliary beam 60R. In the embodiment, the second color separation element 241 is, for example, a dichroic mirror with blue light reflection (DMB), allows red light to pass through, and provides a reflection function on blue light.

In this way, the excitation beam 50 of the excitation light source 110 can still be transmitted to the wavelength conversion module 120 by passing through the first color separation element 130. Moreover, the auxiliary beam 60R of the auxiliary light source AL may be transmitted to the first color separation element 130 by passing through the second color separation element 241, and the second color light 60B can still be transmitted to the first color separation element 130 by the optical transmission module 140. When the first color light 60Y from the wavelength conversion module 120 and the second color light 60B and the auxiliary beam 60R from the optical transmission module 140 are all transmitted to the first color separation element 130, the first color separation element 130 may allow the second color light 60B and the auxiliary beam 60R to pass through, reflect part of the first color light 60G, and then guide the auxiliary beam 60R, part of the first color light 60G, and the second color light 60B to the optical uniformization element 150. In the embodiment, part of the first color light 60Y (yellow light) is reflected by the first color separation element 130 to form part of the first color light 60G, for example, green light. Therefore, the auxiliary beam 60R, part of the first color light 60G, and the second color light 60B may be combined to form the illuminating beam 70 by the first color separation element 130 and the second color separation element 241.

In this way, based on the arrangement of the auxiliary light source AL, the lighting system 200A can increase a red light proportion in the illuminating beam 70, thereby improving red color performance in a projection picture. In addition, in the embodiment, because the lighting system 200A and the lighting system 100A in FIG. 1A are the same in the structure of the wavelength conversion module 120, the lighting system 200A can achieve effects and advantages similar to those of the lighting system 100A, and the descriptions thereof are omitted herein. In addition, when the lighting system 200A is applied to the projection device 100, the projection device 100 can also be enabled to achieve similar effects and advantages, and the descriptions thereof are omitted herein.

Figure 2B:
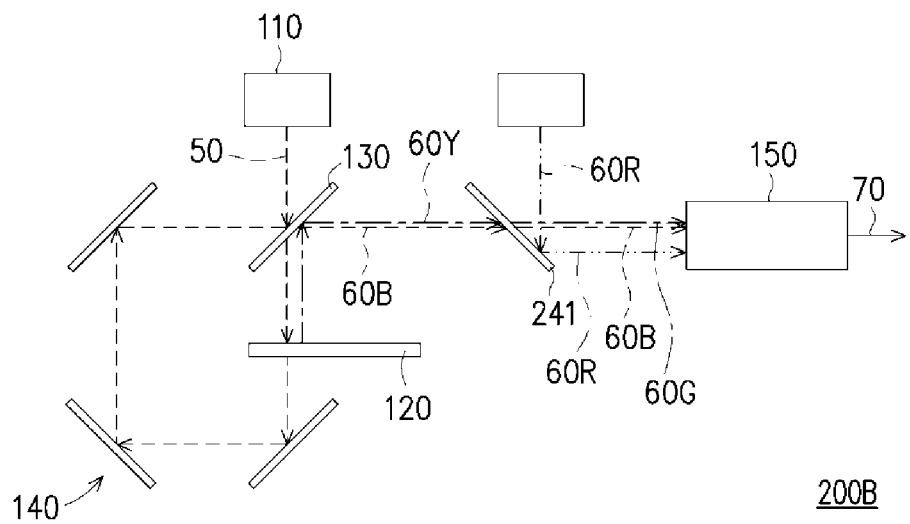

FIG. 2B is a schematic architectural diagram of another lighting system in FIG. 1A. A lighting system 200B in FIG. 2B is similar to the lighting system 200A in FIG. 2A. Differences are as follows. In the embodiment, the first color separation element 130 is, for example, a dichroic mirror with yellow light reflection (DMY), and the second color separation element 241 is located on the transmission path of the auxiliary beam 60R and the first color light 60Y and the second color light 60B from the first color separation element 130. In addition, in the embodiment, the second color separation element 241 is, for example, a dichroic mirror with red reflection (DMR), allows blue light and green light to pass through, and provides a reflection function on red light.

In this way, when the first color light 60Y, the second color light 60B, and the auxiliary beam 60R are transmitted to the second color separation element 241, the second color separation element 241 may allow part of the first color light 60G and the second color light 60B from the first color separation element 130 to pass through, reflect the auxiliary beam 60R from the auxiliary light source AL, and guide the auxiliary beam 60R, the part of the first color light 60G, and the second color light 60B to the optical uniformization element 150. Therefore, the auxiliary beam 60R, part of the first color light 60G, and the second color light 60B may be combined to form the illuminating beam 70 by the first color separation element 130 and the second color separation element 241.

In this way, based on the arrangement of the auxiliary light source AL, the lighting system 200B can increase a red light proportion in the illuminating beam 70, thereby improving red color performance in a projection picture. In addition, in the embodiment, because the lighting system 200B and the lighting system 100A in FIG. 1A are the same in the structure of the wavelength conversion module 120, the lighting system 200B can achieve effects and advantages similar to those of the lighting system 100A, and the descriptions thereof are omitted herein. In addition, when the lighting system 200B is applied to the projection device 100, the projection device 100 can also be enabled to achieve similar effects and advantages, and the descriptions thereof are omitted herein.

Figure 3A:
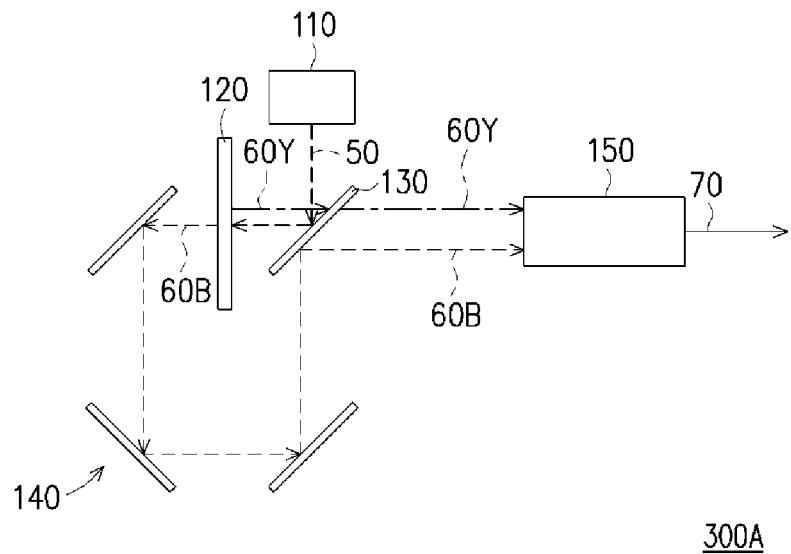

FIG. 3A is a schematic architectural diagram of another lighting system in FIG. 1A. A lighting system 300A in FIG. 3A is similar to the lighting system 100A in FIG. 1A. Differences are as follows. In the embodiment, the first color separation element 130 is, for example, a DMB, allows yellow light to pass through, and provides a reflection function on blue light. Therefore, as shown in FIG. 3A, the first color separation element 130 reflects a blue excitation beam 50, and the wavelength conversion module 120 may be arranged on the transmission path of the excitation beam 50 reflected by the first color separation element 130. In this way, the excitation beam 50 from the excitation light source 110 may be guided to the wavelength conversion module 120 by the first color separation element 130.

Moreover, as shown in FIG. 3A, when the first color light 60Y and the second color light 60B are guided to the first color separation element 130 again, because the first color separation element 130 reflects blue light and allows yellow light to pass through, the first color light 60Y passes through the first color separation element 130, and after the second color light 60B is reflected by the optical transmission module 140 and the first color separation element 130, both the first color light 60Y and the second color light 60B are transmitted to the optical uniformization element 150, so that the illuminating beam 70 can be formed.

In the embodiment, because the lighting system 300A and the lighting system 100A in FIG. 1A are the same in the structure of the wavelength conversion module 120, the lighting system 300A can achieve effects and advantages similar to those of the lighting system 100A, and the descriptions thereof are omitted herein. In addition, when the lighting system 300A is applied to the projection device 100, the projection device 100 can also be enabled to achieve similar effects and advantages, and the descriptions thereof are omitted herein.

Figure 3B:
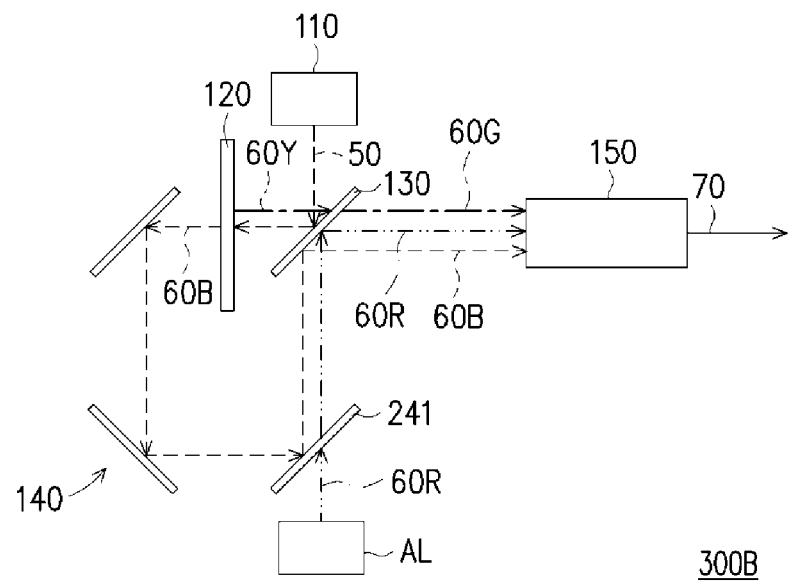

FIG. 3B is a schematic architectural diagram of another lighting system in FIG. 1A. A lighting system 300B in FIG. 3A is similar to the lighting system 300A in FIG. 3A. Differences are as follows. In the embodiment, the lighting system 300B further includes an auxiliary light source AL. The auxiliary light source AL is configured to emit an auxiliary beam 60R, and a wave band of the auxiliary beam 60R at least partially overlaps a wave band of the first color light 60Y. For example, in the present embodiment, the auxiliary beam 60R is red light.

Specifically, as shown in FIG. 3B, in the embodiment, the first color separation element 130 is, for example, a dichroic mirror with red-blue light reflection (DMRB), allows green light to pass through, and provides a reflection function on blue and red light. In addition, the optical transmission module 140 of the lighting system 300B includes a second color separation element 241. The second color separation element 241 is located on the transmission path of the second color light 60B and the auxiliary beam 60R. In the embodiment, the second color separation element 241 is, for example, a DMB, allows red light to pass through, and provides a reflection function on blue light.

In this way, the excitation beam 50 from the excitation light source 110 may still be guided to the wavelength conversion module 120 after being reflected by the first color separation element 130. Moreover, the auxiliary beam 60R of the auxiliary light source AL may be transmitted to the first color separation element 130 by passing through the second color separation element 241, and the second color light 60B can still be reflected to the first color separation element 130 by the optical transmission module 140. When the first color light 60Y from the wavelength conversion module 120 and the second color light 60B and the auxiliary beam 60R from the optical transmission module 140 are all guided to the first color separation element 130, the first color separation element 130 may allow part of the first color light 60G to pass through, reflect the second color light 60B and the auxiliary beam 60R, and then guide the auxiliary beam 60R, part of the first color light 60G, and the second color light 60B to the optical uniformization element 150. Therefore, the auxiliary beam 60R, part of the first color light 60G, and the second color light 60B may be combined by the first color separation element 130 and the second color separation element 241 and form the illuminating beam 70 after being uniformized by the optical uniformization element 150.

In this way, based on the arrangement of the auxiliary light source AL, the lighting system 300B can increase a red light proportion in the illuminating beam 70, thereby improving red color performance in a projection picture. In addition, in the present embodiment, because the lighting system 300B and the lighting system 100A in FIG. 1A are the same in the structure of the wavelength conversion module 120, the lighting system 300B can achieve effects and advantages similar to those of the lighting system 100A, and the descriptions thereof are omitted herein. In addition, when the lighting system 300B is applied to the projection device 100, the projection device 100 can also be enabled to achieve similar effects and advantages, and the descriptions thereof are omitted herein.

Figure 3C:
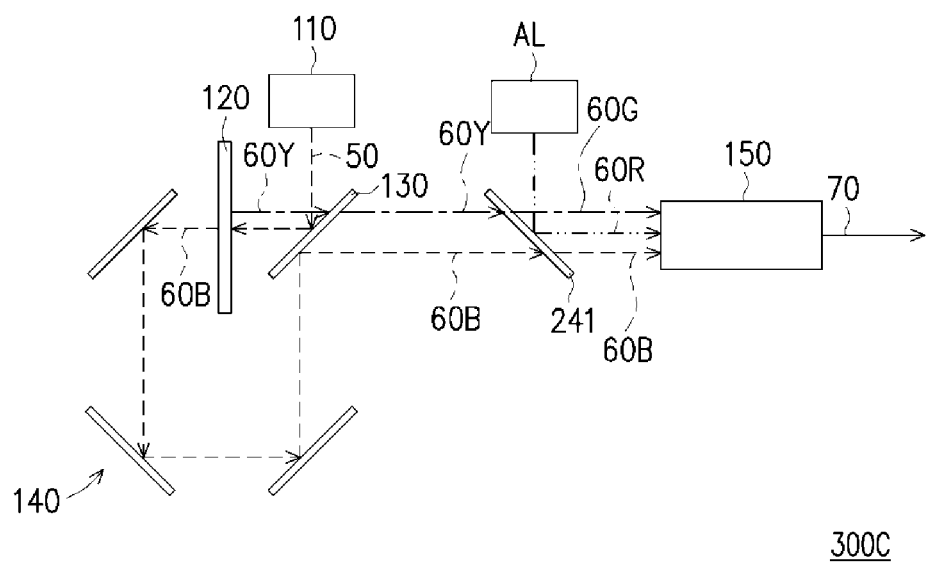

FIG. 3C is a schematic architectural diagram of another lighting system in FIG. 1A. A lighting system 300C in FIG. 3C is similar to the lighting system 300B in FIG. 3B. Differences are as follows. In the embodiment, the first color separation element 130 is, for example, a DMB, allows yellow light to pass through, and provides a reflection effect on blue light, and the second color separation element 241 is located on the transmission path of the auxiliary beam 60R and the first color light 60Y and the second color light 60B from the first color separation element 130. In addition, in the embodiment, the second color separation element 241 is, for example, a DMR, allows blue light and green light to pass through, and provides a reflection function on red light.

In this way, when the first color light 60Y, the second color light 60B, and the auxiliary beam 60R are guided to the second color separation element 241, the second color separation element 241 may allow part of the first color light 60G and the second color light 60B from the first color separation element 130 to pass through, reflect the auxiliary beam 60R from the auxiliary light source AL, and guide the auxiliary beam 60R, the part of the first color light 60G, and the second color light 60B to the optical uniformization element 150. Therefore, the auxiliary beam 60R, part of the first color light 60G, and the second color light 60B may be combined by the first color separation element 130 and the second color separation element 241 and form the illuminating beam 70 after being uniformized by the optical uniformization element 150.

In this way, based on the arrangement of the auxiliary light source AL, the lighting system 300C can increase a red light proportion in the illuminating beam 70, thereby improving red color performance in a projection picture. In addition, in the embodiment, because the lighting system 300C and the lighting system 100A in FIG. 1A are the same in the structure of the wavelength conversion module 120, the lighting system 300C can achieve effects and advantages similar to those of the lighting system 100A, and the descriptions thereof are omitted herein. In addition, when the lighting system 300C is applied to the projection device 100, the projection device 100 can also be enabled to achieve similar effects and advantages, and the descriptions thereof are omitted herein.

Figure 4A:
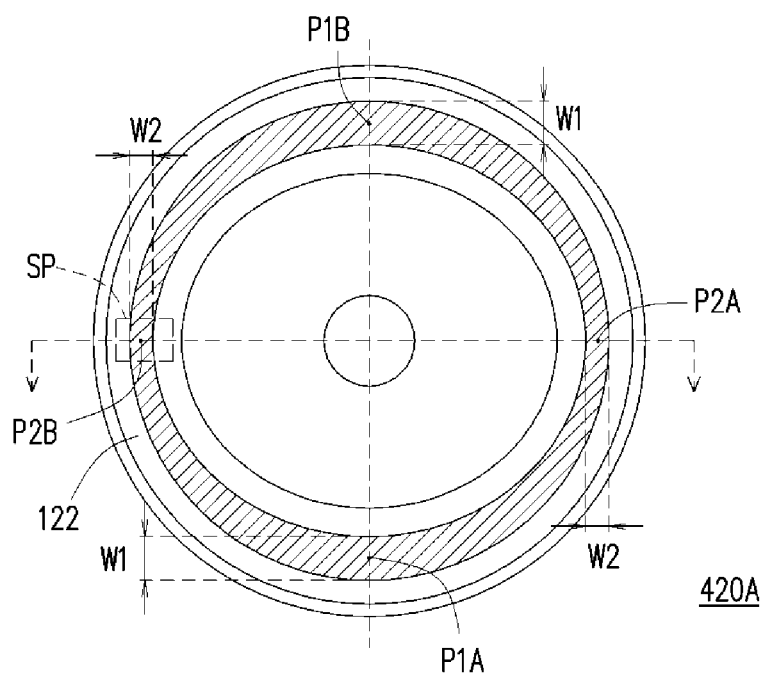
FIG. 4A is a schematic front view of another wavelength conversion module in FIG. 1A.
Figure 4B:
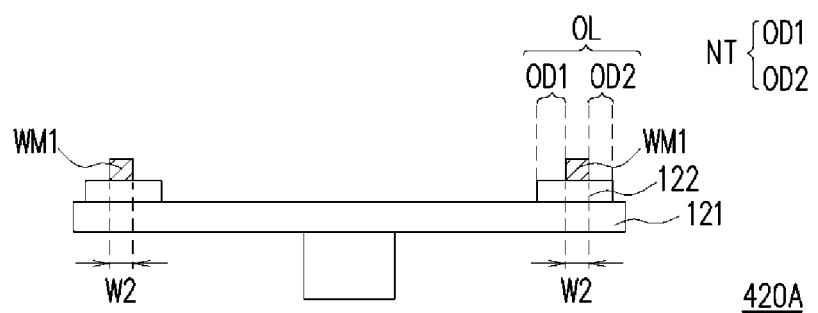
FIG. 4B is a schematic cross-sectional view of the wavelength conversion module in FIG. 4A.
Figure 4C:
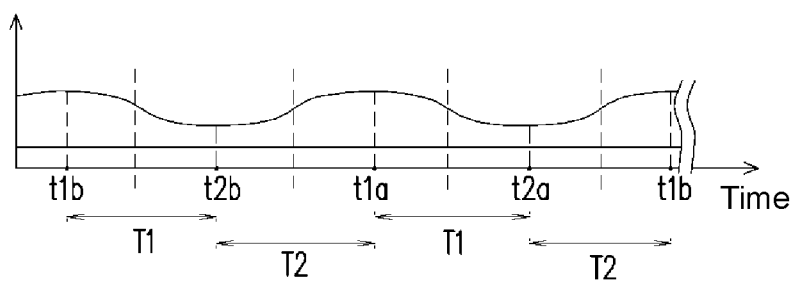
FIG. 4C is an intensity distribution diagram over time of a first color light obtained through conversion by the wavelength conversion module in FIG. 4A.
Figure 4D:
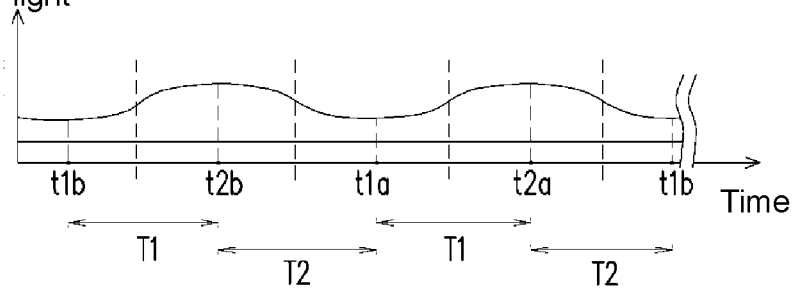
FIG. 4D is an intensity distribution diagram over time of a second color light formed by the wavelength conversion module in FIG. 4A.

FIG. 4A is a schematic front view of another wavelength conversion module in FIG. 1A. FIG. 4B is a schematic cross-sectional view of the wavelength conversion module in FIG. 4A. FIG. 4C is an intensity distribution diagram over time of a first color light obtained through conversion by the wavelength conversion module in FIG. 4A. FIG. 4D is an intensity distribution diagram over time of a second color light formed by the wavelength conversion module in FIG. 4A. In the present embodiment, the wavelength conversion module 420A in FIG. 4A is similar to the wavelength conversion module 120 in FIG. 1B. Differences are as follows. In the embodiment, the radial width of the wavelength conversion material WM1 of the ring-shaped light irradiation region OL to which the excitation beam 50 is incident changes periodically over time. For example, as shown in FIG. 4A, the ring-shaped light irradiation region OL has first positions P1A and P1B and second positions P2A and P2B. A width of the wavelength conversion material WM1 located in the first positions P1A and P1B is the first radial width W1, and a width of the wavelength conversion material WM1 located in the second positions P2A are P2B is the second radial width W2.

Specifically, as shown in FIG. 4A, in the embodiment, the first radial width W1 is greater than the second radial width W2. In addition, more specifically, as shown in FIG. 4A, in the embodiment, the first radial width W1 is essentially the maximum radial width of the wavelength conversion material WM1, and the second radial width W2 is essentially the minimum radial width of the wavelength conversion material WM1. In other words, in the embodiment, when moving from a first position P1A (or a first position P1B) to a second position P2A (or a second position P2B), the radial width of the wavelength conversion material WM1 of the ring-shaped light irradiation region OL gradually decreases, and when moving from the second position P2A (or the second position P2B) to the first position P1B (or the first position P1A), the radial width of the wavelength conversion material WM1 of the ring-shaped light irradiation region OL gradually increases. In addition, in the present embodiment, the ratio of the first radial width W1 to the second radial width W2 is also greater than 110%.

Moreover, as shown in FIG. 4C, in the embodiment, the first color light 60Y obtained through conversion when the excitation beam 50 is incident to the wavelength conversion material WM1 of the ring-shaped light irradiation region OL in a first time sequence t1a or t1b has a first light intensity. The first color light 60Y obtained through conversion when the excitation beam 50 is incident to the wavelength conversion material WM1 of the ring-shaped light irradiation region OL in a second time sequence t2a or t2b has a second light intensity, and the first light intensity and the second light intensity are different. In addition, in the embodiment, the first light intensity is the maximum light intensity of the first color light 60Y in all time periods, and the second light intensity is the minimum light intensity of the first color light 60Y in all the time periods. For example, in the embodiment, the ratio of the first light intensity to the second light intensity is also greater than 110%.

More specifically, as shown in FIG. 4A, FIG. 4B, and FIG. 4C, in the embodiment, because the first radial width W1 is greater than the second radial width W2, the first radial width W1 is essentially the maximum radial width, and the second radial width W2 is essentially the minimum radial width, an area of the wavelength conversion material WM1 that is covered by a light spot SP generated when the excitation beam 50 is incident to the first position P1A or P1B in the ring-shaped light irradiation region OL is essentially a maximum covered area of the wavelength conversion material WM1, and an area of the wavelength conversion material WM1 that is covered by a light spot SP generated when the excitation beam 50 is incident to the second position P2A or P2B in the ring-shaped light irradiation region OL is essentially a minimum covered area of the wavelength conversion material WM1. In other words, a light intensity of the light spot SP generated when the excitation beam 50 is incident to the first position P1A or P1B in the ring-shaped light irradiation region OL is the first light intensity, and a light intensity of the light spot SP generated when the excitation beam 50 is incident to the second position P2A or P2B in the ring-shaped light irradiation region OL is the second light intensity. In other words, in the embodiment, the excitation beam 50 is incident to the ring-shaped light irradiation region OL in the first positions P1A and P1B respectively in the first time sequences t1a and t1b, and the excitation beam 50 is incident to the ring-shaped light irradiation region OL in the second positions P2A and P2B respectively in the second time sequences t2a and t2b.

Moreover, as shown in FIG. 4A, FIG. 4B, and FIG. 4D, correspondingly, in the embodiment, an area of the non-conversion region NT that is covered by the light spot SP generated when the excitation beam 50 is incident to the first position P1A or P1B in the ring-shaped light irradiation region OL in the first time sequence t1a or t1b is less than an area of the non-conversion region NT that is covered by the light spot SP generated when the excitation beam 50 is incident to the second position P2A or P2B in the ring-shaped light irradiation region OL in the second time sequence t2a or t2b. Therefore, the light intensity of the second color light 60B generated when the excitation beam 50 is incident to the first position P1A or P1B in the ring-shaped light irradiation region OL in the first time sequence t1a or t1b is less than that of the second color light 60B generated when the excitation beam 50 is incident to the second position P2A or P2B in the ring-shaped light irradiation region OL in the second time sequence t2a or t2b.

Further, as shown in FIG. 4A, FIG. 4B, and FIG. 4C, in the embodiment, because the radial width of the wavelength conversion material WM1 of the ring-shaped light irradiation region OL to which the excitation beam 50 is incident is not a fixed value, based on changes in the area covered by the light spot SP formed by the excitation beam 50 in the ring-shaped light irradiation region OL, moments and time periods can be more accurately divided as follows: The first time sequences t1a and t1b are respectively moments at which the excitation beam 50 is incident to the ring-shaped light irradiation region OL and a center of the generated light spot SP covers the first positions P1A and P1B. The second time sequences t2a and t2b are respectively moments at which the excitation beam 50 is incident to the ring-shaped light irradiation region OL and a center of the generated light spot SP covers the second positions P2A and P2B. The first time period T1 is a time period from the first time sequence t1a to the second time sequence t2a or a time period from the first time sequence t1b to the second time sequence t2b. The second time period T2 is a time period from the second time sequence t2a to the first time sequence t1b or a time period from the second time sequence t2b to the first time sequence t1a.

In addition, more specifically, as shown in FIG. 4A, FIG. 4B, and FIG. 4C, because when the wavelength conversion module 420A rotates, the radial width of the wavelength conversion material WM1 of the ring-shaped light irradiation region OL to which the excitation beam 50 is incident periodically changes over time, the light intensity of the first color light 60Y obtained through conversion by using the wavelength conversion material WM1 also periodically changes over time. Therefore, in the first time period T1, that is, when the center of the light spot SP of the excitation beam 50 moves from the first position P1A (or the first position P1B) to the second position P2A (or the second position P2B), the radial width of the wavelength conversion material WM1 of the ring-shaped light irradiation region OL gradually decreases from the first radial width W1 to the second radial width W2, and the area of the wavelength conversion material WM1 that is covered by the light spot SP also gradually decreases. In this case, the light intensity value of the first color light 60Y obtained through conversion by using the wavelength conversion material WM1 also gradually decreases from the first light intensity to the second light intensity. Therefore, in the second time period T2, that is, when the center of the light spot SP of the excitation beam 50 moves from the second position P2A (or the second position P2B) to the first position P1B (or the first position P1A), the radial width of the wavelength conversion material WM1 of the ring-shaped light irradiation region OL gradually increases from the second radial width W2 to the first radial width W1, and the area of the wavelength conversion material WM1 that is covered by the light spot SP also gradually increases. In this case, the light intensity of the first color light 60Y obtained through conversion by using the wavelength conversion material WM1 also gradually increases from the second light intensity to the first light intensity.

In this way, the wavelength conversion module 420A may adjust the first positions P1A and P1B and the second positions P2A and P2B of the ring-shaped light irradiation region OL and change the radial width of the wavelength conversion material WM1 of the ring-shaped light irradiation region OL, to respectively control ranges of the first time period T1 and the second time period T2 and light intensity values of the first color light 60Y and the second color light 60B therein.

In this way, when the wavelength conversion module 420A is applied to the projection device 100, the first positions P1A and P1B and the second positions P2A and P2B of the ring-shaped light irradiation region OL may be adjusted and the radial width of the wavelength conversion material WM1 of the ring-shaped light irradiation region OL may be changed, to adjust the light intensity values of the image beam 80G in different time periods. In this way, when the projection device 100 needs to display a dark picture, the radial width of the wavelength conversion module 120 (the wavelength conversion module 420A) in the first time period T1 may be changed to a required value, to correspondingly reduce the light intensity value of the image beam 80G to a required value. In addition, because a human eye is much more sensitive to green than to red and blue, a bright spot in dithering noise in the dark picture becomes less visible due to the decrease in the light intensity value of the image beam 80G. Therefore, the dithering noise of the entire dark picture can be greatly reduced, thereby improving image quality and a visual perception of a user.

In this way, in the embodiment, the wavelength conversion module 420A can achieve functions similar to those of the wavelength conversion module 120 in FIG. 1B. Therefore, the wavelength conversion module 420A can achieve effects and advantages similar to those of the wavelength conversion module 120, and the descriptions thereof are omitted herein. In addition, when the wavelength conversion module 420A is applied to the lighting systems 100A, 200A, 200B, 300A, 300B, and 300C and the projection device 100, the lighting systems 100A, 200A, 200B, 300A, 300B, and 300C and the projection device 100 can also be enabled to achieve similar effects and advantages, and the descriptions thereof are omitted herein.

Figure 4E:
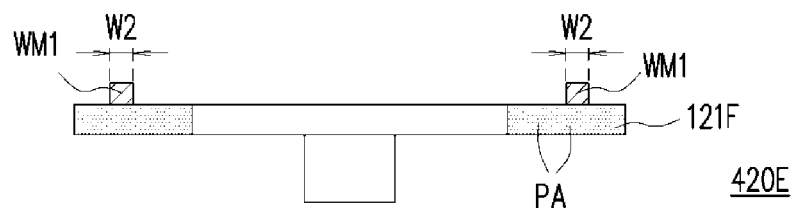
FIG. 4E is a schematic cross-sectional view of another wavelength conversion module in FIG. 4A.

FIG. 4E is a schematic cross-sectional view of another wavelength conversion module in FIG. 4A. In the embodiment, the wavelength conversion module 420E in FIG. 4E is similar to the wavelength conversion module 420 in FIG. 4C. Differences are as follows. In the embodiment, the substrate 121F of the wavelength conversion module 420E is a scattering substrate, and the wavelength conversion material WM1 is directly arranged on the substrate 121F.

In this way, when the excitation beam 50 is incident to the wavelength conversion module 420E, the wavelength conversion module 420E causes the first part of the excitation beam 50 to be converted into the first color light 60Y and causes the second part of the excitation beam 50 to form the second color light 60B, to achieve effects and advantages similar to those of the wavelength conversion module 420, and the descriptions thereof are omitted herein. In addition, when the wavelength conversion module 420E is applied to the lighting systems 100A, 200A, 200B, 300A, 300B, and 300C and the projection device 100, the lighting systems 100A, 200A, 200B, 300A, 300B, and 300C and the projection device 100 can also be enabled to achieve similar effects and advantages, and the descriptions thereof are omitted herein.

Figure 4F:
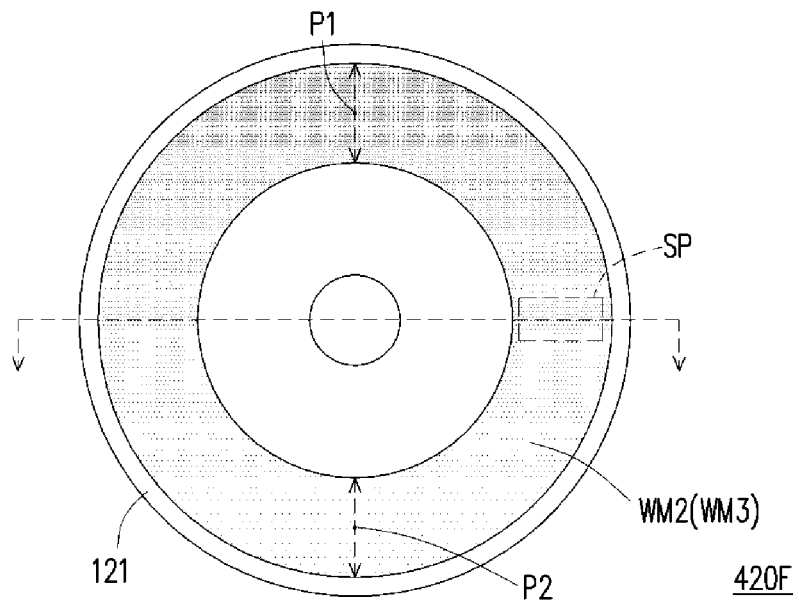
FIG. 4F is a schematic front view of another wavelength conversion module in FIG. 1A.
Figure 4G:
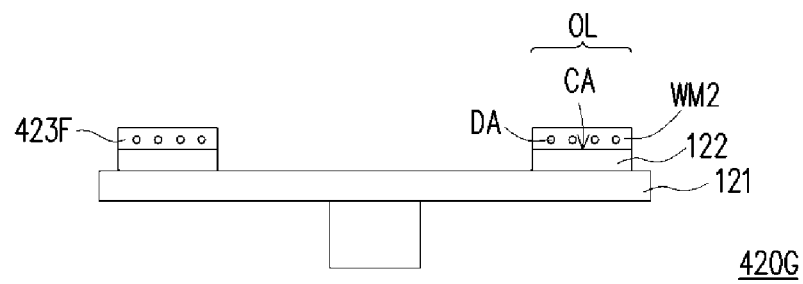
FIG. 4G to FIG. 4J are schematic cross-sectional views of various wavelength conversion modules in FIG. 4F.

FIG. 4F is a schematic front view of another wavelength conversion module in FIG. 1A. FIG. 4G is a schematic cross-sectional view of the wavelength conversion module in FIG. 4F. In the present embodiment, the wavelength conversion module 420F in FIG. 4F is similar to the wavelength conversion module 120 in FIG. 1B. Differences are as follows. In the embodiment, the wavelength conversion material WM2 arranged on the wavelength conversion module 420F constitutes a plurality of dotted microstructures DA, so that part of the excitation beam 50 from the excitation light source 110 can be converted into the first color light 60Y.

For example, as shown in FIG. 4G, gaps CA not arranged with the wavelength conversion material WM2 exist between the plurality of dotted microstructures DA, the wavelength conversion material WM2 and a plurality of gaps CA constitute a light-active layer 423F, and the light-active layer 423F is arranged corresponding to the ring-shaped light irradiation region OL. When the excitation beam 50 is incident to the light-active layer 423F, part of the excitation beam 50 is converted by these dotted microstructures DA into the first color light 60Y. These gaps CA correspond to the non-conversion region NT of the wavelength conversion module 420F. In addition, after another part of the excitation beam 50 passes through the non-conversion region NT (these gaps CA), the second color light 60B exits from the substrate 121 located in the non-conversion region NT or the ring-shaped light scattering layer 122.

In this way, based on the arrangement of the light-active layer 423F of the ring-shaped light irradiation region OL, the wavelength conversion module 420F can cause the first part of the excitation beam 50 from the same excitation light source 110 to be converted into the first color light 60Y and cause the second part to form the second color light 60B. For example, a value of a ratio of the second part of the excitation beam 50 that is incident to the ring-shaped light irradiation region OL to the excitation beam 50 that is incident to the ring-shaped light irradiation region OL ranges from 5% to 30%. It should be noted that, the value range herein is only used for exemplary description, and is not used to limit the invention.

Further, as shown in FIG. 4F and FIG. 4G, in the embodiment, radial widths of the light-active layer 423F throughout the ring-shaped light irradiation region OL are consistent, but in the embodiment, volume percentages for which the plurality of dotted microstructures DA of the light-active layer 423F in the positions of the ring-shaped light irradiation region OL accounts in the light-active layer 423F are inconsistent. For example, as shown in FIG. 4F and FIG. 4G, the ring-shaped light irradiation region OL has the first position P1 and the second position P2, where a volume percentage for which the plurality of dotted microstructures DA located in the first position P1 accounts in the light-active layer 423F is a first volume ratio, and a volume percentage for which the plurality of dotted microstructures DA located in the second position P2 accounts in the light-active layer 423F is a second volume ratio. The first volume ratio and the second volume ratio are different. In other words, the volume percentage for which the plurality of dotted microstructures DA in the light-active layer 423F of the ring-shaped light irradiation region OL to which the excitation beam 50 is incident accounts in the light-active layer 423F periodically changes over time. In this way, when the excitation beam 50 is incident to different positions in the ring-shaped light irradiation region OL, the light intensity of the first color light 60Y obtained through conversion by using the plurality of dotted microstructures DA also periodically changes over time.

Further, in the embodiment, the first volume ratio is essentially a maximum volume percentage for which the plurality of dotted microstructures DA accounts in the light-active layer 423F, and the second volume ratio is essentially a minimum volume percentage for which the plurality of dotted microstructures DA accounts in the light-active layer 423F. In other words, in the embodiment, when moving from the first position P1 to the second position P2, the volume percentage for which the plurality of dotted microstructures DA in the light-active layer 423F accounts in the light-active layer 423F gradually decreases, and when moving from the second position P2 to the first position P1, the volume percentage for which the plurality of dotted microstructures DA in the light-active layer 423F accounts in the light-active layer 423F gradually increases. In addition, in the embodiment, the ratio of the first volume ratio to the second volume ratio is greater than 110%.

In this way, assuming that the first time sequence is a moment at which the excitation beam 50 is incident to the ring-shaped light irradiation region OL and a center of the formed light spot SP covers the first position P1, and the first color light 60Y obtained through conversion when the excitation beam 50 is incident to the wavelength conversion material WM2 of the ring-shaped light irradiation region OL in the first time sequence has a first light intensity, the first light intensity is the maximum light intensity of the first color light 60Y in all time periods. Correspondingly, assuming that the second time sequence is a moment at which the excitation beam 50 is incident to the ring-shaped light irradiation region OL and the center of the formed light spot SP covers the second position P2, and the first color light 60Y obtained through conversion when the excitation beam 50 is incident to the wavelength conversion material WM2 of the ring-shaped light irradiation region OL in the second time sequence has a second light intensity, the second light intensity is the minimum light intensity of the first color light 60Y in all the time periods. For example, in the embodiment, the ratio of the first light intensity to the second light intensity is also greater than 110%.

Still further, it is assumed that the first time period is a time period from the first time sequence to the second time sequence, and the second time period is a time period from the second time sequence to the first time sequence. In the first time period, that is, when the center of the light spot SP of the excitation beam 50 moves from the first position P1 to the second position P2, the volume percentage for which the plurality of dotted microstructures DA of the light-active layer 423F accounts in the light-active layer 423F gradually decreases from the first volume ratio to the second volume ratio. In this case, the light intensity value of the first color light 60Y obtained through conversion by using the dotted microstructures DA also gradually decreases from the first light intensity to the second light intensity. In the second time period, that is, when the center of the light spot SP of the excitation beam 50 moves from the second position P2 to the first position P1, the volume percentage for which the plurality of dotted microstructures DA of the light-active layer 423F accounts in the light-active layer 423F gradually increases from the second volume ratio gradually to the first volume ratio. In this case, the light intensity of the first color light 60Y obtained through conversion by using the dotted microstructures DA also gradually increases from the second light intensity to the first light intensity.

In this way, the wavelength conversion module 420F may adjust the first position P1 and the second position P2 of the ring-shaped light irradiation region OL and change the volume percentage for which the plurality of dotted microstructures DA accounts in the light-active layer 423F, to respectively control moments of the first time sequence and the second time sequence, ranges of the first time period and the second time period, and light intensity values of the first color light 60Y and the second color light 60B therein.

In this way, when the wavelength conversion module 420F is applied to the projection device 100, the first position P1 and the second position P2 of the ring-shaped light irradiation region OL may be adjusted and the volume percentage for which the plurality of dotted microstructures DA accounts in the light-active layer 423F may be changed, to adjust the light intensity values of the image beam 80G in different time periods. In this way, when the projection device 100 needs to display a dark picture, the volume percentage for which the plurality of dotted microstructures DA located in the second position P2 or located near the second position P2 in the wavelength conversion module 420F accounts in the light-active layer 423F may be designed to be a required value, to correspondingly reduce the light intensity value of the image beam 80G to the required value. In addition, because a human eye is much more sensitive to green than to red and blue, a bright spot in dithering noise in the dark picture becomes less visible due to the decrease in the light intensity value of the image beam 80G. Therefore, the dithering noise of the entire dark picture can be greatly reduced, thereby improving image quality and a visual perception of a user.

In this way, in the embodiment, the wavelength conversion module 420F can achieve functions similar to those of the wavelength conversion module 120 in FIG. 1B. Therefore, the wavelength conversion module 420F can achieve effects and advantages similar to those of the wavelength conversion module 120, and the descriptions thereof are omitted herein. In addition, when the wavelength conversion module 420F is applied to the lighting systems 100A, 200A, 200B, 300A, 300B, and 300C and the projection device 100, the lighting systems 100A, 200A, 200B, 300A, 300B, and 300C and the projection device 100 can also be enabled to achieve similar effects and advantages, and the descriptions thereof are omitted herein.

Figure 4H:
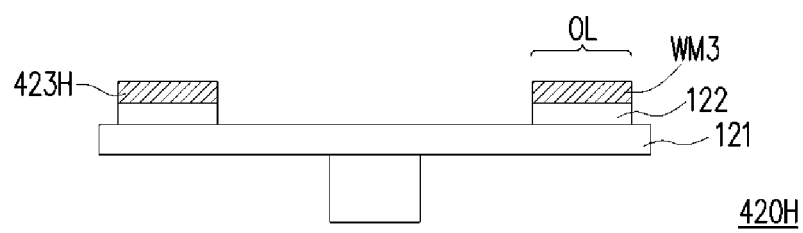

FIG. 4H is a schematic cross-sectional view of another wavelength conversion module in FIG. 4F. In the embodiment, the wavelength conversion module 420H in FIG. 4H is similar to the wavelength conversion module 420F in FIG. 4F. Differences are as follows. A wavelength conversion material WM3 constitutes a light-active layer 423H and is arranged corresponding to the ring-shaped light irradiation region OL, where when the light-active layer 423H satisfies a light conversion condition, the second part of the excitation beam is incident to the ring-shaped light irradiation region OL to form the second color light, and the light conversion condition is that a volumetric concentration of the wavelength conversion material WM3 in the light-active layer 423H ranges from 30% to 85%, or a thickness of the light-active layer 423H ranges from 0.03 millimeter to 0.3 millimeter. It should be noted that, the value range herein is only used for exemplary description, and is not used to limit the invention.

In this way, based on the arrangement of the ring-shaped light irradiation region OL, the wavelength conversion module 420H can cause the first part of the excitation beam 50 from the same excitation light source 110 to be converted into the first color light 60Y and cause the second part to form the second color light 60B. For example, in the embodiment, a value of a ratio of the second part of the excitation beam 50 that is incident to the ring-shaped light irradiation region OL to the excitation beam 50 that is incident to the ring-shaped light irradiation region OL ranges from 5% to 30%. It should be noted that, the value range herein is only used for exemplary description, and is not used to limit the invention.

Further, as shown in FIG. 4 H, in the embodiment, radial widths of the light-active layer 423H in the positions of the ring-shaped light irradiation region OL are consistent, but volumetric concentrations or thicknesses of the wavelength conversion material WM3 of the light-active layer 423H throughout the ring-shaped light irradiation region OL are inconsistent. For example, as shown in FIG. 4F and FIG. 4 H, the ring-shaped light irradiation region OL has the first position P1 and the second position P2, where the volumetric concentration of the wavelength conversion material WM3 in the first position P1 is a first volumetric concentration, or a thickness of the wavelength conversion material WM3 in the first position P1 is a first thickness, and the volumetric concentration of the wavelength conversion material WM3 in the second position P2 is a second volumetric concentration, or a thickness of the wavelength conversion material WM3 in the second position P2 is a second thickness. In the embodiment, the first volumetric concentration and the second volumetric concentration are different, or the first thickness and the second thickness are different. In other words, in the embodiment, the volumetric concentration or the thickness of the wavelength conversion material WM3 in the light-active layer 423H of the ring-shaped light irradiation region OL to which the light spot SP of the excitation beam 50 is incident periodically changes over time. In this way, when the light spot SP of the excitation beam 50 is incident to different positions in the ring-shaped light irradiation region OL, the light intensity of the first color light 60Y obtained through conversion by using the wavelength conversion material WM3 also periodically changes over time.

Further, in the embodiment, the first volumetric concentration is essentially a maximum volumetric concentration of the wavelength conversion material WM3, the second volumetric concentration is essentially a minimum volumetric concentration of the wavelength conversion material WM3, the first thickness is essentially maximum thickness of the wavelength conversion material WM3, and the second thickness is essentially minimum thickness of the wavelength conversion material WM3. In other words, in the present embodiment, when moving from the first position P1 to the second position P2, the volumetric concentration or the thickness of the wavelength conversion material WM3 of the light-active layer 423H gradually decreases, and when moving from the second position P2 to the first position P1, the volumetric concentration or the thickness of the wavelength conversion material WM3 of the light-active layer 423H gradually increases. In addition, in the embodiment, a ratio of the first volumetric concentration to the second volumetric concentration is greater than 120%, and a ratio of the first thickness to the second thickness is greater than 110%.

In this way, assuming that the first time sequence is a moment at which the excitation beam 50 is incident to the ring-shaped light irradiation region OL and a center of the formed light spot SP covers the first position P1, and the first color light 60Y obtained through conversion when the excitation beam 50 is incident to the wavelength conversion material WM3 of the ring-shaped light irradiation region OL in the first time sequence has a first light intensity, the first light intensity is the maximum light intensity of the first color light 60Y in all time periods. Correspondingly, assuming that the second time sequence is a moment at which the excitation beam 50 is incident to the ring-shaped light irradiation region OL and the center of the formed light spot SP covers the second position P2, and the first color light 60Y obtained through conversion when the excitation beam 50 is incident to the wavelength conversion material WM3 of the ring-shaped light irradiation region OL in the second time sequence has a second light intensity, the second light intensity is the minimum light intensity of the first color light 60Y in all the time periods. For example, in the embodiment, the ratio of the first light intensity to the second light intensity is also greater than 110%.

Still further, it is assumed that the first time period is a time period from the first time sequence to the second time sequence, and the second time period is a time period from the second time sequence to the first time sequence. In this case, in the first time period, that is, when the center of the light spot SP of the excitation beam 50 moves from the first position P1 to the second position P2, the volumetric concentration of the wavelength conversion material WM3 of the light-active layer 423H gradually decreases from the first volumetric concentration to the second volumetric concentration, or the thickness of the wavelength conversion material WM3 of the light-active layer 423H gradually decreases from the first thickness to the second thickness. In this case, the light intensity value of the first color light 60Y obtained through conversion by using the wavelength conversion material WM3 also gradually decreases from the first light intensity to the second light intensity. In the second time period, that is, when the center of the light spot SP of the excitation beam 50 moves from the second position P2 to the first position P1, the volumetric concentration of the wavelength conversion material WM3 of the light-active layer 423H gradually increases from the second volumetric concentration to the first volumetric concentration, or the thickness of the wavelength conversion material WM3 of the light-active layer 423H gradually increases from the second thickness to the first thickness. In this case, the light intensity of the first color light 60Y obtained through conversion by using the wavelength conversion material WM3 also gradually increases from the second light intensity to the first light intensity.

In this way, the wavelength conversion module 420H may adjust the first position P1 and the second position P2 of the ring-shaped light irradiation region OL and change the volumetric concentration or the thickness, to respectively control moments of the first time sequence and the second time sequence, ranges of the first time period and the second time period, and light intensity values of the first color light 60Y and the second color light 60B therein.

In this way, when the wavelength conversion module 420H is applied to the projection device 100, the first position P1 and the second position P2 in the ring-shaped light irradiation region OL of the wavelength conversion module 120 (the wavelength conversion module 420H) may be adjusted and the volumetric concentration or the thickness may be changed, to adjust light intensity values of the image beam 80G in different time periods. In this way, when the projection device 100 needs to display a dark picture, the volumetric concentration or the thickness of the wavelength conversion material WM3 located in the second position P2 or located near the second position P2 in the wavelength conversion module 420F may be designed to be a required value, to correspondingly reduce the light intensity value of the image beam 80G to the required value. In addition, because a human eye is much more sensitive to green than to red and blue, a bright spot in dithering noise in the dark picture becomes less visible due to the decrease in the light intensity value of the image beam 80G. Therefore, the dithering noise of the entire dark picture can be greatly reduced, thereby improving image quality and a visual perception of a user.

In this way, in the embodiment, the wavelength conversion module 420H can achieve functions similar to those of the wavelength conversion module 120 in FIG. 1B. Therefore, the wavelength conversion module 420H can achieve effects and advantages similar to those of the wavelength conversion module 120, and the descriptions thereof are omitted herein. In addition, when the wavelength conversion module 420H is applied to the lighting systems 100A, 200A, 200B, 300A, 300B, and 300C and the projection device 100, the lighting systems 100A, 200A, 200B, 300A, 300B, and 300C and the projection device 100 can also be enabled to achieve similar effects and advantages, and the descriptions thereof are omitted herein.

Figure 4I:
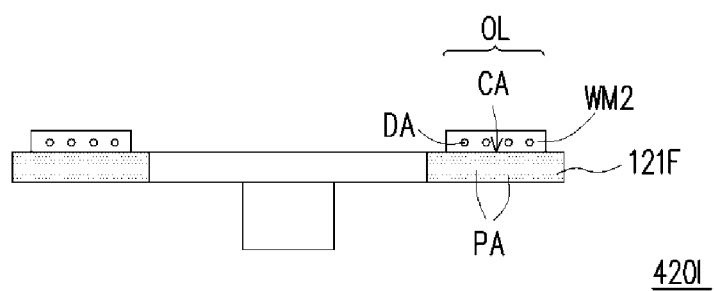
Figure 4J:
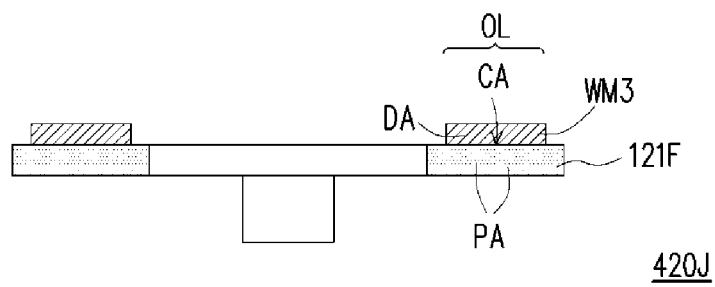

FIG. 4I is a schematic front view of another wavelength conversion module in FIG. 4F. FIG. 4J is a schematic cross-sectional view of another wavelength conversion module in FIG. 4F. The wavelength conversion modules 420I and 420J in FIG. 4I and FIG. 4J are respectively similar to the wavelength conversion modules 420G and 420H in FIG. 4G and FIG. 4H, and differences are as follows. In the embodiment, the substrate 121F of the wavelength conversion module 420I or 420J is a scattering substrate, and the wavelength conversion material WM2 (or the wavelength conversion material WM3) is directly arranged on the substrate 121F.

In this way, when the excitation beam 50 is incident to the wavelength conversion module 420I or 420J, the wavelength conversion module 420I or 420J causes the first part of the excitation beam 50 to be converted into the first color light 60Y and causes the second part of the excitation beam 50 to form the second color light 60B, to achieve effects and advantages similar to those of the wavelength conversion module 420G or 420H, and the descriptions thereof are omitted herein. In addition, when the wavelength conversion module 420I or 420J is applied to the lighting systems 100A, 200A, 200B, 300A, 300B, and 300C and the projection device 100, the lighting systems 100A, 200A, 200B, 300A, 300B, and 300C and the projection device 100 can also be enabled to achieve similar effects and advantages, and the descriptions thereof are omitted herein.

Figure 5A:
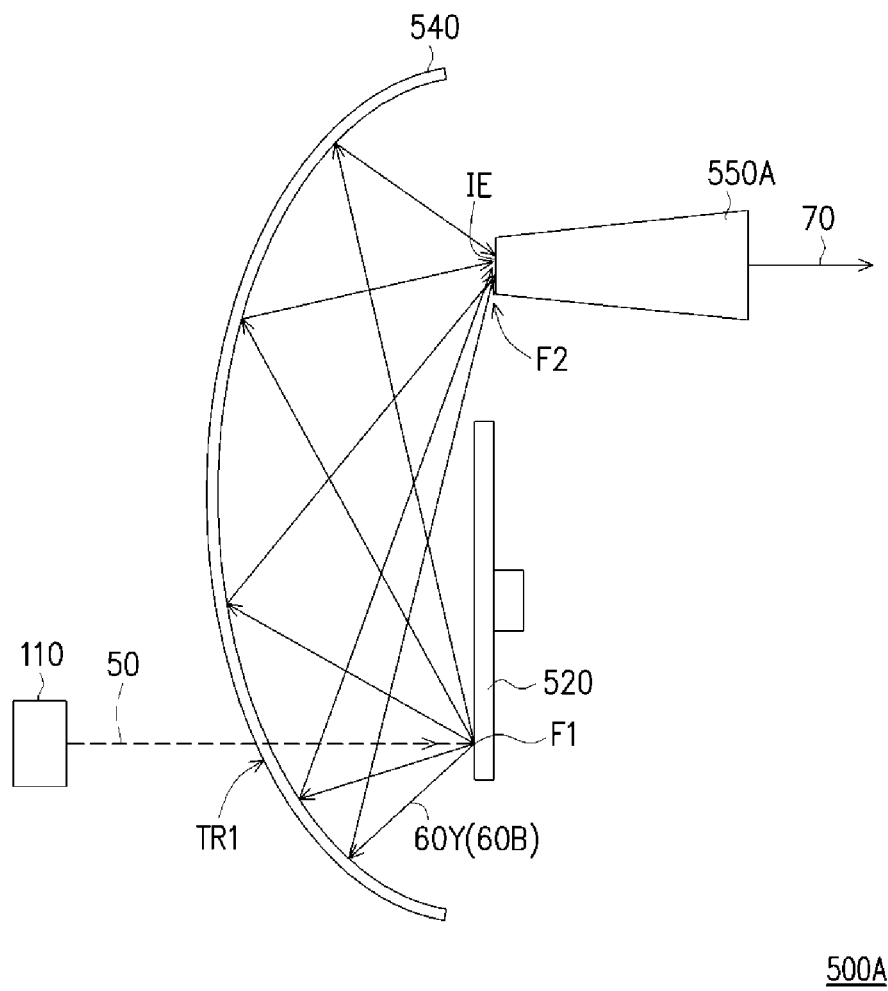
FIG. 5A is a schematic architectural diagram of another lighting system in FIG. 1A.
Figure 5B:
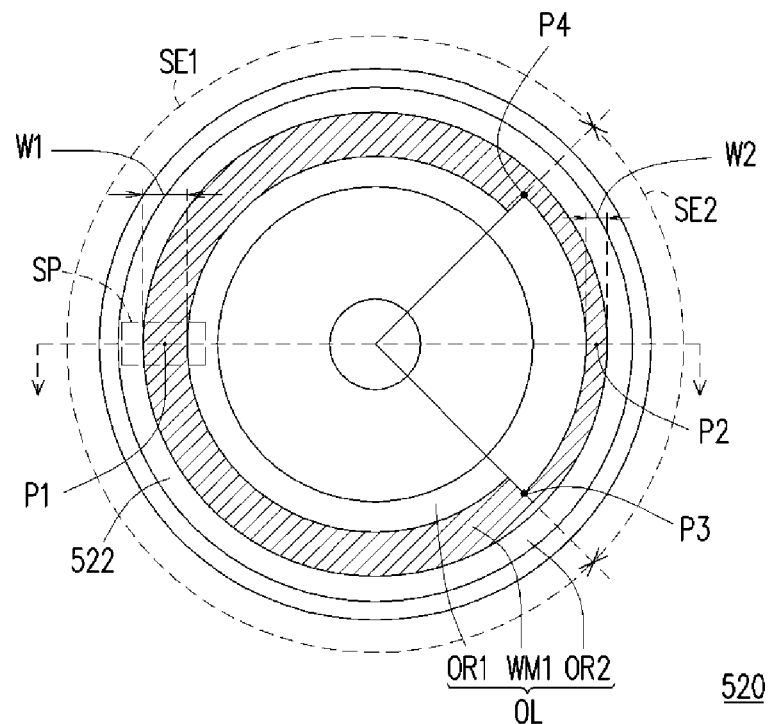
FIG. 5B is a schematic top view of a wavelength conversion module in FIG. 5A.
Figure 5C:
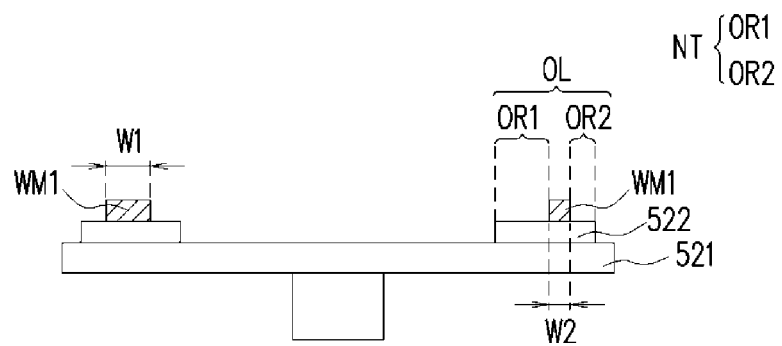
FIG. 5C is a schematic cross-sectional view of the wavelength conversion module in FIG. 5B.

FIG. 5A is a schematic architectural diagram of another lighting system in FIG. 1A. FIG. 5B is a schematic top view of a wavelength conversion module in FIG. 5A. FIG. 5C is a schematic cross-sectional view of a wavelength conversion module in FIG. 5B. A lighting system 500A in FIG. 5A is similar to the lighting system 100A in FIG. 1A. Differences are as follows. In the embodiment, the lighting system 500A further includes a curved reflective element 540 and a first optical uniformization element 550A. Specifically, as shown in FIG. 5A, in the embodiment, the curved reflective element 540 is located between the excitation light source 110 and a wavelength conversion module 520, where the excitation beam 50 from the excitation light source 110 passes through a light passing region on the curved reflective element 540 and is then transmitted to the wavelength conversion module 520. For example, in the embodiment, the light passing region TR1 is formed, for example, by forming a through hole on the curved reflective element 540, or by coating a color separation film capable of allowing blue light to pass through onto a partial region of the curved reflective element 540.

In addition, in the embodiment, the wavelength conversion module 520 in FIG. 5B is similar to the wavelength conversion module 120 in FIG. 1B. Differences are as follows. A substrate 521 of the wavelength conversion module 520 is a reflective substrate, the ring-shaped light scattering layer 522 may be made of diffuse material, to form a ring-shaped reflective and scattering layer, and the ring-shaped light scattering layer 522 is located between the reflective substrate 521 and the wavelength conversion material WM1. In other words, in the embodiment, the ring-shaped light scattering layer 522 of the wavelength conversion module 520 further includes a first ring-shaped reflective region OR1 and a second ring-shaped reflective region OR2. The first ring-shaped reflective region OR1 and the second ring-shaped reflective region OR2 are located on the substrate 521 and correspond to the non-conversion region NT of the wavelength conversion module 520. The wavelength conversion material WM1 is located between the first ring-shaped reflective region OR1 and the second ring-shaped reflective region OR2, and the wavelength conversion material WM1 surrounds the first ring-shaped reflective region OR1 and is surrounded by the second ring-shaped reflective region OR2. That is, the first ring-shaped reflective region OR1, the wavelength conversion material WM1, and the second ring-shaped reflective region OR2 are sequentially arranged in a direction from a rotating axis to an edge of the substrate 521. In this way, the wavelength conversion material, the first ring-shaped reflective region, and the second ring-shaped reflective region constitute the ring-shaped light irradiation region OL, and because the first ring-shaped reflective region OR1 and the second ring-shaped reflective region OR2 may also destroy homogeneity of a laser beam and have a function of eliminating a laser speckle, when the excitation beam 50 passes through the first ring-shaped reflective region OR1 and the second ring-shaped reflective region OR2, blue light can be formed, and a laser speckle phenomenon can be eliminated.

In this way, based on the arrangement of the ring-shaped light irradiation region OL, the wavelength conversion module 520 can also cause the first part of the excitation beam 50 from the same excitation light source 110 to be converted by the wavelength conversion material WM1 into the first color light 60Y, and cause the second part of the excitation beam 50 to form the second color light 60B by using the first ring-shaped reflective region OR1 and the second ring-shaped reflective region OR2. In addition, the wavelength conversion module 520 may also adjust ranges of the first section SE1 and the second section SE2 of the ring-shaped light irradiation region OL and change the radial width of the wavelength conversion material WM1 of the ring-shaped light irradiation region OL, to respectively control light intensity values of the first color light 60Y and the second color light 60B in different time periods.

Further, as shown in FIG. 5A, in the embodiment, the curved reflective element 540 is an elliptical reflective element. The excitation beam 50 from the excitation light source 110 passes through the light passing region TR1 of the curved reflective element 540 and converges on a focal point F1 of the curved reflective element 540. The wavelength conversion module 520 is located on the focal point F1, and a light incidence end IE of the first optical uniformization element 550A is located on another focal point F2 of the curved reflective element 540. After the excitation beam 50 passes through the wavelength conversion module 520 to generate the first color light 60Y and the second color light 60B, the first color light 60Y and the second color light 60B from the wavelength conversion module 520 may be reflected by the curved reflective element 540 to the light incidence end IE of the first optical uniformization element 550A. In the embodiment, the first optical uniformization element 550A may be an integration rod, but the invention is not limited thereto. In this way, when the first color light 60Y and the second color light 60B from the wavelength conversion module 520 are transmitted to the first optical uniformization element 550A, the first optical uniformization element 550A may uniformize the first color light 60Y and the second color light 60B to form the illuminating beam 70.

In this way, in the embodiment, the wavelength conversion module 520 has a structure similar to that of the wavelength conversion module 120 in FIG. 2A. Therefore, the wavelength conversion module 520 can achieve effects and advantages similar to those of the wavelength conversion module 120, and the descriptions thereof are omitted herein. In addition, because the lighting system 500A uses the wavelength conversion module 520, the lighting system 500A can also achieve effects and advantages similar to those of the lighting system 100A, and the descriptions thereof are omitted herein. In addition, when the lighting system 500A is applied to the projection device 100, the projection device 100 can also be enabled to achieve similar effects and advantages, and the descriptions thereof are omitted herein.

Figure 5D:
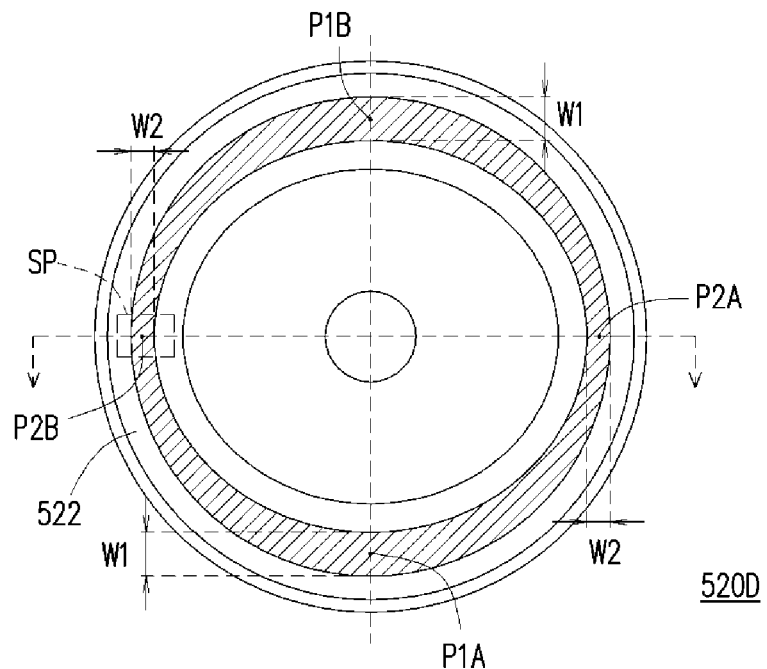
FIG. 5D is a schematic top view of another wavelength conversion module in FIG. 5A.
Figure 5E:
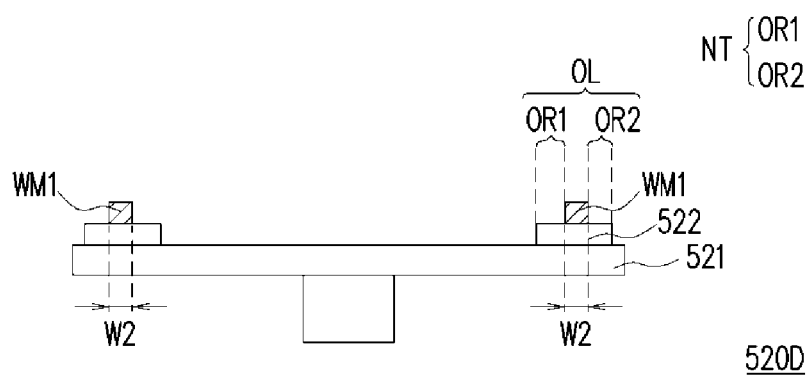
FIG. 5E is a schematic cross-sectional view of the wavelength conversion module in FIG. 5D.

FIG. 5D is a schematic top view of another wavelength conversion module in FIG. 5A. FIG. 5E is a schematic cross-sectional view of a wavelength conversion module in FIG. 5D. A wavelength conversion module 520D in FIG. 5D and FIG. 5E is similar to the wavelength conversion module 420A in FIG. 4A. Differences are as follows. In the embodiment, the substrate 521 of the wavelength conversion module 520D is a reflective substrate, and the ring-shaped light scattering layer 522 may be made of diffuse material, to form a ring-shaped reflective and scattering layer.

In this way, based on the arrangement of the wavelength conversion material WM1 in the ring-shaped light irradiation region OL, the wavelength conversion module 520D can also cause the first part of the excitation beam 50 from the same excitation light source 110 to be converted into the first color light 60Y, and cause the second part of the excitation beam 50 to pass through the non-conversion region NT (the first ring-shaped reflective region OR1 and the second ring-shaped reflective region OR2) to form the second color light 60B. In addition, the wavelength conversion module 520D may also adjust the first positions P1A and P1B and the second positions P2A and P2B of the ring-shaped light irradiation region OL and change the radial width of the wavelength conversion material WM1 of the ring-shaped light irradiation region OL, to respectively control light intensity values of the first color light 60Y and the second color light 60B in different time periods.

In this way, in the embodiment, the wavelength conversion module 520D has a structure similar to that of the wavelength conversion module 420A in FIG. 4A. Therefore, the wavelength conversion module 520D can achieve effects and advantages similar to those of the wavelength conversion module 420A, and the descriptions thereof are omitted herein. In addition, because the wavelength conversion module 520D can also constitute the arrangement of the ring-shaped reflective and scattering layer, the wavelength conversion module 520D may also be applied to the lighting system 500A, and when the wavelength conversion module 520D is applied to the lighting system 500A, the lighting system 500A can also be enabled to achieve similar effects and advantages. The descriptions thereof are omitted herein.

Figure 5F:
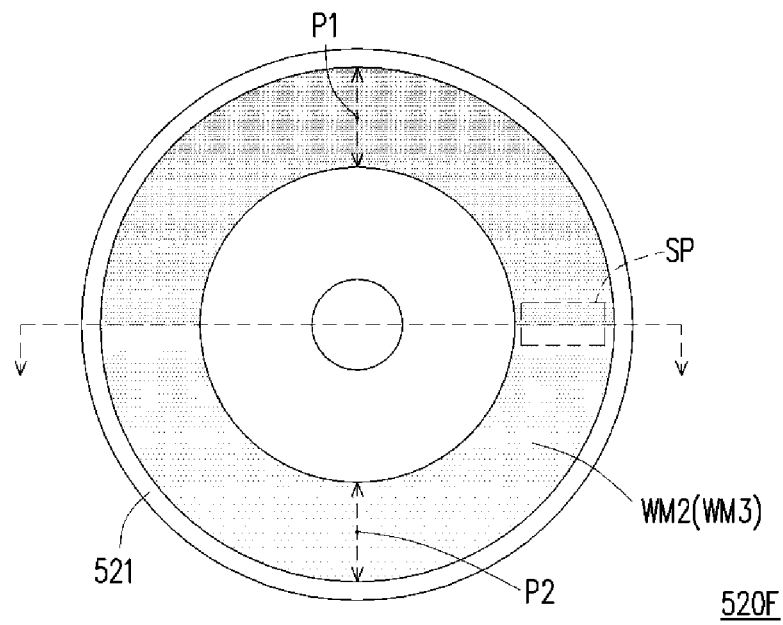
FIG. 5F is a schematic top view of another wavelength conversion module in FIG. 5A.
Figure 5G:
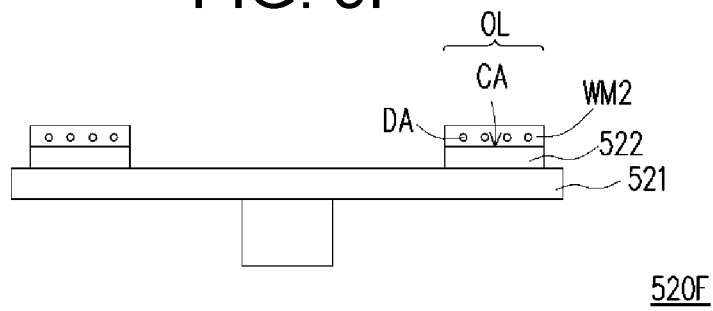
FIG. 5G is a schematic cross-sectional view of the wavelength conversion module in FIG. 5F.

FIG. 5F is a schematic top view of another wavelength conversion module in FIG. 5A. FIG. 5G is a schematic cross-sectional view of a wavelength conversion module in FIG. 5F. The wavelength conversion module 520F in FIG. 5F and FIG. 5G is similar to the wavelength conversion module 420F in FIG. 4F. Differences are as follows. In the embodiment, the substrate 521 of the wavelength conversion module 520F is a reflective substrate, and the ring-shaped light scattering layer 522 may be made of diffuse material, to form a ring-shaped reflective and scattering layer.

In this way, based on the arrangement of the plurality of dotted microstructures DA constituted by wavelength conversion material WM2 in the ring-shaped light irradiation region OL, the wavelength conversion module 520F can cause the first part of the excitation beam 50 from the same excitation light source 110 to be converted into the first color light 60Y, and cause the second part of the excitation beam 50 to pass through the non-conversion region NT (these gaps CA) to form the second color light 60B. In addition, the wavelength conversion module 520F may also adjust the first position P1 and the second position P2 of the ring-shaped light irradiation region OL and change the volume percentage, to respectively control light intensity values of the first color light 60Y and the second color light 60B in different time periods.

In the embodiment, the wavelength conversion module 520F has a structure similar to that of the wavelength conversion module 420F in FIG. 4F. Therefore, the wavelength conversion module 520F can achieve effects and advantages similar to those of the wavelength conversion module 420F, and the descriptions thereof are omitted herein. In addition, because the wavelength conversion module 520F can also constitute the arrangement of the ring-shaped reflective and scattering layer, the wavelength conversion module 520F may also be applied to the lighting system 500A, and when the wavelength conversion module 520F is applied to the lighting system 500A, the lighting system 500A can also be enabled to achieve similar effects and advantages. The descriptions thereof are omitted herein.

Figure 5H:
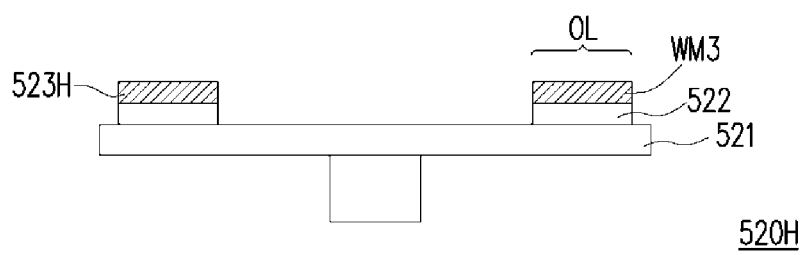
FIG. 5H is a schematic cross-sectional view of another wavelength conversion module in FIG. 5F.

FIG. 5H is a schematic cross-sectional view of another wavelength conversion module in FIG. 5F. The wavelength conversion module 520H in FIG. 5H is similar to the wavelength conversion module 420H in FIG. 4H. Differences are as follows. In the embodiment, the substrate 521 of the wavelength conversion module 520H is a reflective substrate, and the ring-shaped light scattering layer 522 may be made of diffuse material, to form a ring-shaped reflective and scattering layer.

In this way, based on the arrangement of the wavelength conversion material WM3 in the ring-shaped light irradiation region OL, the wavelength conversion module 520H can also cause the first part of the excitation beam 50 from the same excitation light source 110 to be converted into the first color light 60Y, and cause the second part of the excitation beam 50 to pass through the ring-shaped light irradiation region OL to form the second color light 60B. In addition, in the embodiment, because the excitation beam 50 passes through the wavelength conversion material WM3 in the ring-shaped light irradiation region OL twice after being reflected by the substrate 521, a light conversion condition of a light-active layer 523H of the wavelength conversion module 520H is that a volumetric concentration of the wavelength conversion material WM3 in the light-active layer 523H ranges from 15% to 70%, or a thickness of the light-active layer 523H ranges from 0.03 millimeter to 0.3 millimeter.

In this way, when the light-active layer 523H of the wavelength conversion module 520H satisfies the light conversion condition, the wavelength conversion module 420H may also adjust the first position P1 and the second position P2 of the ring-shaped light irradiation region OL and change the volumetric concentration or the thickness, to respectively control moments of the first time sequence and the second time sequence, ranges of the first time period and the second time period, and light intensity values of the first color light 60Y and the second color light 60B therein.

In the embodiment, the wavelength conversion module 520H has a structure similar to that of the wavelength conversion module 420H in FIG. 4H. Therefore, the wavelength conversion module 520H can achieve effects and advantages similar to those of the wavelength conversion module 420H, and the descriptions thereof are omitted herein. In addition, because the wavelength conversion module 520H can also constitute the arrangement of the ring-shaped reflective and scattering layer, the wavelength conversion module 520H may also be applied to the lighting system 500A, and when the wavelength conversion module 520H is applied to the lighting system 500A, the lighting system 500A can also be enabled to achieve similar effects and advantages. The descriptions thereof are omitted herein.

Figure 6A:
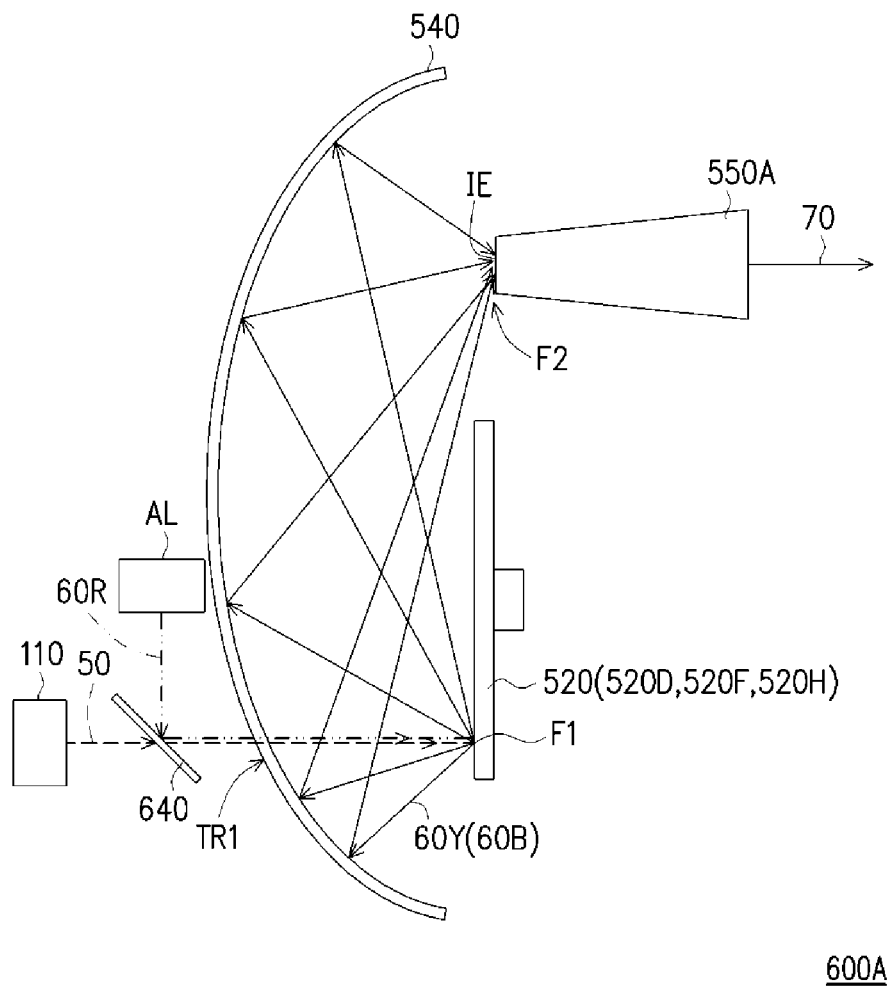
FIG. 6A to FIG. 6C are schematic architectural diagrams of various lighting systems in FIG. 1A.

FIG. 6A is a schematic architectural diagram of another lighting system in FIG. 1A. A lighting system 600A in FIG. 6A is similar to the lighting system 500A in FIG. 5A. Differences are as follows. In the embodiment, the lighting system 600A further includes an auxiliary light source AL. The auxiliary light source AL is configured to emit an auxiliary beam 60R, a wave band of the auxiliary beam 60R at least partially overlaps a wave band of the first color light 60Y, and the auxiliary beam 60R passes through the curved reflective element 540 and is then transmitted to the light incidence end IE of the first optical uniformization element 550A.

For example, as shown in FIG. 6A, in the embodiment, the lighting system 600A further includes a third color separation element 640, disposed on the transmission path of the auxiliary beam 60R. The third color separation element 640 is, for example, a DMR, allows blue light to pass through, and provides a reflection function on red light. The light passing region TR1 is formed, for example, by forming a through hole on the curved reflective element 540, or by coating a color separation film capable of allowing blue light and red light to pass through onto a partial region of the curved reflective element 540. In this way, the auxiliary beam 60R may be transmitted by the third color separation element 640 and then pass through the light passing region TR1 of the curved reflective element 540, and after being sequentially reflected by the wavelength conversion module 520 and the curved reflective element 540, the auxiliary beam 60R can be transmitted to the light incidence end IE of the first optical uniformization element 550A. In this way, the auxiliary beam 60R, the first color light 60Y, and the second color light 60B may be combined to form the illuminating beam 70 after passing through the first optical uniformization element 550A.

In this way, based on the arrangement of the auxiliary light source AL, the lighting system 600A can increase a red light proportion in the illuminating beam 70, thereby improving red color performance in a projection picture. In addition, in the embodiment, because the lighting system 600A can also use a structure similar to that of the wavelength conversion module 520 (or the wavelength conversion module 520D, 520G, or 520H) that can be used by the lighting system 500A, the lighting system 600A can achieve effects and advantages similar to those of the lighting system 500A, and the descriptions thereof are omitted herein. In addition, when the lighting system 600A is applied to the projection device 100, the projection device 100 can also be enabled to achieve similar effects and advantages, and the descriptions thereof are omitted herein.

Figure 6B:
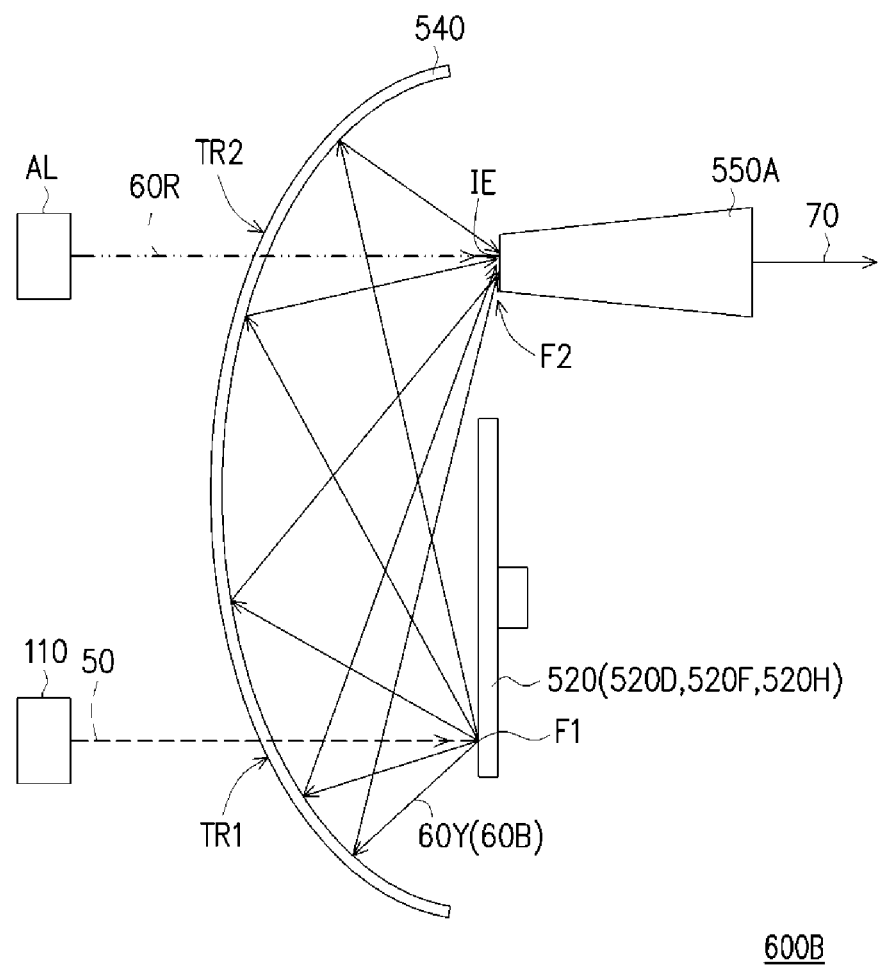

FIG. 6B is a schematic architectural diagram of another lighting system in FIG. 1A. A lighting system 600B in FIG. 6B is similar to the lighting system 600A in FIG. 6A. Differences are as follows. In the embodiment, in addition to the light passing region TR1, the curved reflective element 540 further has another light passing region TR2, disposed on the transmission path of the auxiliary beam 60R. Specifically, as shown in FIG. 6B, in the embodiment, the auxiliary beam 60R can pass through the light passing region TR2 of the curved reflective element 540 and be directly transmitted to the light incidence end IE of the first optical uniformization element 550A. In this way, the auxiliary beam 60R and the first color light 60Y and the second color light 60B from the wavelength conversion module 520 and the curved reflective element 540 may be combined to form the illuminating beam 70 after passing through the first optical uniformization element 550A.

In this way, based on the arrangement of the auxiliary light source AL, the lighting system 600B can increase a red light proportion in the illuminating beam 70, thereby improving red color performance in a projection picture. In addition, in the embodiment, because the lighting system 600B can also use a structure similar to that of the wavelength conversion module 520 (or the wavelength conversion module 520D, 520G, or 520H) that can be used by the lighting system 600A, the lighting system 600B can achieve effects and advantages similar to those of the lighting system 600A, and the descriptions thereof are omitted herein. In addition, when the lighting system 600B is applied to the projection device 100, the projection device 100 can also be enabled to achieve similar effects and advantages, and the descriptions thereof are omitted herein.

Figure 6C:
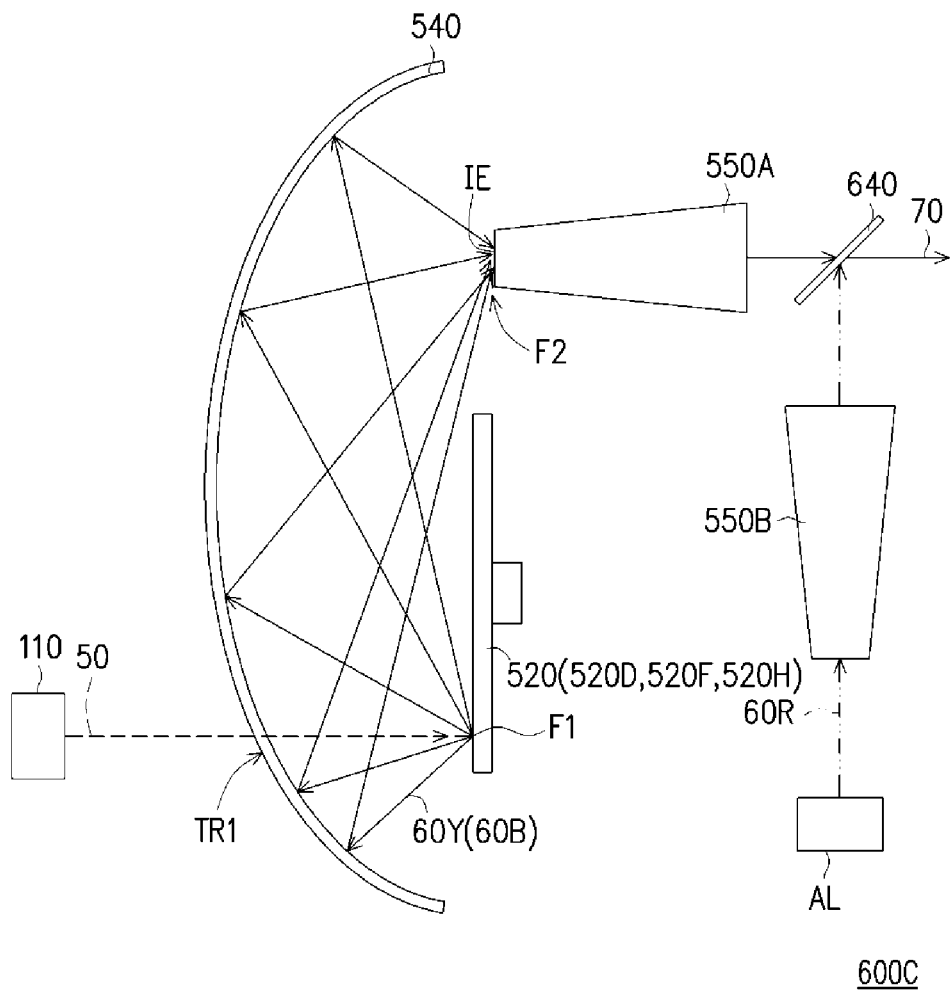

FIG. 6C is a schematic architectural diagram of another lighting system in FIG. 1A. A lighting system 600C in FIG. 6C is similar to the lighting system 500A in FIG. 5A. Differences are as follows. In the embodiment, the lighting system 600C further includes an auxiliary light source AL, a second optical uniformization element 550B, and the third color separation element 640. The auxiliary light source AL is configured to emit an auxiliary beam 60R, and a wave band of the auxiliary beam 60R at least partially overlaps a wave band of the first color light 60Y.

Specifically, as shown in FIG. 6C, the second optical uniformization element 550B is located on a transmission path of the auxiliary beam 60R, and is applicable to uniformizing the auxiliary beam 60R. Moreover, the third color separation element 640 is located on the transmission path of the auxiliary beam 60R and the first color light 60Y and the second color light 60B from the first optical uniformization element 550A. For example, in the embodiment, the third color separation element 640 can reflect the auxiliary beam 60R, to allow part of the first color light 60G and the second color light 60B to pass through, but the invention is not limited thereto. In another embodiment, the third color separation element 640 can allow the auxiliary beam 60R to pass through, and reflect part of the first color light 60G and the second color light 60B. In this way, part of the first color light 60G and the second color light 60B from the first optical uniformization element 550A and the auxiliary beam 60R from the second optical uniformization element 550B can form the illuminating beam 70 after being guided by the third color separation element 640.

In this way, based on the arrangement of the auxiliary light source AL, the lighting system 600C can increase a red light proportion in the illuminating beam 70, thereby improving red color performance in a projection picture. In addition, in the embodiment, because the lighting system 600C can also use a structure similar to that of the wavelength conversion module 520 (or the wavelength conversion module 520D, 520G, or 520H) that can be used by the lighting system 500A, the lighting system 600C can achieve effects and advantages similar to those of the lighting system 500A, and the descriptions thereof are omitted herein. In addition, when the lighting system 600C is applied to the projection device 100, the projection device 100 can also be enabled to achieve similar effects and advantages, and the descriptions thereof are omitted herein.

Figure 7A:
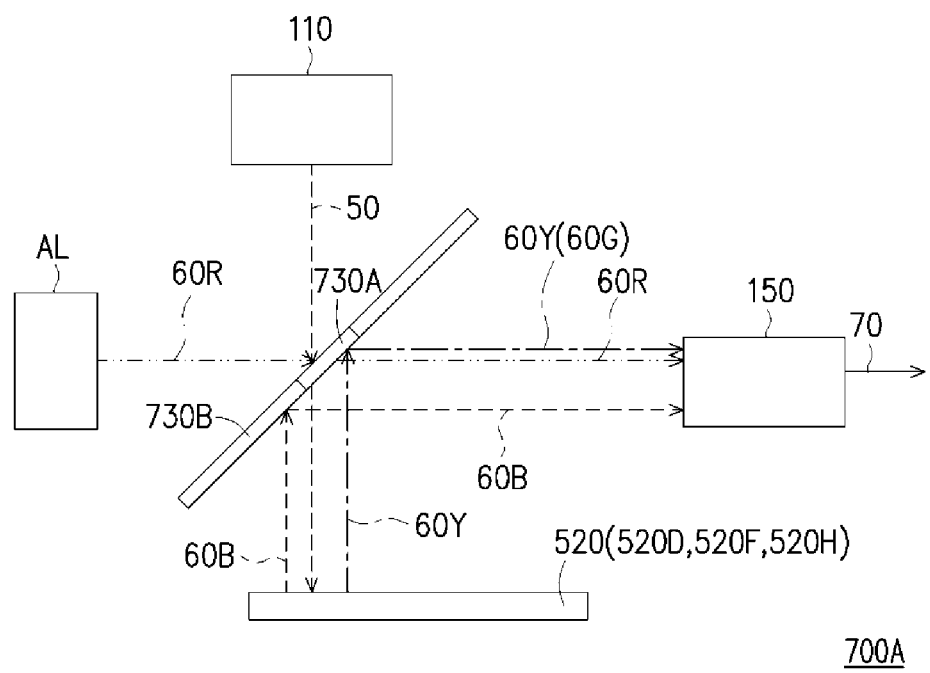
FIG. 7A is a schematic architectural diagram of another lighting system in FIG. 1A.
Figure 7B:
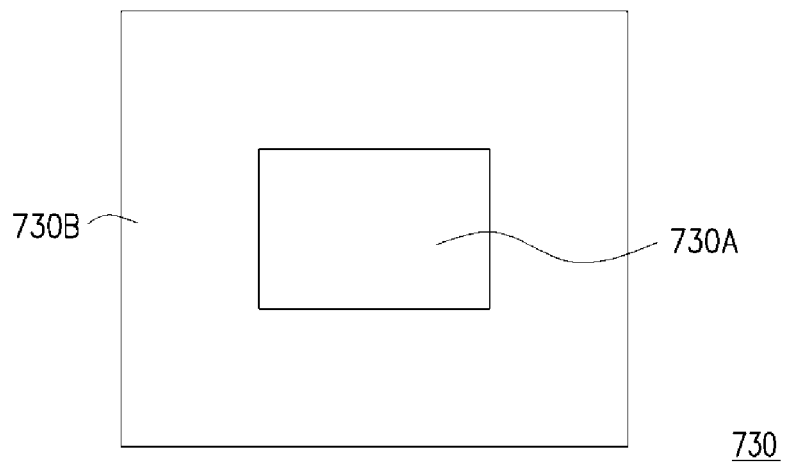
FIG. 7B is a schematic top view of an optical splitting element in FIG. 7A.

FIG. 7A is a schematic architectural diagram of another lighting system in FIG. 1A. FIG. 7B is a schematic top view of an optical splitting element in FIG. 7A. In the embodiment, a lighting system 700A includes the excitation light source 110, the wavelength conversion module 520 (or the wavelength conversion module 520D, 520G, or 520H), a fourth color separation element 730, and the optical uniformization element 150. For detailed descriptions of the structures of the excitation light source 110, the wavelength conversion module 520 (or the wavelength conversion module 520D, 520G, or 520H), and the optical uniformization element 150, refer to related paragraphs described above, and the descriptions thereof are omitted herein.

Specifically, as shown in FIG. 7A, in the embodiment, the fourth color separation element 730 is located between the excitation light source 110 and the wavelength conversion module 520, where the fourth color separation element 730 has a first region 730A and a second region 730B, and the second region 730B surrounds the first region 730A. For example, in the embodiment, the first region 730A of the fourth color separation element 730 may be a through hole, or may be formed by coating a color separation film capable of allowing blue light to pass through and reflecting yellow light onto the fourth color separation element 730. Moreover, a reflective coating may be coated onto the second region 730B of the fourth color separation element 730, so that blue light and yellow light can be reflected.

In this way, as shown in FIG. 7A, in the embodiment, the first region 730A of the fourth color separation element 730 can allow the excitation beam 50 to pass through and be transmitted to the wavelength conversion module 520. The excitation beam 50 that is incident to the wavelength conversion module 520 is converted into the first color light 60Y and the second color light 60B and then reflected back to the fourth color separation element 730. Subsequently, the first region 730A of the fourth color separation element 730 reflects the first color light 60Y, while the second region 730B reflects the first color light 60Y and the second color light 60B from the wavelength conversion module 520. In this way, the first color light 60Y and the second color light 60B may be guided to the optical uniformization element 150 by the fourth color separation element 730, to form the illuminating beam 70.

In addition, as shown in FIG. 7A, in the embodiment, the lighting system 700A may further optionally include an auxiliary light source AL. The auxiliary light source AL is configured to emit an auxiliary beam 60R, and a wave band of the auxiliary beam 60R at least partially overlaps a wave band of the first color light 60Y. In the embodiment, the auxiliary beam 60R is, for example, red light. When the lighting system 700A includes the auxiliary light source AL, the first region 730A of the fourth color separation element 730 may be a through hole, or a color separation film capable of allowing blue light and red light to pass through and reflecting green light is coated onto the first region 730A, and the second region 730B of the fourth color separation element 730 is optionally coated with a color separation film capable of allowing red light to pass through and reflecting light beams in other colors. In this way, the auxiliary beam 60R, part of the first color light 60G, and the second color light 60B are guided to the optical uniformization element 150 after being guided by the fourth color separation element 730, and are combined to form the illuminating beam 70.

In this way, in the embodiment, because the lighting system 700A can also use a structure similar to that of the wavelength conversion module 520 (or the wavelength conversion module 520D, 520G, or 520H) that can be used by the lighting system 500A, the lighting system 700A can achieve effects and advantages similar to those of the lighting system 500A, and the descriptions thereof are omitted herein. In addition, when the lighting system 700A is applied to the projection device 100, the projection device 100 can also be enabled to achieve similar effects and advantages, and the descriptions thereof are omitted herein. In addition, based on the arrangement of the auxiliary light source AL, the lighting system 700A can increase a red light proportion in the illuminating beam 70, thereby improving red color performance in a projection picture.

Figure 8A:
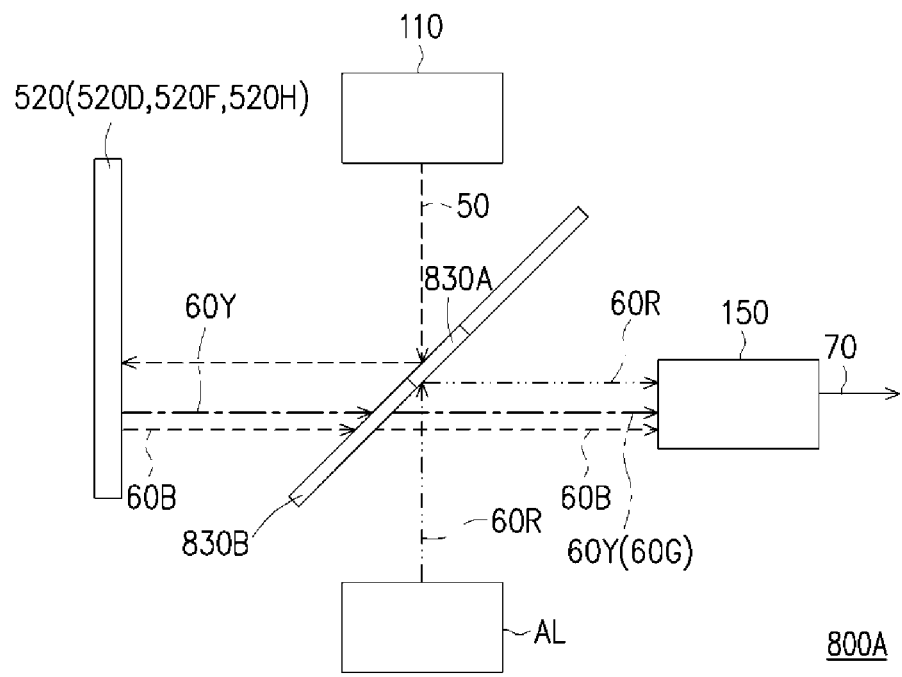
FIG. 8A is a schematic architectural diagram of another lighting system in FIG. 1A.
Figure 8B:
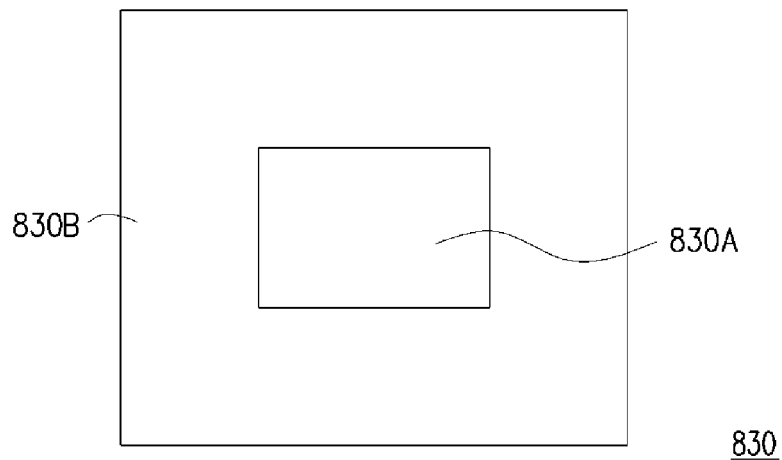
FIG. 8B is a schematic top view of an optical splitting element in FIG. 8A.

FIG. 8A is a schematic architectural diagram of another lighting system in FIG. 1A. FIG. 8B is a schematic top view of an optical splitting element in FIG. 8A. A lighting system 800A in FIG. 8A is similar to the lighting system 700A in FIG. 7A. Differences are as follows. In the embodiment, the lighting system 800A includes a fourth color separation element 830 having a first region 830A and a second region 380B. The first region 830A of the fourth color separation element 830 is coated with a color separation film capable of allowing yellow light to pass through and reflecting blue light, so that the excitation beam 50 can be reflected and the first color light 60Y is allowed to pass through. The second region 830B of the fourth color separation element 830 may be a transparent region, so that the first color light 60Y and the second color light 60B from the wavelength conversion module 520 (or the wavelength conversion module 520D, 520G, or 520H) can be allowed to pass through.

In this way, as shown in FIG. 8A and FIG. 8B, in the embodiment, the first region 830A of the fourth color separation element 830 can reflect the excitation beam 50, so that the excitation beam 50 is transmitted to the wavelength conversion module 520. The excitation beam 50 that is incident to the wavelength conversion module 520 is converted into the first color light 60Y and the second color light 60B and then transmitted to the fourth color separation element 830. Subsequently, the first region 830A of the fourth color separation element 830 allows the first color light 60Y to pass through, while the second region 730B allows the first color light 60Y and the second color light 60B from the wavelength conversion module 120 to pass through. In this way, the first color light 60Y and the second color light 60B may be guided to the optical uniformization element 150 by the fourth color separation element 830, to form the illuminating beam 70.

In addition, as shown in FIG. 8A, in the embodiment, the lighting system 800A may alternatively optionally include an auxiliary light source AL. When the lighting system 800A includes the auxiliary light source AL, the first region 830A of the fourth color separation element 830 may be coated with a color separation film capable of allowing green light to pass through and reflecting blue light and red light, and the second region 830B may be coated with a color separation film capable of reflecting red light and allowing beams in other colors to pass through. In this way, the auxiliary beam 60R, part of the first color light 60G, and the second color light 60B are guided to the optical uniformization element 150 after being guided by the fourth color separation element 830, and are combined to form the illuminating beam 70.

In this way, in the embodiment, because the lighting system 800A can also use a structure similar to that of the wavelength conversion module 520 (or the wavelength conversion module 520D, 520G, or 520H) that can be used by the lighting system 700A, the lighting system 800A can achieve effects and advantages similar to those of the lighting system 700A, and the descriptions thereof are omitted herein. In addition, when the lighting system 800A is applied to the projection device 100, the projection device 100 can also be enabled to achieve similar effects and advantages, and the descriptions thereof are omitted herein. In addition, based on the arrangement of the auxiliary light source AL, the lighting system 800A can increase a red light proportion in the illuminating beam 70, thereby improving red color performance in a projection picture.

Figure 9A:
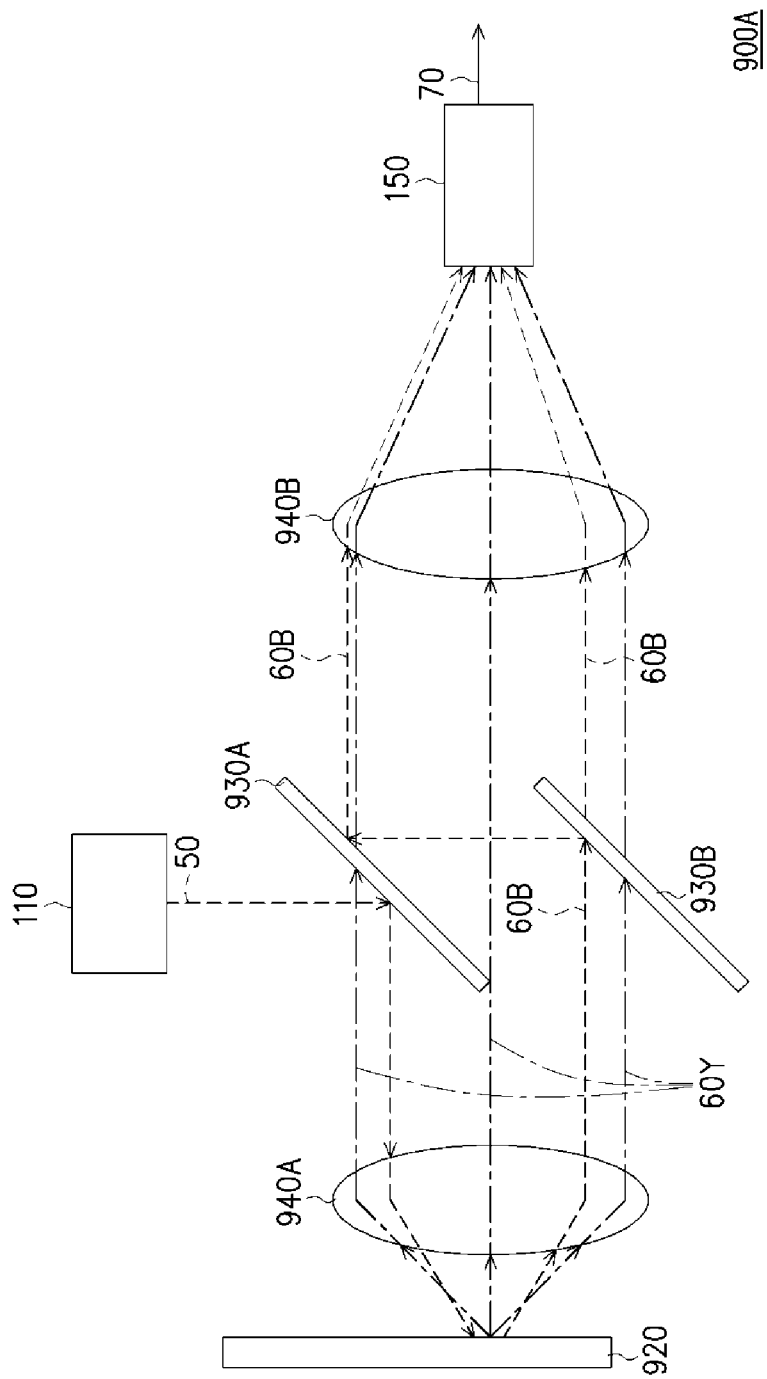
FIG. 9A is a schematic architectural diagram of another lighting system in FIG. 1A.
Figure 9B:
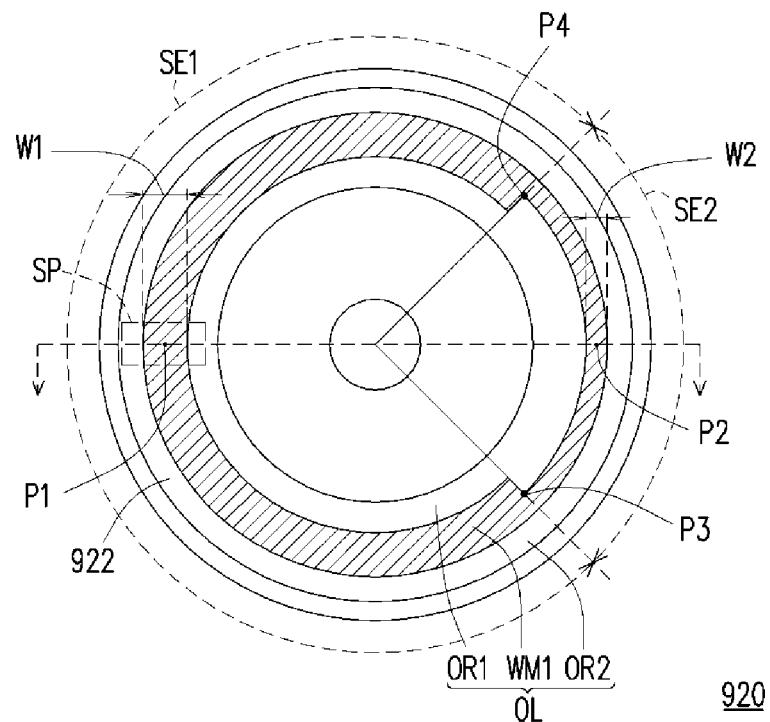
FIG. 9B is a schematic top view of a wavelength conversion module in FIG. 9A.
Figure 9C:
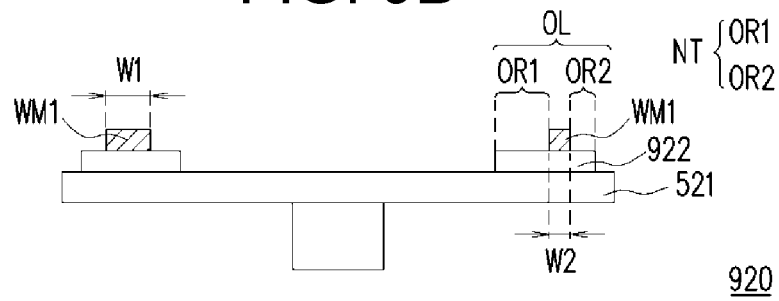
FIG. 9C and FIG. 9D are schematic cross-sectional views of various wavelength conversion modules in FIG. 9B.

FIG. 9A is a schematic architectural diagram of another lighting system in FIG. 1A. FIG. 9B is a schematic top view of a wavelength conversion module in FIG. 9A. FIG. 9C is a schematic cross-sectional view of the wavelength conversion module in FIG. 9B. In the embodiment, a lighting system 900A in FIG. 9A is similar to the lighting system 800A in FIG. 8A, and a wavelength conversion module 920 in FIG. 9B is similar to the wavelength conversion module 520 in FIG. 5B. Differences are as follows. As shown in FIG. 9C, in the wavelength conversion module 920 in the embodiment, the ring-shaped light scattering layer 122 is replaced by a mirror reflecting layer 922, to constitute the first ring-shaped reflective region OR1 and the second ring-shaped reflective region OR2. In addition, the lighting system 900A does not include the fourth color separation element 730, but includes a fifth color separation element 930A, a sixth color separation element 930B, a first condensing lens assembly 940A, and a second condensing lens assembly 940B.

Specifically, as shown in FIG. 9A, in the embodiment, the fifth color separation element 930A is located between the excitation light source 110 and the wavelength conversion module 920, the first condensing lens assembly 940A is located between the fifth color separation element 930A, the sixth color separation element 930B, and the wavelength conversion module 920. In the embodiment, the fifth color separation element 930A is, for example, a DMB. In this way, the excitation beam 50 from the excitation light source 110 is guided by the fifth color separation element 930A to the first condensing lens assembly 940A, is then obliquely incident to the wavelength conversion module 920 through the first condensing lens assembly 940A, and is then converted into the first color light 60Y and the second color light 60B.

In addition, because the wavelength conversion module 920 in the embodiment has a structure similar to that of the wavelength conversion module 520 in FIG. 5B, similarly, based on the arrangement of the ring-shaped light irradiation region OL, the first part of the excitation beam 50 from the same excitation light source 110 may be converted into the first color light 60Y, and based on the arrangement of the first ring-shaped reflective region OR1 and the second ring-shaped reflective region OR2, the second part of the excitation beam 50 forms the second color light 60B. In addition, the wavelength conversion module 920 may also adjust ranges of the first section SE1 and the second section SE2 of the ring-shaped light irradiation region OL and change the radial width of the wavelength conversion material WM1 of the ring-shaped light irradiation region OL, to respectively control light intensity values of the first color light 60Y and the second color light 60B in different time periods. Therefore, the wavelength conversion module 920 can achieve effects and advantages similar to those of the wavelength conversion module 520, and the descriptions thereof are omitted herein.

Subsequently, as shown in FIG. 9A, in the embodiment, the sixth color separation element 930B may be a blue half mirror (BHM), allow one part of the second color light 60B to pass through, reflect another part of the second color light 60B, and allow a light beam in another color (that is, the first color light 60Y) to pass through.

In this way, because the first color light 60Y obtained through conversion by using the wavelength conversion material WM1 of the wavelength conversion module 92 has a large distribution angle, the first color light 60Y from the wavelength conversion module 920 is obliquely incident to the first condensing lens assembly 940A, and is transmitted to the second condensing lens assembly 940B after being guided by the fifth color separation element 930A and the sixth color separation element 930B.

Moreover, for the second color light 60B formed through reflection by the first ring-shaped reflective region OR1 or the second ring-shaped reflective region OR2 of the wavelength conversion module 920, because the first ring-shaped reflective region OR1 and the second ring-shaped reflective region OR2 in the embodiment are constituted by the mirror reflecting layer 922, the second color light 60B from the wavelength conversion module 920 is eccentrically and obliquely incident to the first condensing lens assembly 940A and then transmitted to the sixth color separation element 930B. The sixth color separation element 930B then allows a part of the second color light 60B to pass through and reflects another part of the second color light 60B. In this way, after passing through the sixth color separation element 930B, one part of the second color light 60B is transmitted to the fifth color separation element 930A due to reflection and is then reflected to the second condensing lens assembly 940B, and another part of the second color light 60B passes through the sixth color separation element 930B and is then directly transmitted to the second condensing lens assembly 940B.

Subsequently, as shown in FIG. 9A, in the embodiment, the second condensing lens assembly 940B is located on the transmission path of the second color light 60B and the first color light 60Y from the fifth color separation element 930A and the sixth color separation element 930B, and is configured to converge the second color light 60B and the first color light 60Y from the fifth color separation element 930A and the sixth color separation element 930B. In this way, after passing through the second condensing lens assembly 940B, the first color light 60Y and the second color light 60B are guided to the optical uniformization element 150 and are combined to form the illuminating beam 70.

In this way, in the embodiment, because the lighting system 900A uses a structure of the wavelength conversion module 920 that can achieve a function similar to that of the wavelength conversion module 520, the lighting system 900A can achieve effects and advantages similar to those of the lighting system 500A, and the descriptions thereof are omitted herein. In addition, when the lighting system 900A is applied to the projection device 100, the projection device 100 can also be enabled to achieve similar effects and advantages, and the descriptions thereof are omitted herein.

Figure 9D:
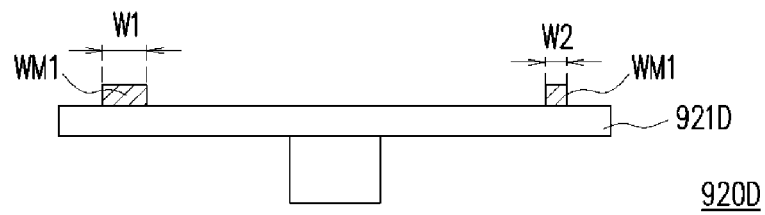

FIG. 9D is a schematic front view of another wavelength conversion module in FIG. 9B. A wavelength conversion module 920D in FIG. 9D is similar to the wavelength conversion module 920 in FIG. 9C. Differences are as follows. In the embodiment, a substrate 921D of the wavelength conversion module 920D is a smooth mirror, so that the mirror reflecting layer 922 can be omitted and the wavelength conversion material WM1 can be directly arranged on the substrate 921D.

In this way, when the excitation beam 50 is incident to the wavelength conversion module 920D, the first part of the excitation beam 50 may also be converted by the wavelength conversion material WM1 of the wavelength conversion module 920D into the first color light 60Y and the second part of the excitation beam 50 is caused to form the second color light 60B. In addition, the wavelength conversion module 920D may also adjust the ranges of the first section SE1 and the second section SE2 of the ring-shaped light irradiation region OL and change the radial width of the wavelength conversion material WM1 of the ring-shaped light irradiation region OL, to respectively control light intensity values of the first color light 60Y and the second color light 60B in different time periods, to achieve effects and advantages similar to those of the wavelength conversion module 920, and the descriptions thereof are omitted herein.

Figure 9E:
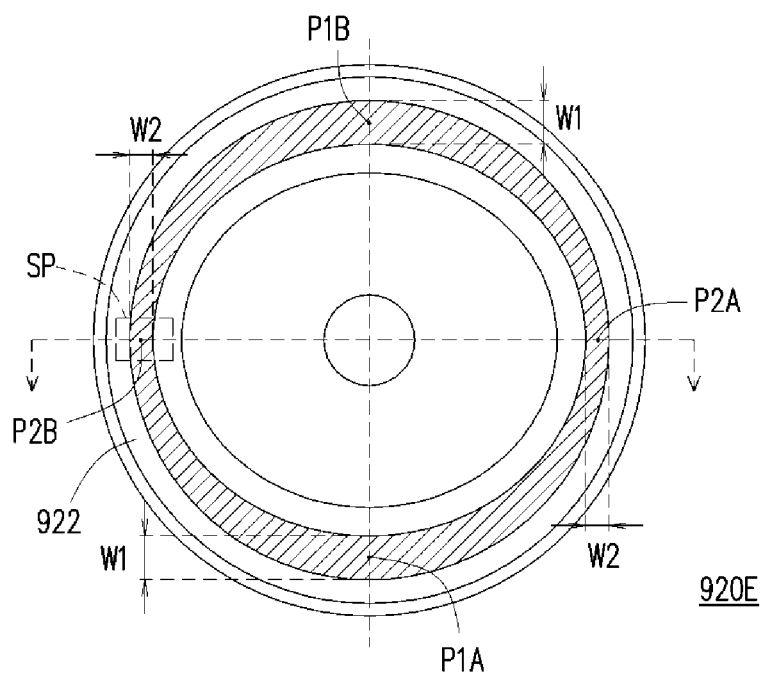
FIG. 9E is a schematic top view of a wavelength conversion module in FIG. 9A.
Figure 9F:
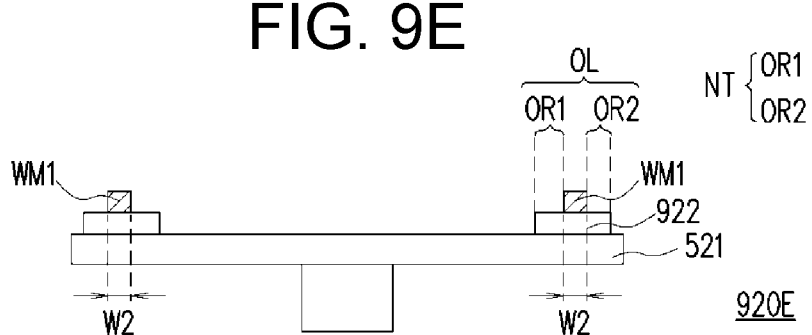
FIG. 9F and FIG. 9G are schematic cross-sectional views of various wavelength conversion modules in FIG. 9B.

FIG. 9E is a schematic top view of another wavelength conversion module in FIG. 9A. FIG. 9F is a schematic cross-sectional view of the wavelength conversion module in FIG. 9E. A wavelength conversion module 920E in FIG. 9E is similar to the wavelength conversion module 520D in FIG. 5D. Differences are as follows. In the wavelength conversion module 920E of the embodiment, the ring-shaped light scattering layer 122 is replaced by a mirror reflecting layer 922, to constitute a ring-shaped mirror reflecting layer. In this way, based on the arrangement of the wavelength conversion material WM1 in the ring-shaped light irradiation region OL, the wavelength conversion module 920E can also cause the first part of the excitation beam 50 from the same excitation light source 110 to be converted into the first color light 60Y, and based on the arrangement of the first ring-shaped reflective region OR1 and the second ring-shaped reflective region OR2, the second part of the excitation beam 50 forms the second color light 60B. In addition, the wavelength conversion module 920E may also adjust the first positions P1A and P1B and the second positions P2A and P2B of the ring-shaped light irradiation region OL and change the radial width of the wavelength conversion material WM1 of the ring-shaped light irradiation region OL, to respectively control light intensity values of the first color light 60Y and the second color light 60B in different time periods.

In the embodiment, the wavelength conversion module 920E has a structure similar to that of the wavelength conversion module 520D in FIG. 5D. Therefore, the wavelength conversion module 920E can achieve effects and advantages similar to those of the wavelength conversion module 520D, and the descriptions thereof are omitted herein. In addition, because the wavelength conversion module 920E is also configured with the ring-shaped mirror reflecting layer, the wavelength conversion module 920E may also be applied to the lighting system 900A, and when the wavelength conversion module 920E is applied to the lighting system 900A, the lighting system 900A can also be enabled to achieve similar effects and advantages. The descriptions thereof are omitted herein.

Figure 9G:
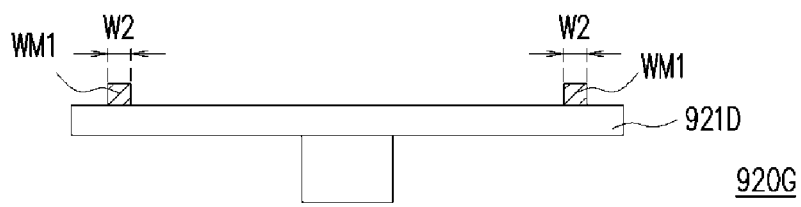

FIG. 9G is a schematic front view of another wavelength conversion module in FIG. 1A. In the embodiment, the wavelength conversion module 920G in FIG. 9G is similar to the wavelength conversion module 920E in FIG. 9F. Differences are as follows. In the embodiment, a substrate 921D of the wavelength conversion module 920G is a smooth mirror, so that the mirror reflecting layer 922 can be omitted and the wavelength conversion material WM1 can be directly arranged on the substrate 921D.

In this way, when the excitation beam 50 is incident to the wavelength conversion module 920G, the first part of the excitation beam 50 may also be converted by the wavelength conversion material WM1 of the wavelength conversion module 920G into the first color light 60Y and the second part of the excitation beam 50 is caused to form the second color light 60B. In addition, the wavelength conversion module 920G may also adjust the first positions P1A and P1B and the second positions P2A and P2B of the ring-shaped light irradiation region OL and change the radial width of the wavelength conversion material WM1 of the ring-shaped light irradiation region OL, to respectively control light intensity values of the first color light 60Y and the second color light 60B in different time periods, to achieve effects and advantages similar to those of the wavelength conversion module 920, and the descriptions thereof are omitted herein.

Figure 9H:
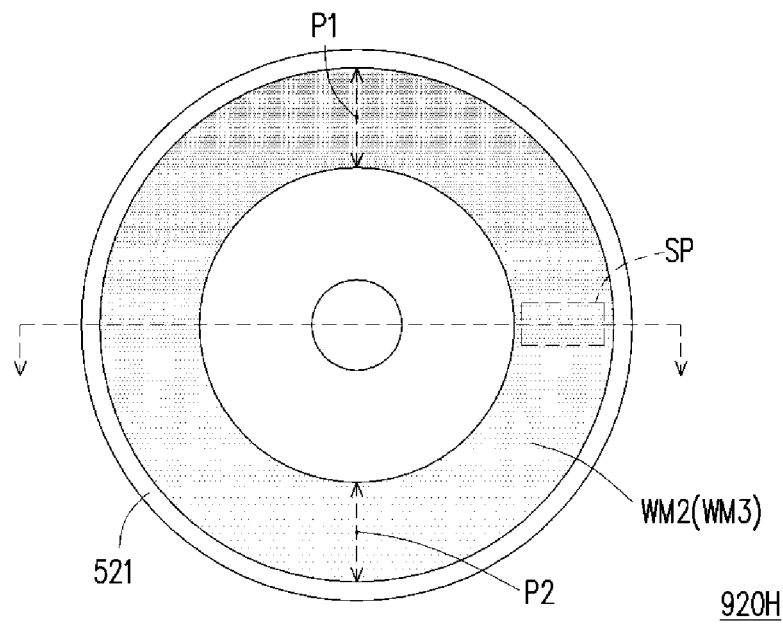
FIG. 9H is a schematic top view of a wavelength conversion module in FIG. 9A.
Figure 9I:
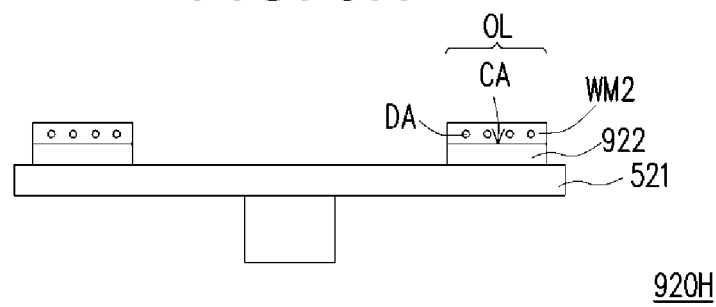
FIG. 9I and FIG. 9L are schematic cross-sectional views of various wavelength conversion modules in FIG. 9D.

FIG. 9H is a schematic top view of another wavelength conversion module in FIG. 9A. FIG. 9I is a schematic cross-sectional view of the wavelength conversion module in FIG. 9H. A wavelength conversion module 920H in FIG. 9H is similar to the wavelength conversion module 520F in FIG. 5F. Differences are as follows. In the wavelength conversion module 920H of the embodiment, the ring-shaped light scattering layer 122 is replaced by a mirror reflecting layer 922, to constitute a ring-shaped mirror reflecting layer. In this way, based on the arrangement of the plurality of dotted microstructures DA constituted by wavelength conversion material WM2 in the ring-shaped light irradiation region OL, the wavelength conversion module 920H can still cause the first part of the excitation beam 50 from the same excitation light source 110 to be converted into the first color light 60Y, and cause the second part of the excitation beam 50 to be transmitted to the non-conversion region NT (these gaps CA) to form the second color light 60B. In addition, the wavelength conversion module 920H may also adjust the first position P1 and the second position P2 of the ring-shaped light irradiation region OL and change the volume percentage, to respectively control light intensity values of the first color light 60Y and the second color light 60B in different time periods.

In the embodiment, the wavelength conversion module 920H has a structure similar to that of the wavelength conversion module 520F in FIG. 5F. Therefore, the wavelength conversion module 920H can achieve effects and advantages similar to those of the wavelength conversion module 520F, and the descriptions thereof are omitted herein. In addition, because the wavelength conversion module 920H is also configured with the ring-shaped mirror reflecting layer, the wavelength conversion module 920H may also be applied to the lighting system 900A, and when the wavelength conversion module 920H is applied to the lighting system 900A, the lighting system 900A can also be enabled to achieve similar effects and advantages. The descriptions thereof are omitted herein.

Figure 9J:
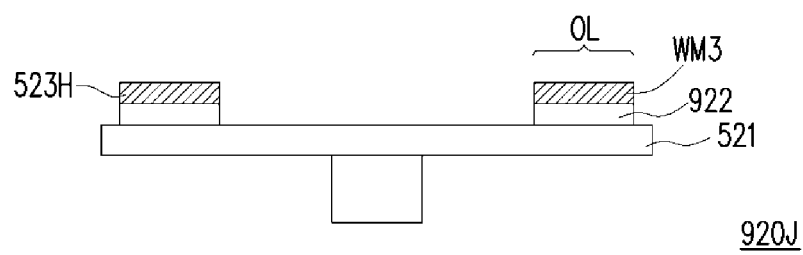

FIG. 9J is a schematic cross-sectional view of another wavelength conversion module in FIG. 9H. A wavelength conversion module 920J in FIG. 9J is similar to the wavelength conversion module 520H in FIG. 5H. Differences are as follows. In the wavelength conversion module 920J of the present embodiment, the ring-shaped light scattering layer 122 is replaced by a mirror reflecting layer 922, to constitute a ring-shaped mirror reflecting layer.

Specifically, in the embodiment, the wavelength conversion module 920 can also satisfy a particular light conversion condition because of having the light-active layer 523H. In this way, based on the arrangement of the wavelength conversion material WM3 in the ring-shaped light irradiation region OL, the wavelength conversion module 920J can cause the first part of the excitation beam 50 from the same excitation light source 110 to be converted into the first color light 60Y, and cause the second part of the excitation beam 50 to be transmitted to the ring-shaped light irradiation region OL to form the second color light 60B. When the light-active layer 523H of the wavelength conversion module 920J satisfies the light conversion condition, the wavelength conversion module 920J may also adjust the first position P1 and the second position P2 of the ring-shaped light irradiation region OL and change the volumetric concentration or the thickness, to respectively control moments of the first time sequence and the second time sequence, ranges of the first time period and the second time period, and light intensity values of the first color light 60Y and the second color light 60B therein.

In the embodiment, the wavelength conversion module 920J has a structure similar to that of the wavelength conversion module 520H in FIG. 5H. Therefore, the wavelength conversion module 920J can achieve effects and advantages similar to those of the wavelength conversion module 520H, and the descriptions thereof are omitted herein. In addition, because the wavelength conversion module 920J is also configured with the ring-shaped mirror reflecting layer, the wavelength conversion module 920J may also be applied to the lighting system 900A, and when the wavelength conversion module 920J is applied to the lighting system 900A, the lighting system 900A can also be enabled to achieve similar effects and advantages. The descriptions thereof are omitted herein.

Figure 9K:
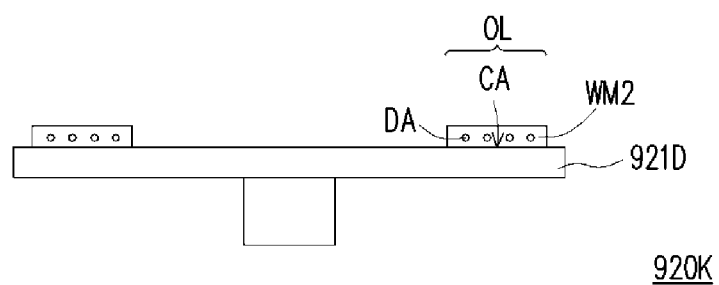
Figure 9L:
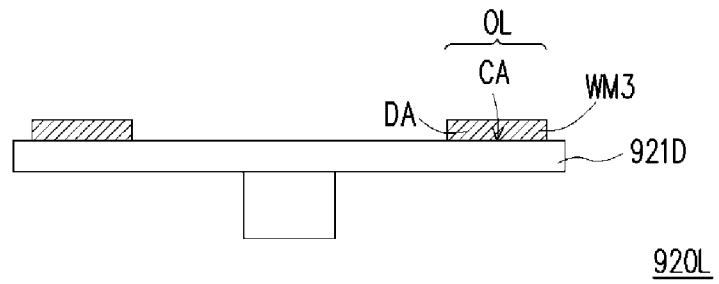

FIG. 9K and FIG. 9L are each a schematic front view of another wavelength conversion module in FIG. 9H. Wavelength conversion modules 920K and 920L in FIG. 9K and FIG. 9L are respectively similar to the wavelength conversion modules 920H and 920J in FIG. 9I and FIG. 9J, and differences are as follows. In the embodiment, a substrate 921D of the wavelength conversion module 920K or 920L is a smooth mirror, so that the mirror reflecting layer 922 may be omitted and the wavelength conversion material WM2 (or the wavelength conversion material WM3) may be directly arranged on the substrate 921D.

In this way, when the excitation beam 50 is incident to the wavelength conversion module 920K or 920L, the wavelength conversion module 920K or 920L causes the first part of the excitation beam 50 to be converted into the first color light 60Y and causes the second part of the excitation beam 50 to form the second color light 60B, to achieve effects and advantages similar to those of the wavelength conversion module 920H or 920J, and the descriptions thereof are omitted herein.

Figure 10:
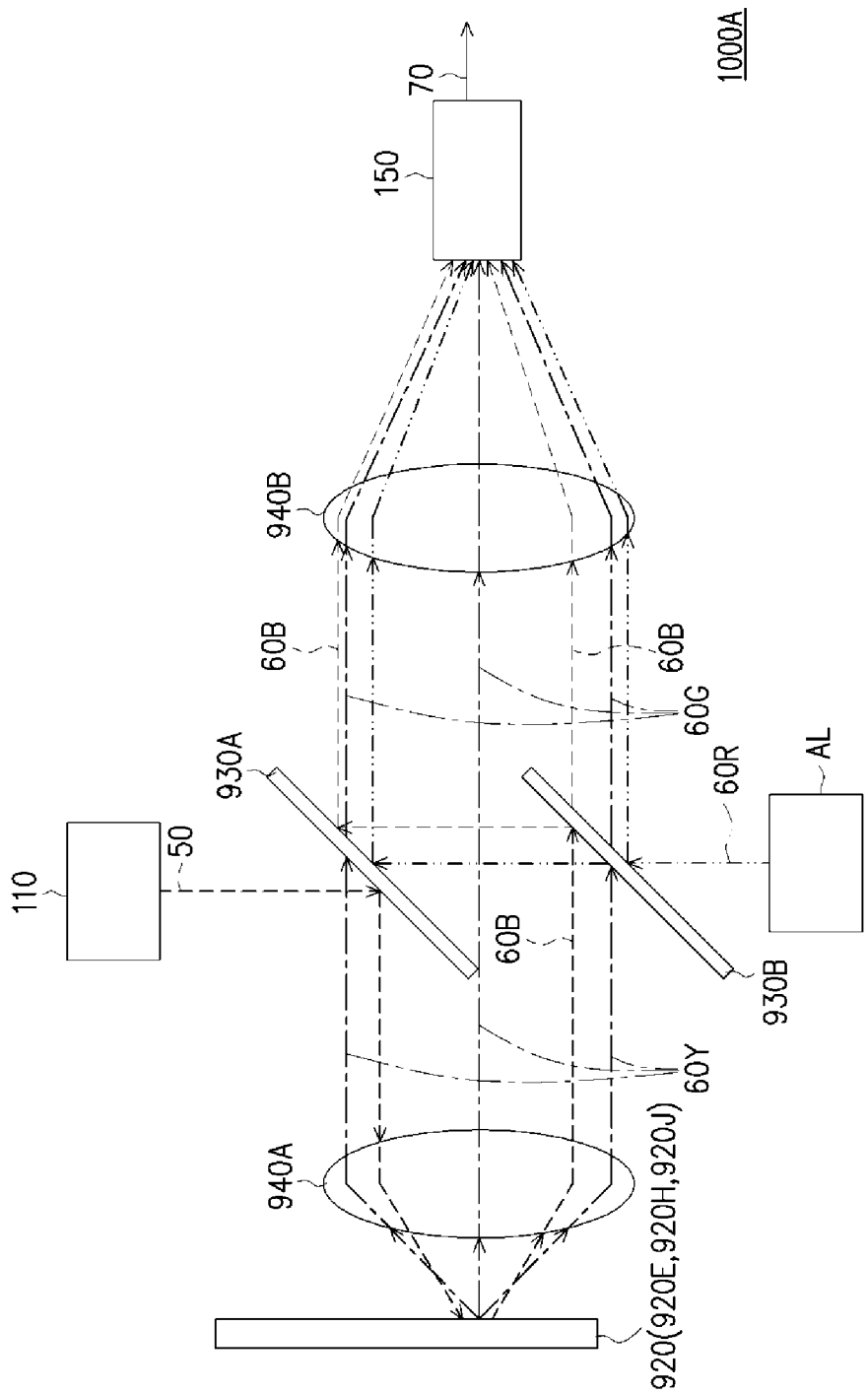
FIG. 10 to FIG. 11B are schematic architectural diagrams of various lighting systems in FIG. 1A.

FIG. 10 is a schematic architectural diagram of another lighting system in FIG. 1A. A lighting system 1000A in FIG. 10 is similar to the lighting system 900A in FIG. 9A. Differences are as follows. In the embodiment, the lighting system 1000A further includes an auxiliary light source AL. The auxiliary light source AL is configured to emit an auxiliary beam 60R, and a wave band of the auxiliary beam 60R at least partially overlaps a wave band of the first color light 60Y. In the embodiment, the auxiliary beam 60R is, for example, red light.

In addition, in the embodiment, the fifth color separation element 930A is, for example, a DMBR. The sixth color separation element 930B is a blue and red half mirror (BRHM), and therefore can allow one part of the auxiliary beam 60R and the second color light 60B to pass through and reflect another part of the auxiliary beam 60R and the second color light 60B.

In addition, as shown in FIG. 10, in the embodiment, the sixth color separation element 930B is located on the transmission path of the auxiliary beam 60R. In this way, the sixth color separation element 930B can allow one part of the auxiliary beam 60R to pass through and therefore to be transmitted to the fifth color separation element 930A, and reflect another part of the auxiliary beam 60R, so that the another part of the auxiliary beam 60R is transmitted to the second condensing lens assembly 940B. In addition, as shown in FIG. 10, in the embodiment, the fifth color separation element 930A can reflect the excitation beam 50, reflect the second color light 60B and the auxiliary beam 60R from the sixth color separation element 930B, and allow part of the first color light 60G from the wavelength conversion module 920 to pass through. In this way, the auxiliary beam 60R, the second color light 60B, and part of the first color light 60G from the fifth color separation element 930A and the sixth color separation element 930B are combined to form the illuminating beam 70 after passing through the second condensing lens assembly 940B.

In this way, based on the arrangement of the auxiliary light source AL, the lighting system 1000A can increase a red light proportion in the illuminating beam 70, thereby improving red color performance in a projection picture. In addition, in the embodiment, because the lighting system 1000A can also use a structure similar to that of the wavelength conversion module 920 (or the wavelength conversion module 920E, 920H, or 920J) that can be used by the lighting system 900A, the lighting system 1000A can achieve effects and advantages similar to those of the lighting system 900A, and the descriptions thereof are omitted herein. In addition, when the lighting system 1000A is applied to the projection device 100, the projection device 100 can also be enabled to achieve similar effects and advantages, and the descriptions thereof are omitted herein.

Figure 11A:
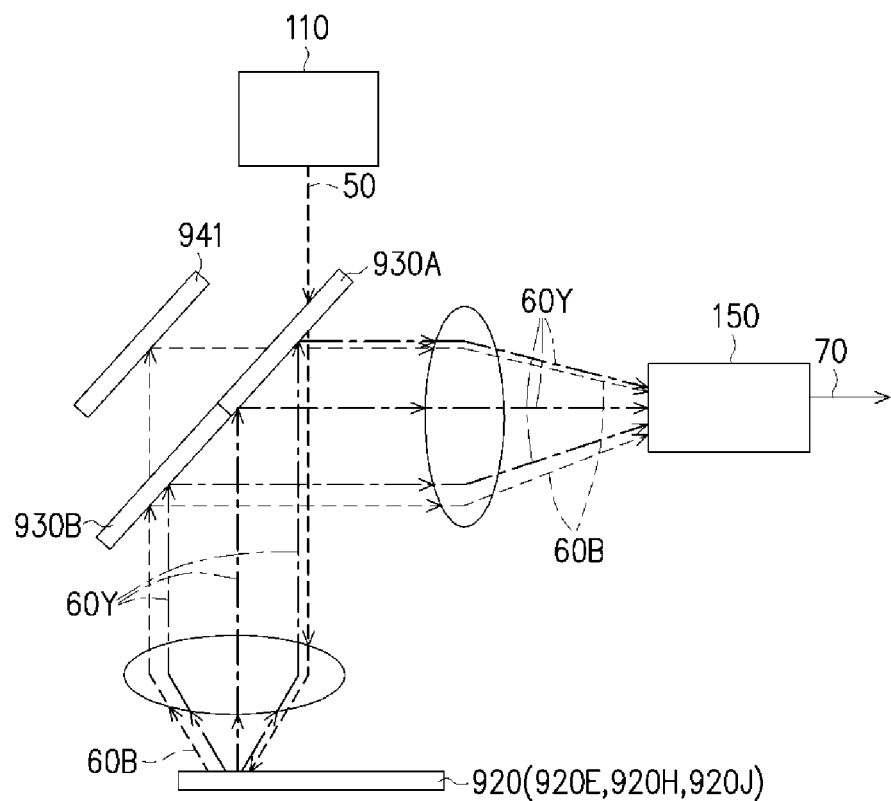

FIG. 11A is a schematic architectural diagram of another lighting system in FIG. 1A. A lighting system 1100A in FIG. 10 is similar to the lighting system 900A in FIG. 9A. Differences are as follows. In the embodiment, the fifth color separation element 930A is, for example, a DMY, and can allow blue light to pass through and. In other words, the fifth color separation element 930A can reflect the first color light 60Y from the wavelength conversion module 920, and allow the excitation beam 50 and the second color light 60B from the wavelength conversion module 920 to pass through. The sixth color separation element 930B can have functions of both a BHM and a DMY. For example, two opposite surfaces of the sixth color separation element 930B may be respectively coated with different color separation films, so that one surface has a function of a BHM, and the other surface has a function of a DMY. In this way, one part of the second color light 60B from the wavelength conversion module 920 can be allowed to pass through, another part of the second color light 60B is reflected, and the first color light 60Y from the wavelength conversion module 920 is also reflected.

In addition, as shown in FIG. 11A, in the embodiment, the lighting system 1100A further includes an optical transmission module 941. The optical transmission module 941 is located on the transmission path of the second color light 60B. For example, in the embodiment, the optical transmission module 941 may be a reflective element, and therefore can reflect the second color light 60B. In this way, part of the second color light 60B from the sixth color separation element 930B may be sequentially transmitted to the fifth color separation element 930A and the second condensing lens assembly 940B by the optical transmission module 941. Subsequently, as shown in FIG. 11A, in the embodiment, the first color light 60Y and the second color light 60B from the fifth color separation element 930A and the sixth color separation element 930B can be transmitted to the optical uniformization element 150 after passing through the second condensing lens assembly 940B and combined to form the illuminating beam 70.

In the embodiment, because the lighting system 1100A can also use a structure similar to that of the wavelength conversion module 920 (or the wavelength conversion module 920E, 920H, or 920J) that can be used by the lighting system 900A, the lighting system 1100A can achieve effects and advantages similar to those of the lighting system 900A, and the descriptions thereof are omitted herein. In addition, when the lighting system 1100A is applied to the projection device 100, the projection device 100 can also be enabled to achieve similar effects and advantages, and the descriptions thereof are omitted herein.

Figure 11B:
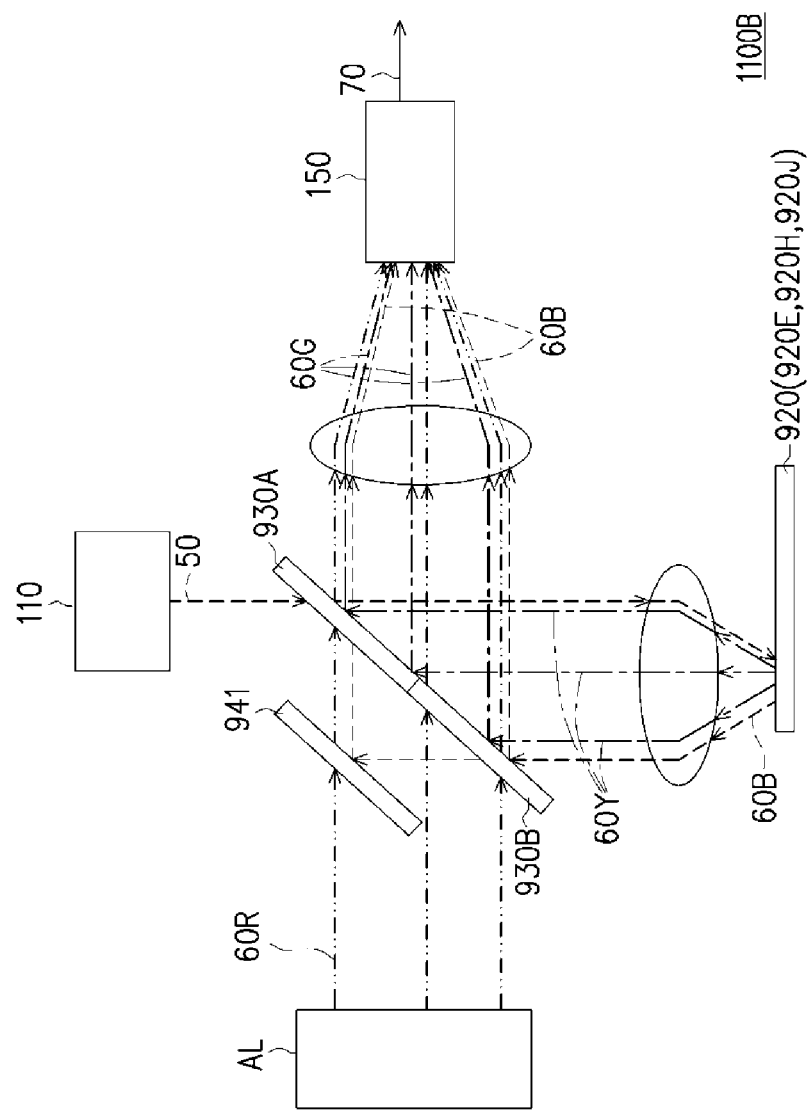

FIG. 11B is a schematic architectural diagram of another lighting system in FIG. 1A. A lighting system 1100B in FIG. 11B is similar to the lighting system 1100A in FIG. 11A. Differences are as follows. In the embodiment, the lighting system 1100B further includes an auxiliary light source AL. The auxiliary light source AL is configured to emit an auxiliary beam 60R, and a wave band of the auxiliary beam 60R at least partially overlaps a wave band of the first color light 60Y. In the present embodiment, the auxiliary beam 60R is, for example, red light.

In addition, as shown in FIG. 11B, in the embodiment, the fifth color separation element 930A and the sixth color separation element 930B are located on the transmission path of the auxiliary beam 60R. Specifically, in the embodiment, the fifth color separation element 930A is, for example, a DMGO, can allow blue light to pass through, can reflect part of the first color light 60G from the wavelength conversion module 920, and cause the excitation beam 50, the second color light 60B from the wavelength conversion module 920, and the auxiliary beam 60R from the auxiliary light source AL to pass through. The sixth color separation element 930B can have functions of both a BHM and a DMGO. For example, two opposite surfaces of the sixth color separation element 930B may be respectively coated with different color separation films, so that one surface has a function of a BHM, and the other surface has a function of a DMGO. In this way, one part of the second color light 60B from the wavelength conversion module 920 and the auxiliary beam 60R from the auxiliary light source AL can be allowed to pass through, another part of the second color light 60B is reflected, and part of the first color light 60G from the wavelength conversion module 920 is also reflected.

Moreover, the optical transmission module 941 is, for example, a DMB, and therefore can allow the auxiliary beam 60R to pass through and reflect the second color light 60B. In this way, as shown in FIG. 11B, in the embodiment, the auxiliary beam 60R can pass through the optical transmission module 941 and be transmitted to the fifth color separation element 930A and the sixth color separation element 930B, and then pass through the fifth color separation element 930A and the sixth color separation element 930B. Subsequently, as shown in FIG. 11B, in the embodiment, the auxiliary beam 60R, the second color light 60B, and part of the first color light 60G from the fifth color separation element 930A and the sixth color separation element 930B are transmitted to the optical uniformization element 150 after passing through the second condensing lens assembly 940B and combined to form the illuminating beam 70.

In this way, based on the arrangement of the auxiliary light source AL, the lighting system 1100B can increase a red light proportion in the illuminating beam 70, thereby improving red color performance in a projection picture. In addition, in the embodiment, because the lighting system 1100B can also use a structure similar to that of the wavelength conversion module 920 (or the wavelength conversion module 920E, 920H, or 920J) that can be used by the lighting system 1100A, the lighting system 1100B can achieve effects and advantages similar to those of the lighting system 1100A, and the descriptions thereof are omitted herein. In addition, when the lighting system 1100B is applied to the projection device 100, the projection device 100 can also be enabled to achieve similar effects and advantages, and the descriptions thereof are omitted herein.

Figure 12:
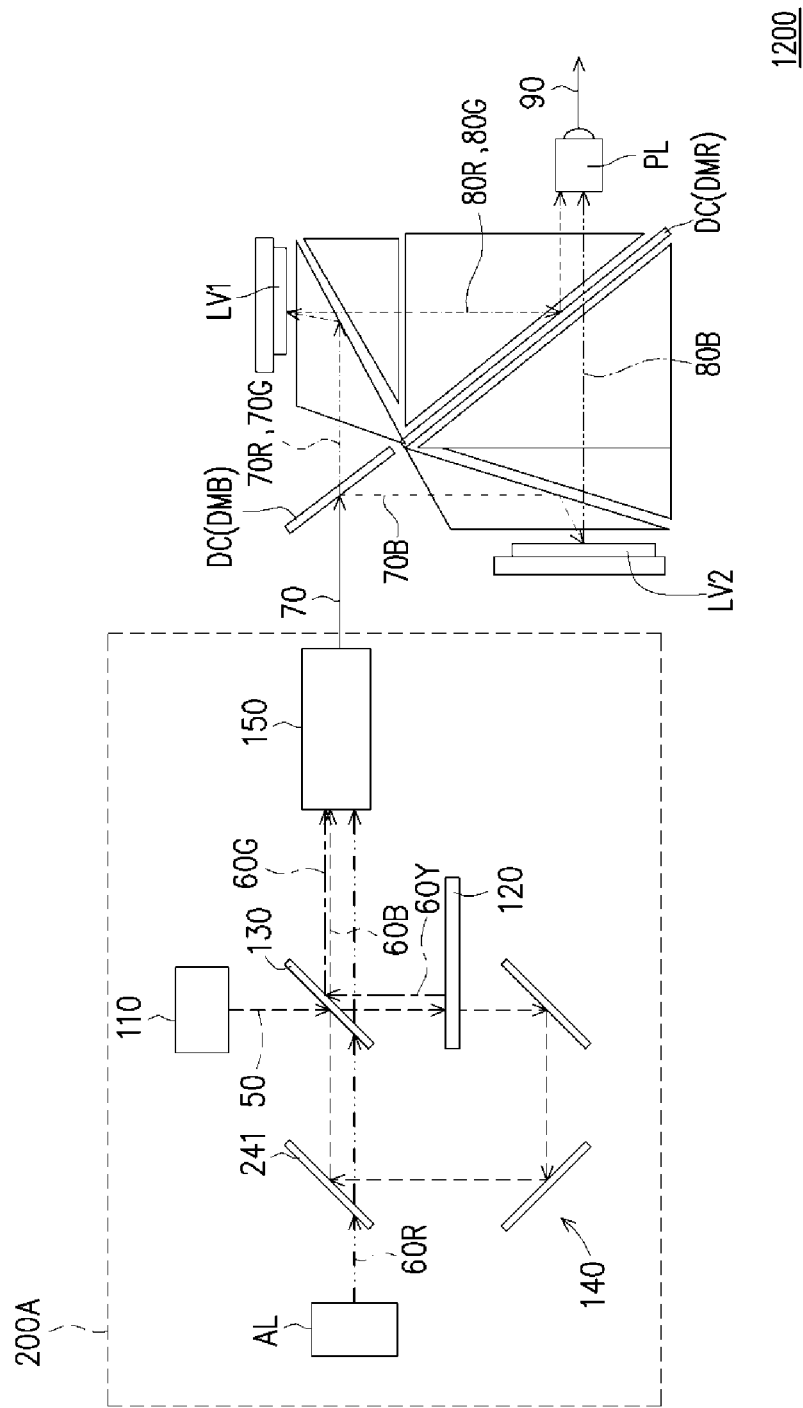
FIG. 12 is a schematic architectural diagram of another projection device according to an embodiment of the invention.

FIG. 12 is a schematic architectural diagram of another projection device according to an embodiment of the invention. A projection device 1200 in FIG. 12 is similar to the projection device 100 in FIG. 1A, and differences are as follows. In the embodiment, there are two light valves LV, namely, light valves LV1 and LV2, and the projection device 1200 uses the lighting system 200A in the embodiment of FIG. 2A.

Specifically, as shown in FIG. 12, in the embodiment, the excitation light source 110 and the auxiliary light source AL are not enabled at the same time, and the auxiliary beam 60R, the second color light 60B, and the first color light 60Y (or part of the first color light 60G) in different colors may be formed according to time sequences. Subsequently, as shown in FIG. 12, in the embodiment, the light splitting and combining unit DC is located on the transmission path of the illuminating beam 70, and is applicable to converting the illuminating beam 70 into a plurality of illuminating sub-beams 70R, 70G, and 70B. For example, as shown in FIG. 12, the light splitting and combining unit DC may include a DMB and a DMR. In this way, when the excitation light source 110 is enabled, when passing through the DMB, the illuminating beam 70 including the second color light 60B and part of the first color light 60G can be sequentially divided into illuminating sub-beams 70B and 70G, and guided to the subsequent corresponding light valves LV1 and LV2. Subsequently, the light valves LV1 and LV2 convert the corresponding plurality of illuminating sub-beams 70G and 70B into a plurality of image beams 80G and 80B.

Moreover, when the auxiliary light source AL is enabled, the auxiliary beam 60R passes through the DMB of the light splitting and combining unit DC to form an illuminating sub-beam 70R and is transmitted to the subsequent light valve LV1. Subsequently, the light valve LV1 then convert the illuminating sub-beam 70R into a corresponding image beam 80R. These image beams 80R, 80G, and 80B sequentially pass through the DMR of the light splitting and combining unit DC, and are combined and transmitted to the projection lens PL. In addition, the projection lens PL is located on the transmission path of these image beams 80R, 80G, and 80B, and is configured to project the plurality of image beams 80R, 80G, 80B to a screen (not shown). Therefore, a projected image picture can become a color picture.

In the embodiment, the projection device 1200 also uses the structures of the lighting system 200A and the wavelength conversion module 120 used in the lighting system 200A. Therefore, the projection device 1200 can achieve effects and advantages similar to those of the projection device 100, and the descriptions thereof are omitted herein. In addition, the lighting system 200B, 200C, 300B, 300C, 600A, 600B, 600C, 700A, 800A, 1000A, or 1100B having the auxiliary light source AL can also replace the lighting system 200A in the embodiment, and be applied to the projection device 1200, so that the projection device 1200 can also achieve similar effects and advantages, and the descriptions thereof are omitted herein.

Based on the above, the embodiments of the invention have at least one of the following advantages or effects. In the embodiments of the invention, based on the arrangement of the ring-shaped light irradiation region in the wavelength conversion module and the projection device, one part of the excitation beam from the same excitation light source may be converted into the first color light, and another part of the excitation beam forms the second color light. In addition, the wavelength conversion module may also adjust changes in a radial width, a volume ratio, a volumetric concentration, or a thickness of the wavelength conversion material throughout the ring-shaped light irradiation region, to respectively control light intensity values of the first color light and the second color light in different time periods. In this way, when the projection device needs to display a dark picture, the wavelength conversion material throughout the ring-shaped light irradiation region of the wavelength conversion module may be designed, to correspondingly reduce a light intensity value of an image beam in a required color to a required value, so that dithering noise of an entire dark picture can be greatly reduced, thereby improving image quality and a visual perception of a user. In addition, based on the arrangement of the auxiliary light source, the lighting system and the projection device can increase a red light proportion in the illuminating beam, thereby improving red color performance in a projection picture.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particular exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A wavelength conversion module, configured to receive an excitation beam, wherein the wavelength conversion module comprises a substrate and a wavelength conversion material arranged on the substrate, the substrate comprises a ring-shaped light irradiation region, the wavelength conversion material is annularly arranged on at least part of the ring-shaped light irradiation region, and the substrate is configured to rotate with a rotating axis as a center, wherein when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module, wherein the wavelength conversion material of the ring-shaped light irradiation region to which the excitation beam is incident in a first time sequence has a first radial width, the wavelength conversion material of the ring-shaped light irradiation region to which the excitation beam is incident in a second time sequence has a second radial width, and the first radial width and the second radial width are different.

2. The wavelength conversion module according to claim 1, wherein the first color light with a first light intensity obtained through conversion when the excitation beam is incident to the wavelength conversion material of the ring-shaped light irradiation region in the first time sequence, the first color light with a second light intensity obtained through conversion when the excitation beam is incident to the wavelength conversion material of the ring-shaped light irradiation region in the second time sequence, the first light intensity of the first color light in the first time sequence and the second light intensity of the first color light in the second time sequence are different, and the first light intensity is greater than the second light intensity, and a ratio of the first light intensity to the second light intensity is greater than 110%.

3. The wavelength conversion module according to claim 1, wherein a radial width of the wavelength conversion material of the ring-shaped light irradiation region to which the excitation beam is incident changes periodically over time, in a first time period, the radial width of the wavelength conversion material of the ring-shaped light irradiation region to which the excitation beam is incident gradually decreases from the first radial width to the second radial width, and in a second time period, the radial width of the wavelength conversion material of the ring-shaped light irradiation region to which the excitation beam is incident gradually increases from the second radial width to the first radial width, wherein the first radial width is a maximum radial width of the wavelength conversion material, and the second radial width is a minimum radial width of the wavelength conversion material.

4. The wavelength conversion module according to claim 1, wherein the ring-shaped light irradiation region comprises a first section and a second section, a width of the wavelength conversion material in the first section is fixedly the first radial width, and a width of the wavelength conversion material in the second section is fixedly the second radial width.

5. The wavelength conversion module according to claim 1, wherein the ring-shaped light irradiation region further comprises a non-conversion region, and the second part of the excitation beam is incident to the non-conversion region of the ring-shaped light irradiation region to form the second color light.

6. The wavelength conversion module according to claim 5, wherein a first ring-shaped light scattering region and a second ring-shaped light scattering region are formed on the substrate, and the first ring-shaped light scattering region and the second ring-shaped light scattering region correspond to the non-conversion region, wherein the wavelength conversion material, the first ring-shaped light scattering region, and the second ring-shaped light scattering region constitute the ring-shaped light irradiation region, the wavelength conversion material is located between the first ring-shaped light scattering region and the second ring-shaped light scattering region, and the wavelength conversion material surrounds the first ring-shaped light scattering region and is surrounded by the second ring-shaped light scattering region.

7. The wavelength conversion module according to claim 5, wherein a first ring-shaped reflective region and a second ring-shaped reflective region are formed on the substrate, and the first ring-shaped reflective region and the second ring-shaped reflective region correspond to the non-conversion region, wherein the wavelength conversion material, the first ring-shaped reflective region, and the second ring-shaped reflective region constitute the ring-shaped light irradiation region, the wavelength conversion material is located between the first ring-shaped reflective region and the second ring-shaped reflective region, and the wavelength conversion material surrounds the first ring-shaped reflective region and is surrounded by the second ring-shaped reflective region.

8. The wavelength conversion module according to claim 1, wherein the wavelength conversion material constitutes a light-active layer and is arranged corresponding to the ring-shaped light irradiation region, wherein when the light-active layer satisfies a light conversion condition, the second part of the excitation beam is incident to the ring-shaped light irradiation region to form the second color light, and the light conversion condition is that a volumetric concentration of the wavelength conversion material in the light-active layer ranges from 15% to 85%, or a thickness of the light-active layer ranges from 0.03 millimeter to 0.3 millimeter.

9. The wavelength conversion module according to claim 1, wherein a value of a ratio of the second part of the excitation beam to the excitation beam that is incident to the ring-shaped light irradiation region ranges from 5% to 30%.

10. A wavelength conversion module, configured to receive an excitation beam, wherein the wavelength conversion module comprises a substrate and a wavelength conversion material arranged on the substrate, the substrate comprises a ring-shaped light irradiation region, the wavelength conversion material is annularly arranged on at least part of the ring-shaped light irradiation region, and the substrate is configured to rotate with a rotating axis as a center, wherein when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module, wherein the wavelength conversion material constitutes a plurality of dotted microstructures, a plurality of gaps exists between the plurality of dotted microstructures, the plurality of gaps corresponds to a non-conversion region, the wavelength conversion material and the plurality of gaps constitute a light-active layer, and the light-active layer is arranged corresponding to the ring-shaped light irradiation region.

11. The wavelength conversion module according to claim 10, wherein a volume percentage for which the plurality of dotted microstructures in the light-active layer to which the excitation beam is incident in a first time sequence accounts in the light-active layer is a first volume ratio, a volume percentage for which the plurality of dotted microstructures in the light-active layer to which the excitation beam is incident in a second time sequence accounts in the light-active layer is a second volume ratio, and the first volume ratio and the second volume ratio are different.

12. A wavelength conversion module, configured to receive an excitation beam, wherein the wavelength conversion module comprises a substrate and a wavelength conversion material arranged on the substrate, the substrate comprises a ring-shaped light irradiation region, the wavelength conversion material is annularly arranged on at least part of the ring-shaped light irradiation region, and the substrate is configured to rotate with a rotating axis as a center, wherein when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module, wherein the wavelength conversion material constitutes a light-active layer and is arranged corresponding to the ring-shaped light irradiation region, wherein a volumetric concentration of the wavelength conversion material in the light-active layer to which the excitation beam is incident in a first time sequence is a first concentration, a volumetric concentration of the wavelength conversion material in the light-active layer to which the excitation beam is incident in a second time sequence is a second concentration, and the first concentration and the second concentration are different.

13. A projection device, comprising a lighting system, a light splitting and combining unit, at least two light valves, and a projection lens, wherein:
the lighting system is configured to provide an illuminating beam, and the lighting system comprises an excitation light source and a wavelength conversion module, wherein:
the excitation light source is configured to emit an excitation beam; and
the wavelength conversion module is located on a transmission path of the excitation beam, the wavelength conversion module comprises a substrate and a wavelength conversion material arranged on the substrate, the substrate comprises a ring-shaped light irradiation region, the wavelength conversion material is annularly arranged on at least part of the ring-shaped light irradiation region, and the substrate is configured to rotate with a rotating axis as a center, wherein when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module,
wherein the wavelength conversion material of the ring-shaped light irradiation region to which the excitation beam is incident in a first time sequence has a first radial width, the wavelength conversion material of the ring-shaped light irradiation region to which the excitation beam is incident in a second time sequence has a second radial width, and the first radial width and the second radial width are different, the light splitting and combining unit is located on a transmission path of the illuminating beam, and is configured to convert the illuminating beam into a plurality of illuminating sub-beams,
the at least two light valves are located on a transmission path of the plurality of illuminating sub-beams, and are configured to convert the plurality of corresponding illuminating sub-beams into a plurality of image beams, and
the projection lens is located on a transmission path of the plurality of image beams, and is configured to convert the plurality of image beams into projection beams, wherein the plurality of image beams is transmitted to the projection lens through the light splitting and combining unit.

14. The projection device according to claim 13, wherein the first color light with a first light intensity obtained through conversion when the excitation beam is incident to the wavelength conversion material of the ring-shaped light irradiation region in the first time sequence,
the first color light with a second light intensity obtained through conversion when the excitation beam is incident to the wavelength conversion material of the ring-shaped light irradiation region in the second time sequence,
the first light intensity of the first color light in the first time sequence and the second light intensity of the first color light in the second time sequence are different, and
the first light intensity is greater than the second light intensity, and a ratio of the first light intensity to the second light intensity is greater than 110%.

15. The projection device according to claim 13, wherein a radial width of the wavelength conversion material of the ring-shaped light irradiation region to which the excitation beam is incident changes periodically over time, in a first time period, the radial width of the wavelength conversion material of the ring-shaped light irradiation region to which the excitation beam is incident gradually decreases from the first radial width to the second radial width, and in a second time period, the radial width of the wavelength conversion material of the ring-shaped light irradiation region to which the excitation beam is incident gradually increases from the second radial width to the first radial width, wherein the first radial width is a maximum radial width of the wavelength conversion material, and the second radial width is a minimum radial width of the wavelength conversion material.

16. The projection device according to claim 13, wherein the ring-shaped light irradiation region comprises a first section and a second section, a width of the wavelength conversion material in the first section is fixedly the first radial width, and a width of the wavelength conversion material in the second section is fixedly the second radial width.

17. The projection device according to claim 13, wherein the ring-shaped light irradiation region further comprises a non-conversion region, and the second part of the excitation beam is incident to the non-conversion region of the ring-shaped light irradiation region to form the second color light.

18. The projection device according to claim 17, wherein a first ring-shaped light scattering region and a second ring-shaped light scattering region are formed on the substrate, and the first ring-shaped light scattering region and the second ring-shaped light scattering region correspond to the non-conversion region, wherein the wavelength conversion material, the first ring-shaped light scattering region, and the second ring-shaped light scattering region constitute the ring-shaped light irradiation region, the wavelength conversion material is located between the first ring-shaped light scattering region and the second ring-shaped light scattering region, and the wavelength conversion material surrounds the first ring-shaped light scattering region and is surrounded by the second ring-shaped light scattering region.

19. The projection device according to claim 13, wherein the wavelength conversion material constitutes a light-active layer and is arranged corresponding to the ring-shaped light irradiation region, wherein when the light-active layer satisfies a light conversion condition, the second part of the excitation beam is incident to the ring-shaped light irradiation region to form the second color light, and the light conversion condition is that a volumetric concentration of the wavelength conversion material in the light-active layer ranges from 15% to 85%, or a thickness of the light-active layer ranges from 0.03 millimeter to 0.3 millimeter.

20. The projection device according to claim 13, wherein a first ring-shaped reflective region and a second ring-shaped reflective region are formed on the substrate, and the first ring-shaped reflective region and the second ring-shaped reflective region correspond to a non-conversion region, wherein the wavelength conversion material, the first ring-shaped reflective region, and the second ring-shaped reflective region constitute the ring-shaped light irradiation region, the wavelength conversion material is located between the first ring-shaped reflective region and the second ring-shaped reflective region, and the wavelength conversion material surrounds the first ring-shaped reflective region and is surrounded by the second ring-shaped reflective region.

21. The projection device according to claim 20, wherein the lighting system further comprises a first condensing lens, and the excitation beam is obliquely incident to the first ring-shaped reflective region or the second ring-shaped reflective region of the ring-shaped light irradiation region from a side of the first condensing lens, and is then transmitted to the other side of the first condensing lens.

22. The projection device according to claim 13, wherein a value of a ratio of the second part of the excitation beam to the excitation beam that is incident to the ring-shaped light irradiation region ranges from 5% to 30%.

23. The projection device according to claim 13, further comprising:
an auxiliary light source, configured to emit an auxiliary beam, wherein a wave band of the auxiliary beam at least partially overlaps a wave band of the first color light.

24. A projection device, comprising a lighting system, a light splitting and combining unit, at least two light valves, and a projection lens, wherein:
the lighting system is configured to provide an illuminating beam, and the lighting system comprises an excitation light source and a wavelength conversion module, wherein:
the excitation light source is configured to emit an excitation beam; and
the wavelength conversion module is located on a transmission path of the excitation beam, the wavelength conversion module comprises a substrate and a wavelength conversion material arranged on the substrate, the substrate comprises a ring-shaped light irradiation region, the wavelength conversion material is annularly arranged on at least part of the ring-shaped light irradiation region, and the substrate is configured to rotate with a rotating axis as a center, wherein when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module, wherein the wavelength conversion material constitutes a plurality of dotted microstructures, a plurality of gaps exists between the plurality of dotted microstructures, the wavelength conversion material and the plurality of gaps constitute a light-active layer, and the light-active layer is arranged corresponding to the ring-shaped light irradiation region, the light splitting and combining unit is located on a transmission path of the illuminating beam, and is configured to convert the illuminating beam into a plurality of illuminating sub-beams, the at least two light valves are located on a transmission path of the plurality of illuminating sub-beams, and are configured to convert the plurality of corresponding illuminating sub-beams into a plurality of image beams, and the projection lens is located on a transmission path of plurality of image beams, and is configured to convert the plurality of image beams into projection beams, wherein the plurality of image beams is transmitted to the projection lens through the light splitting and combining unit.

25. The projection device according to claim 24, wherein a volume percentage for which the plurality of dotted microstructures in the light-active layer to which the excitation beam is incident in a first time sequence accounts in the light-active layer is a first volume ratio, a volume percentage for which the plurality of dotted microstructures in the light-active layer to which the excitation beam is incident in a second time sequence accounts in the light-active layer is a second volume ratio, and the first volume ratio and the second volume ratio are different.

26. A projection device, comprising a lighting system, a light splitting and combining unit, at least two light valves, and a projection lens, wherein:
the lighting system is configured to provide an illuminating beam, and the lighting system comprises an excitation light source and a wavelength conversion module, wherein:
the excitation light source is configured to emit an excitation beam; and
the wavelength conversion module is located on a transmission path of the excitation beam, the wavelength conversion module comprises a substrate and a wavelength conversion material arranged on the substrate, the substrate comprises a ring-shaped light irradiation region, the wavelength conversion material is annularly arranged on at least part of the ring-shaped light irradiation region, and the substrate is configured to rotate with a rotating axis as a center, wherein when the excitation beam is guided to the wavelength conversion module, a first part of the excitation beam is incident to the wavelength conversion material to be converted into a first color light, a second part of the excitation beam is incident to the ring-shaped light irradiation region to form a second color light, the first color light and the second color light are emitted from the wavelength conversion module, wherein the wavelength conversion material constitutes a light-active layer and is arranged corresponding to the ring-shaped light irradiation region, wherein a volumetric concentration of the wavelength conversion material in the light-active layer to which the excitation beam is incident in a first time sequence is a first concentration, a volumetric concentration of the wavelength conversion material in the light-active layer to which the excitation beam is incident in a second time sequence is a second concentration, and the first concentration and the second concentration are different, the light splitting and combining unit is located on a transmission path of the illuminating beam, and is configured to convert the illuminating beam into a plurality of illuminating sub-beams, the at least two light valves are located on a transmission path of the plurality of illuminating sub-beams, and are configured to convert the plurality of corresponding illuminating sub-beams into a plurality of image beams, and the projection lens is located on a transmission path of the plurality of image beams, and is configured to convert the plurality of image beams into projection beams wherein the plurality of image beams is transmitted to the projection lens through the light splitting and combining unit.

* * * * *